US008862978B2

(12) United States Patent
Evans

(10) Patent No.: US 8,862,978 B2
(45) Date of Patent: Oct. 14, 2014

(54) METHODS AND SYSTEMS FOR FACILITATING AN ONLINE SOCIAL NETWORK

(71) Applicant: Curt Evans, Springfield, VA (US)

(72) Inventor: Curt Evans, Springfield, VA (US)

( * ) Notice: Subject to any disclaimer, the term of this patent is extended or adjusted under 35 U.S.C. 154(b) by 0 days.

(21) Appl. No.: 14/099,231

(22) Filed: Dec. 6, 2013

(65) Prior Publication Data

US 2014/0089413 A1 Mar. 27, 2014

Related U.S. Application Data

(63) Continuation of application No. 13/851,813, filed on Mar. 27, 2013, which is a continuation-in-part of application No. 13/342,865, filed on Jan. 3, 2012.

(60) Provisional application No. 61/429,399, filed on Jan. 3, 2011.

(51) Int. Cl.
| | | |
|---|---|---|
| G06F 17/20 | (2006.01) |
| H04N 9/82 | (2006.01) |
| G06F 17/30 | (2006.01) |
| H04N 21/414 | (2011.01) |
| H04N 21/472 | (2011.01) |
| A63F 13/30 | (2014.01) |
| G06K 19/06 | (2006.01) |
| G06F 3/0488 | (2013.01) |
| G06F 3/0484 | (2013.01) |
| H04N 21/482 | (2011.01) |
| H04L 29/06 | (2006.01) |
| H04N 21/433 | (2011.01) |
| H04N 5/765 | (2006.01) |
| H04N 21/4402 | (2011.01) |

(52) U.S. Cl.
CPC .............. *A63F 13/12* (2013.01); *H04N 9/8233* (2013.01); *G06F 17/30017* (2013.01); *H04N 21/41407* (2013.01); *H04N 21/47217* (2013.01); *G06K 19/06009* (2013.01); *G06F 3/0488* (2013.01); *G06F 3/0484* (2013.01); *H04N 21/4828* (2013.01); *H04L 65/403* (2013.01); *H04N 21/4334* (2013.01); *H04N 5/765* (2013.01); *H04N 21/440236* (2013.01)
USPC .......................................................... 715/206

(58) Field of Classification Search
USPC .......................................................... 715/206
See application file for complete search history.

(56) References Cited

U.S. PATENT DOCUMENTS 6,018,768 A 1/2000 Ullman et al.
7,284,032 B2 10/2007 Weber
(Continued)

OTHER PUBLICATIONS

Myers, Brad A., Juan P. Casares, Scott Stevens, Laura Dabbish, Dan Yocum, and Albert Corbett. "A multi-view intelligent editor for digital video libraries." In Proceedings of the 1st ACM/IEEE-CS joint conference on Digital libraries, pp. 106-115, ACM, 2001.*

(Continued)

*Primary Examiner* — Frank D Mills

(57) ABSTRACT

The invention relates to social networking with a mobile computing device. The mobile computing device is provided a synchronization index, wherein the synchronization index is associated to multimedia and indicates respective times within the multimedia corresponding to a word or range of words. The mobile computing device software comprises executable program code configured to facilitate annotation of the synchronization index responsive to user input received by the mobile computing device and communicates this annotation to a second computing device via a network.

17 Claims, 47 Drawing Sheets
(39 of 47 Drawing Sheet(s) Filed in Color)

(56) References Cited

U.S. PATENT DOCUMENTS

| | | | |
|---|---|---|---|
| 7,685,132 B2 | 3/2010 | Hyman | |
| 7,962,948 B1* | 6/2011 | Girouard et al. | 725/115 |
| 8,046,411 B2 | 10/2011 | Hayashi et al. | |
| 8,112,702 B2* | 2/2012 | Badoiu et al. | 715/230 |
| 8,438,602 B2* | 5/2013 | Rao | 725/89 |
| 2003/0078973 A1* | 4/2003 | Przekop et al. | 709/204 |
| 2006/0041632 A1 | 2/2006 | Shah et al. | |
| 2006/0263037 A1* | 11/2006 | Gilley | 386/52 |
| 2006/0263038 A1* | 11/2006 | Gilley | 386/52 |
| 2006/0265657 A1* | 11/2006 | Gilley | 715/730 |
| 2007/0118794 A1 | 5/2007 | Hollander et al. | |
| 2007/0245223 A1 | 10/2007 | Siedzik et al. | |
| 2008/0092168 A1 | 4/2008 | Logan et al. | |
| 2008/0119705 A1* | 5/2008 | Patel et al. | 600/347 |
| 2008/0134054 A1 | 6/2008 | Clark et al. | |
| 2008/0184121 A1* | 7/2008 | Kulas | 715/723 |
| 2008/0319744 A1* | 12/2008 | Goldberg | 704/235 |
| 2009/0094520 A1* | 4/2009 | Kulas | 715/723 |
| 2009/0172150 A1* | 7/2009 | Alkov et al. | 709/224 |
| 2010/0005485 A1* | 1/2010 | Tian et al. | 725/32 |
| 2010/0169786 A1* | 7/2010 | O'Brien et al. | 715/738 |
| 2010/0225808 A1* | 9/2010 | Mears | 348/468 |
| 2010/0251120 A1* | 9/2010 | Chelba | 715/719 |
| 2011/0107369 A1* | 5/2011 | O'Brien et al. | 725/38 |
| 2011/0246502 A1 | 10/2011 | Aguera Y Arcas et al. | |
| 2011/0258556 A1 | 10/2011 | Kiciman et al. | |
| 2014/0067825 A1* | 3/2014 | Oztaskent et al. | 707/748 |

OTHER PUBLICATIONS

Myers, Brad A., Juan P. Casarea, Scott Stevens, Laura Dabbish, Dan Yocum, and Albert Corbett. "A multi-view intelligent editor for digital video libraries." In Proceedings of the 1st ACM/IEEE-CS joint conference on Digital libraries, pp. 106-115. ACM, 2001.*

Sack, et al., "Integrating Social Tagging and Document Annotation for Content-Based Search in Multimedia Data," In Semantic Authoring and Annotation Workshop (SAAW),Athens(GA), 2006, 4 pages.

Weng, "A Multimedia Social-Networking Community for Mobile Devices," Thesis: Interactive Telecommunications Program, New York Univerisity, 2007, 30 pages.

* cited by examiner

If User 1 designated:

begin=anno
guid=b37b01c7483ca63129143bb88fabaf2f205ff62b
user=
datetime=2006 11 29 11 56 28
pos=117 13 130 16
issues=8
end=anno And if User 2 designated:

begin=anno
guid=b37b01c7483ca63129143bb88fabaf2f205ff62b
user=
datetime=2006 11 29 11 56 28
pos=121 0 135 10
issues=8
end=anno

THE PROPER MERGE SHOULD BE:

begin=anno
guid=b37b01c7483ca63129143bb88fabaf2f205ff62b
user=
datetime=2006 11 29 11 56 28
pos=117 13 135 10
issues=8
end=anno

FIG. 9

You are adding these designations. Please assign one issue to each before the import begins.

☒ 79.3+80.18
☐ 88.1+89.5
☐ 98.1+99.2
☐ 101.1+109.5

☒ 1. damages
☐ 2. liability
☐ 3. Defendant counter
☐ 4
☐ 5
☐ 6

Current color

Add another issue.

Apply to all checked.

FIG. 10

User selects the work panes, e.g., if used for internal review, attorney may select "private" pane on left and "Master" for the middle pane. If utility is being used for "review for trial", the panes may be Plaintiff Master and Defendant Master (below), which become merged in "Case Master".

Transcript
Doe, John

Plaintiff's Work Pane (Locked and Final) | Defendant's Work Pane | Defendant's Objections | Sustain | Overrule Page 13
10 Q: So the reason that you did not
11 wear the collar last time when you were in
12 court in front of the judge is because you had
13 some errands to do? Is that your testimony,
14 Sir?
15 A: (Pause) Yes.
16 Q: What were the errands?
17 A: I don't recall
18 Q: But didn't you say that you
19 normally wear the collar when you go out of
20 the house to do anything?
21 A: Not to do anything.
22 Q: Well, when you would go --
Page 14
1 A: When I am carrying out a function
2 of ministry of the Church, then I wear the
3 collar, Sir.
4 Q: Did you think you were carrying a
5 function of the Church when you came to court
6 to hear the argument on a motion to dismiss
7 this case?
8 A: I was a bystander. I wasn't
9 involved in active engagement with ministry
10 that day.

Page 13
10 Q: So the reason that you did not
11 wear the collar last time when you were in
12 court in front of the judge is because you had
13 some errands to do? Is that your testimony,
14 Sir?
15 A: (Pause) Yes.
16 Q: What were the errands?
17 A: I don't recall
18 Q: But didn't you say that you
19 normally wear the collar when you go out of
20 the house to do anything?
21 A: Not to do anything.
22 Q: Well, when you would go --
Page 14
1 A: When I am carrying out a function
2 of ministry of the Church, then I wear the
3 collar, Sir.
4 Q: Did you think you were carrying a
5 function of the Church when you came to court
6 to hear the argument on a motion to dismiss
7 this case?
8 A: I was a bystander. I wasn't
9 involved in active engagement with ministry
10 that day.

Objection by Defendant.
FRE 403-Relevance.
Defendant makes specific reference to its Brief in Support of Summary Judgment at p. 9.

Each of Defendant's designations should, by law, correspond to one or more of Plaintiff's designations. The purpose of D's counter-designations are for "completeness".

If P elects to delete a designation, the corresponding D designation would be deleted as a consequence of their being linked. If any D designation retains a link, it stays.

Function: Require Defendant to link each designation to at least one Plaintiff designation, i.e. by dragging a "lasso". A D designation can correspond to more than one P designation.

Video runtime: Total 00:03:31
Plaintiff: 00:02:50
Defendant 00:00:41 on off
☐ ☐  Plaintiff - Initial Designation
☐ ☐  Defendant - Counter-Designation
☐ ☐

☐ ⌒ = Objection by Defendant

| | |
|---|---|
| 1 Q Thank you for that last answer. | |
| 2 Moving to the Smith article. Does the Smith article | |
| 3 have any description of the turbo confabulator? | |
| 4 A Smith? You mean the one marked as Exhibit 7? | |
| 5 Q Yes. | |
| 6 A Okay, yes. | |
| 7 Q So it does describe the turbo confabulator. | |
| 8 Does it also describe the flux capacitor? | Court: Overruled |
| 9 A No, I think you misunderstood what I said. When I | Objection by Defendant to 14.7+14.13 |
| 10 said, "Okay," I meant that I had Exhibit 7 in front of me. Looking | FRE 403 - Relevance |
| 11 at it now, it doesn't describe a turbo confabulator anywhere. In | |
| 12 fact, it describes the opposite of a turbo confabulator. Also, this | |
| 13 same article has nothing to do with a flux capacitor. | |
| 14 Q So neither is described? | |
| 15 A That's right. Neither is described in Smith. Here | |
| 16 Exhibit 7. | Court: No ruling |
| 17 Q Moving to some of the numbers we discussed. How | Objection by Defendant to 14.17+15.1 |
| 18 did you value your invention at $50 million. | FRE 801 – Hearsay. <Sentences of |
| 19 A Steve Jobs told me it was worth $50 million. Microsoft | explanation can be placed here and still |
| 20 negotiated something similar for well over $50 million. We also | be displayed neatly and substantially |
| 21 had offers at the time for licenses from Google, Netflix, and | adjacent to the designation at issue. |
| 22 Facebook. I talked with Mark Zuckerberg himself, and that's | This is sample text. This text can cite the |
| Page 14 | location of a more complete briefing on |
| | the issue if needed.> |
| 1 what he said. Fifty to seventy five, at least. | |
| 2 Q So these were conversations with Jobs and | |
| 3 Zuckerberg? | |
| 4 A Yes. And then each of their lawyers made their written | |
| 5 offers. It was clear they wanted to avoid the NTP v. Research | |
| 6 in Motion situation down the road. Just get the license out of | |
| 7 the way. | |
| 8 Q Do you have a Facebook account? | |
| 9 A I do now. | |
| 10 Q So do I. Think we should friend one another? | |
| 11 A Sir, there is nothing I'd like more. I bet you post | |
| 12 something witty every day. | |
| 13 Q So you said $50 million. And then you said | |
| 14 Zuckerberg told you as much as seventy-five. That's a big | |
| 15 range, so what do you consider the value? | |
| 16 A Well, the high end of that range. My understanding is | |
| 17 that the number would be something for the jury to decide. | |
| 18 They'd determine the reasonable royalty and calculate the final | KEY |
| 19 number. I understand our damages expert will be | Plaintiff's designation ●On ○Off |
| 20 supplementing his final report this week. The reasonable | Defendant 1 designation ●On ○Off |
| 21 royalty is more than the $40 million conclusion of your expert, | Defendant 2 designation ○On ●Off |
| 22 Mr. Anderson. | Non-designated text = displayed |
| Page 15 | |

Transcript excerpt (Page 14):

2  Moving to the Smith article. Does the Smith article
3  have any description of the turbo confabulator?
4  A  Smith? You mean the one marked as Exhibit 7?
5  Q  Yes.
6  A  Okay, yes.
7  Q  So it does describe the turbo confabulator.
8     Does it also describe the flux capacitor?
9  A  No, I think you misunderstood what I said. When I
10 said, "Okay," I meant that I had Exhibit 7 in front of me. Looking
11 at it now, it doesn't describe a turbo confabulator anywhere. In
12 fact, it describes the opposite of a turbo confabulator. Also, this
13 same article has nothing to do with a flux capacitor.

(Court: Overruled — Objection by Defendant to 14.7+14.13 FRE 403 - Relevance)

17 Q  Moving to some of the numbers we discussed. How
18 did you value your invention at $50 million.
19 A  Steve Jobs told me it was worth $50 million. Microsoft
20 negotiated something similar for well over $50 million. We also
21 had offers at the time for licenses from Google, Netflix, and
22 Facebook. I talked with Mark Zuckerberg himself, and that's Page 14

(Court: No ruling — Objection by Defendant to 14.17+15.1 FRE 801 – Hearsay. <Sentences of explanation can be placed here and still be displayed neatly and substantially adjacent to the designation at issue. This is sample text. This text can cite the location of a more complete briefing on the issue if needed.>)

1  what he said. Fifty to seventy five, at least.
   Click to collapse non-designated text → In printed output (as an option), these long white gaps would be eliminated, leaving only testimony designated by a party.
Electronically, chevrons may allow a user to expand/collapse these portions.
This transcript copy can be provided to the Court or the Court's court reporter at trial.

13 Q  So you said $50 million. And then you said
14 Zuckerberg told you as much as seventy-five. That's a big
15 range, so what do you consider the value?
16 A  Well, the high end of that range. My understanding is
17 that the number would be something for the jury to decide.
18 They'd determine the reasonable royalty and calculate the final
19 number. I understand our damages expert will be
20 supplementing his final report this week. The reasonable
21 royalty is more than the $40 million conclusion of your expert,
22 Mr. Anderson.

Page 15

→ Dark line, or other graphic, to indicate a range of lines has been omitted

KEY
Plaintiff's designation      ● On  ○ Off
Defendant 1 designation      ● On  ○ Off
Defendant 2 designation      ○ On  ● Off
Non-designated text = NOT displayed Dark line, or other graphic, to indicate a range of lines has been omitted

Court: Overruled
Objection by Defendant to 14.7+14.13
FRE 403 - Relevance

Court: No ruling
Objection by Defendant to 14.17+15.1
FRE 801 – Hearsay. <Sentences of explanation can be placed here and still be displayed neatly and substantially adjacent to the designation at issue. This is sample text. This text can cite the location of a more complete briefing on the issue if needed.>

2  Moving to the Smith article. Does the Smith article
3  have any description of the turbo confabulator?
4  A  Smith? You meant the one marked as Exhibit 7?
5  Q  Yes.
6  A  Okay, yes.
7  Q  So it does describe the turbo confabulator.
8      Does it also describe the flux capacitor?
9  A  No, I think you misunderstood what I said. When I
10     said, "Okay", I meant that I had Exhibit 7 in front of me. Looking
11     at it now, it doesn't describe a turbo confabulator anywhere. In
12     fact, it describes the opposite of a turbo confabulator. Also, this
13     same article has nothing to do with a flux capacitor.
                                                      Page 14
17  Q  Moving to some of the numbers we discussed. How
18     did you value your invention at $50 million.
19  A  Steve Jobs told me it was worth $50 million. Microsoft
20     negotiated something similar for well over $50 million. We also
21     had offers at the time for licenses from Google, Netflix, and
22     Facebook. I talked with Mark Zuckerberg himself, and that's
1   what he said. Fifty to seventy-five, at least.
13  Q  So you said $50 million. And then you said
14     Zuckerberg told you as much as seventy-five. That's a big
15     range, so what do you consider the value?
16  A  Well, the high end of that range. My understanding is
17     that the number would be something for the jury to decide.
18     They'd determine the reasonable royalty and calculate the final
19     number. I understand our damages expert will be
20     supplementing his final report this week. The reasonable
21     royalty is more than the $40 million conclusion of your expert,
22     Mr. Anderson.
                                                      Page 15

KEY
Plaintiff's designation         ●On ○Off
Defendant 1 designation         ●On ○Off
Defendant 2 designation         ○On ●Off
Non-designated text = NOT displayed

Fig. 13B

Printed Page Output – Landscape Option

KEY
Plaintiff's designation ⦿ On ○ Off
Defendant 1 designation ⦿ On ○ Off
Defendant 2 designation ○ On ⦿ Off
Non-designated text = displayed 1  Q   Thank you for that last answer.
2      Moving to the Smith article. Does the Smith article
3  have any description of the turbo confabulator?
4  A   Smith? You mean the one marked as Exhibit 7?
5  Q   Yes.
6  A   Okay, yes.
7  Q   So it does describe the turbo confabulator.
8      Does it also describe the flux capacitor?
9  A   No, I think you misunderstood what I said. When I
10 said, "Okay" I meant that I had Exhibit 7 in front of me. Looking
11 at it now, it doesn't describe a turbo confabulator anywhere. In
12 fact, it describes the opposite of a turbo confabulator. Also, this
13 same article has nothing to do with a flux capacitor.
14 Q   So neither is described?
15 A   That's right. Neither is described in Smith. Here
16 Exhibit 7.
17 Q   Moving to some of the numbers we discussed. How
18 did you value your invention at $50 million.
19 A   Steve Jobs told me it was worth $50 million. Microsoft
20 negotiated something similar for well over $50 million. We also
21 had offers at the time for licenses from Google, Netflix, and
22 Facebook. I talked with Mark Zuckerberg himself, and that's Page 14

Court: Overruled
Objection by Defendant to 14.7+14.13
FRE 403 - Relevance

Court: No ruling
Objection by Defendant to 14.17+15.1
FRE 801 – Hearsay. <Sentences of
explanation can be placed here and still
be displayed neatly and substantially
adjacent to the designation at issue.
This is sample text. This text can cite the
location of a more complete briefing on
the issue if needed.>

Transcript — Doe, John

Page 13
10  Q: So the reason that you did not
11  wear the collar last time when you were in
12  court in front of the judge is because you had
13  some errands to do? Is that your testimony,
14  Sir?
15  A: (Pause) Yes.
16  Q: What were the errands?
17  A: I don't recall
18  Q: But didn't you say that you
19  normally wear the collar when you go out of
20  the house to do anything?
21  A: Not to do anything.
22  Q: Well, when you would go —
Page 14
1  A: When I am carrying out a function
2  of ministry of the Church, then I wear the
3  collar, Sir.
4  Q: Did you think you were carrying a
5  function of the Church when you came to court
6  to hear the argument on a motion to dismiss
7  this case?
8  A: I was a bystander. I wasn't
9  involved in active engagement with ministry
10  that day.

Objections — Sustain | Overrule

Objection by Defendant Lusk.
FRE 403-Relevance. Defendant makes specific reference to its Brief in Support of Summary Judgment at p. 9.

Video runtime:  Total        00:03:31
                Plaintiff:   00:02:50
                Defendant    00:00:41

Deposition Video — 9:51:54AM MAR 31 2009 — 00:20:04.7

Show/hide certain issues — on/off

☐ Plaintiff Smith- Initial Designation
☐ Defendant Lusk- Counter-Designation

☐ ⌐ = Objection by Defendant Lusk

— Chevrons to expand/collapse non-designated sections of testimony. Allows reader to read only those portions of the transcript that have been designated.

— Double click on any line of testimony causes video to begin playing at that location.

— Calculates the would-be video run-time without creating the video clips.

— Region to expand/contract/accordion objections with a significantly long text description — Option: Allow Judge to rule upon objections within the application. "Sustain objection"=designation is prohibited from coming in to evidence.
"Overrule objection"=designation may still be offered into evidence.
For each, allow Judge a place to attach a comment, providing, if he wishes, a written description for reasons why the ruling was made. In this fashion, there is an opportunity to create a full, complete record for an appellate Court's review.

```xml
<?xml version="1.0" encoding="UTF-8" ?>
<DEPOSITION>
    <PAGE pbk="T" T="0" n="1" a="1">
        <LINE pbk="F" T="0" end_T="2816" n="1" p="1" a="1">
            <lnum>1</lnum>
            STATE OF MINNESOTA DISTRICT COURT
        </LINE>
        <LINE pbk="F" T="0" end_T="2816" n="2" p="2" a="2">
            <lnum>2</lnum>
            COUNTY OF HENNEPIN THIRTY-EIGTH JUDICIAL DISTRICT
        </LINE>
        <LINE pbk="F" T="0" end_T="2816" n="3" p="3" a="3">
        <LINE pbk="F" T="244661" end_T="246826" n="15" p="15" a="190">
            <lnum>4</lnum>
            <W pbk="F">
                <w>Word1</w>
                <t>244661</t>
                <end_t>245429</end_t>
            </W>
            <W pbk="F">
                <w>And</w>
                <t>245429</t>
                <end_t>245748</end_t>
            </W>
            <W pbk="F">
                <w>Word2</w>
                <t>246038</t>
                <end_t>246197</end_t>
            </W>
        </LINE>
    </PAGE>
    <MEDIA Name="demo4min.mpg" Duration="247838" TranStart="5:3" TranEnd="8:15" />
    <CONTINUING>0</CONTINUING>
    <DEPONENT_LAST>test</DEPONENT_LAST>
    <DEPONENT_FIRST>test</DEPONENT_FIRST>
    <DEPO_DATE>2005-12-14 00:00:00</DEPO_DATE>
    <CAPTION />
    <START_PAGE>1</START_PAGE>
    <PAGE_COUNT>8</PAGE_COUNT>
    <DIRECT_ATTORNEY>Attorney</DIRECT_ATTORNEY>
    <SHORT_CAPTION>test</SHORT_CAPTION>
    <LINES_PER_PAGE>25</LINES_PER_PAGE>
</DEPOSITION>
```

FIG. 17

Linked Exhibit

Exhibit

Transcript
Doe, John

Page 13
10 Q: So the reason that you did not
11 wear the collar last time when you were in
12 court in front of the judge is because you had
13 some errands to do? Is that your testimony,
14 Sir?
15 A: (Pause) Yes.
16 Q: What were the errands?
17 A: I don't recall
18 Q: But didn't you say that you
19 normally wear the collar when you go out of
20 the house to do anything?
21 A: Not to do anything.
22 Q: Well, when you would go –
Page 14
1 A: When I am carrying out a function
2 of ministry of the Church, then I wear the
3 collar, Sir.
4 Q: Did you think you were carrying a
5 function of the Church when you came to court
6 to hear the argument on a motion to dismiss
7 this case?
8 A: I was a bystander. I wasn't
9 involved in active engagement with ministry
10 that day.

Deposition Video

9:51:54AM MAR 31 2009

00:20:04.7

Video runtime: Total      00:03:31
              Plaintiff:  00:02:50
              Defendant   00:00:41

Fig. 18

Plaintiff - Initial Designation
Defendant - Counter-Designation on  off

FIG. 29

| Page, Line | Timestamp | 1 | 2 | 3 | 4 | 5 | 6 | 7 | ........ | X |
|---|---|---|---|---|---|---|---|---|---|---|
| $Page_0, Line_0$ | | | | | | | | | | |
| $Page_0, Line_1$ | | | | | | | | | | |
| $Page_0, Line_2$ | | | | | | | | | | |
| | | | | | | | | | | |
| | | | | | | | | | | |
| | | | | | | | | | | |
| $Page_n, Line_n$ | | | | | | | | | | |

FIG. 39

METHODS AND SYSTEMS FOR FACILITATING AN ONLINE SOCIAL NETWORK

CROSS REFERENCE TO RELATED APPLICATIONS

This application is a continuation of U.S. patent application Ser. No. 13/851,813, entitled "Text-Synchronized Media Utilization and Manipulation Based on an Embedded Barcode," which is a continuation-in-part of U.S. patent application Ser. No. 13/342,865, entitled "Text-Synchronized Media Utilization and Manipulation," which claims priority to U.S. Provisional Patent Application Ser. No. 61/429,399, entitled "Text-Synchronized Media Utilization and Manipulation," which are all herein incorporated by reference in their entirety.

BACKGROUND

Today, multimedia content can be recorded, displayed, and accessed on a wide variety of platforms including mobile computing devices, such as laptops, tablet computers, smart phones, etc. In general, multimedia may comprise a combination of text, audio, images, animation, video, or interactive content.

Unfortunately, it remains difficult to encode and synchronize text that is associated with a multimedia file. For example, the judicial system requires production and review of a substantial amount of information including audio and visual evidence, document production and review of written and electronically generated information, and testimony of various involved parties. Testimony is understood to be a process by which an attorney asks oral questions of a witness and the witness provides answers under oath. A word-for-word record of the questions asked and the answers given is called the testimony transcript. Testimony is normally taken and recorded during a deposition or a trial. During a trial or deposition, testimony is recorded by a court reporter using a special typewriter-like device normally referred to as a stenograph machine. The output of the stenograph machine is a long paper tape of printed phonetic characters capturing, in a form of short hand, the word-for-word record of the testimony. The court reporter uses the paper tape to create a text translation of the tape or text data. This text data is created using a typewriter or a word processor. The text data is referred to as a transcript of the testimony and is historically created "off-line" from the actual testimony.

During the discovery and research phase of litigation, the attorney will search through testimony for key statements made by a witness. The attorney uses software tools for searching and annotating the ASCII testimony or text data.

A shortcoming of some transcript management utilities is that they operate on a full version of Microsoft Windows operating system, which places large demands on processor speed and RAM memory. As a result, the full Microsoft Windows operating system is unsuitable for mobile computing devices, and they cannot run transcript management utilities. The result is that there has been no transcript management utility for display of smoothly scrolling, synchronized text and multimedia for use on a mobile computing device, where the user may perform a gesture on the text to cause the multimedia to jump to a desired location and begin playback.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Systems and methods which embody the various features of the invention will now be described with reference to the following drawings, in which:

FIG. 9 illustrates example data structures that may be used in merging designations.

FIG. 10 illustrates an example interface for assigning issues to designations.

FIGS. 11A-C illustrates an example interface where each party has its own work pane display of a transcript.

FIG. 12 illustrates an example printed page output in a portrait view.

FIGS. 13A-B illustrates an example printed page output showing only designated portions of a transcript.

FIG. 14 illustrates an example printed page output in a landscape view.

FIG. 16 illustrates an example interface for annotating evidentiary rulings on objections.

FIG. 17 illustrates an example format for a synchronization index.

FIG. 18 illustrates an example of a linked exhibit.

FIG. 29 illustrates an exemplary screen shot of a mobile device for a deposition video and transcript with a summary section on the display.

FIG. 39 illustrates an exemplary data structure for the synchronization index.

SUMMARY

Figure 1:
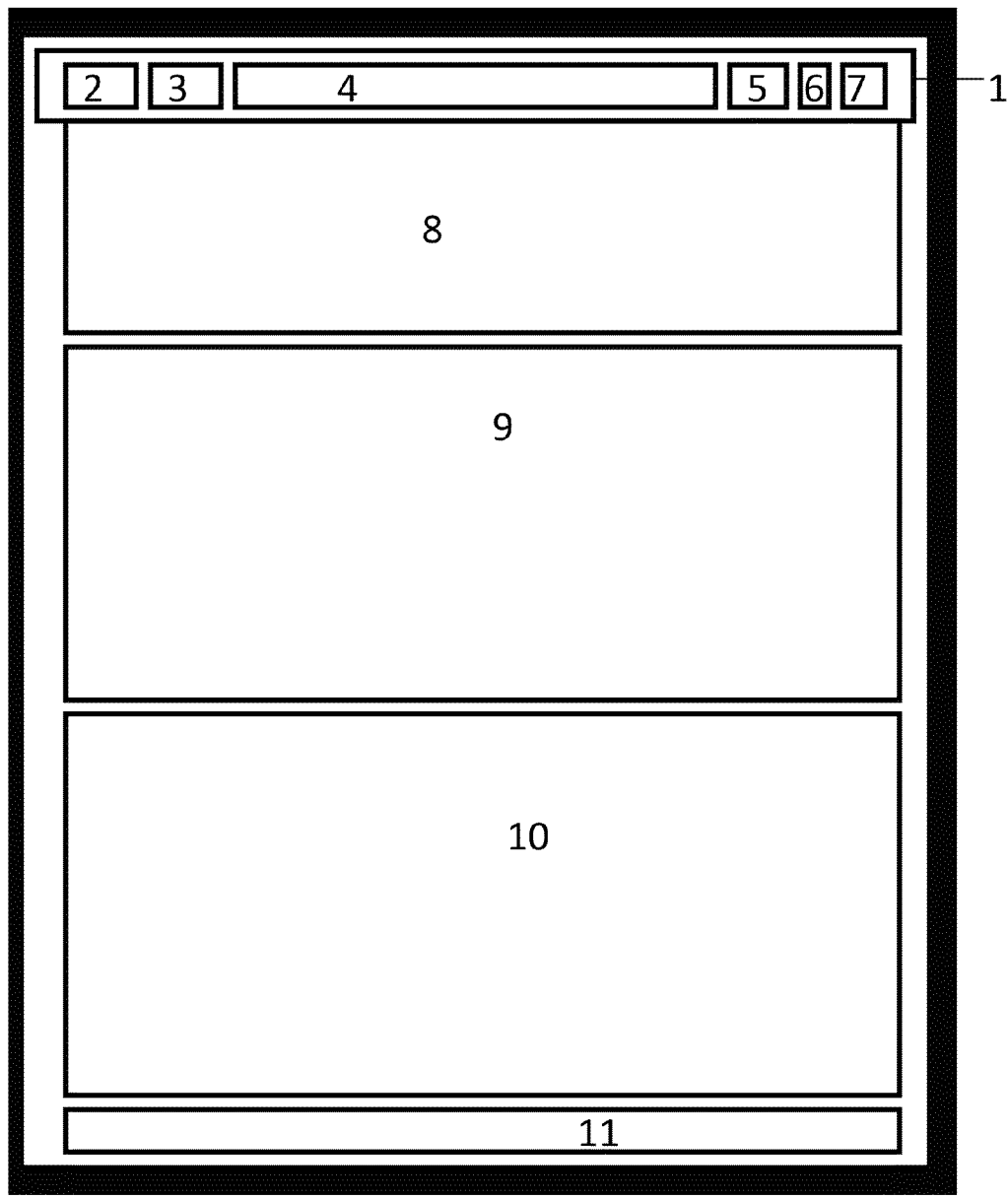
FIG. 1 is a representation of the viewing screen layout of a mobile computing device, partitioned into several areas.

In one embodiment, what is disclosed is a method for social networking with a mobile computing device. The method comprises providing for use on a mobile computing device a synchronization index, wherein said synchronization index is associated to multimedia, wherein the synchronization index comprises an electronic transcript that indicates text corresponding to audio from the multimedia, and wherein the synchronization index indicates respective times within the multimedia corresponding to when a word or range of words is audible in the multimedia. The method also involves providing mobile computing device software, wherein said mobile computing device software comprises executable program code configured to receive the synchronization index, wherein said mobile computing device software comprises executable program code configured to facilitate annotation of a portion of said synchronization index responsive to user input received by the mobile computing device; and communicating said annotation to a second computing device via a network.

In another embodiment, what is disclosed is method for social networking relating to multimedia. Multimedia is provided. A synchronization index is provided that comprises an electronic transcript of text corresponding to at least a portion of audio from said multimedia and indicates respective times within the multimedia corresponding to a word or range of words, wherein said synchronization index provides association between at least one portion of said electronic transcript and at least one portion of said multimedia, and wherein said synchronization index is provided to a first user and at least one additional user via a network. Executable program code is provided to deep link to a predetermined point within said multimedia by using said synchronization index. Executable program code is provided to share one or more said deep links, wherein said sharing of deep links facilitates interaction between the first user and at least one additional user via a network. In another embodiment, what is disclosed is a computer system for social networking relating to multimedia. The computer system comprises one or more processors for executing executable program code. The system also has executable program code configured to provide multimedia; executable program code configured to provide a synchronization index, wherein said synchronization index is associated to said multimedia, wherein the synchronization index comprises an electronic transcript that indicates text corresponding to audio from the multimedia, and wherein the synchronization index indicates respective times within the multimedia corresponding to a word or range of words, wherein said synchronization index is shared with a plurality of users; executable program code configured to provide facility for a user to deep link to a predetermined point within said multimedia by using said synchronization index; and executable program code configured to provide facility for a plurality of users to share said deep links, wherein said sharing of deep links facilitates interaction between a first user and at least one additional user via a network.

DETAILED DESCRIPTION

Techniques are described for deploying a synchronization index and associated media (e.g., multimedia), for manipulations to the synchronization index, for navigation between the synchronization index and associated media (e.g., multimedia), and for synchronous playback of media (e.g., multimedia) and associated text, preferably using a mobile computing device. For example, a system may use multimedia with a synchronized text transcription thereof, or a synchronization index, on a mobile computing device for viewing and manipulating the multimedia, using the synchronized text transcription. In this example, the mobile computing device may be used to navigate the multimedia, annotate the text transcription, achieve synchronous play of the multimedia, and communicate to a computer other than the mobile computing device (e.g., a remote server) manipulations performed on the text or multimedia.

In one aspect, a system enables viewing and manipulating synchronized multimedia and text data stored on a remote server. The system may use multimedia with a synchronized text transcription thereof, or a synchronization index, on a mobile computing device for viewing and manipulating the multimedia, using the synchronized text transcription to navigate the multimedia and vice versa, optionally annotating the text transcription, and communicating to a computer other than the mobile computing device manipulations performed on the text or multimedia.

More generally, in some implementations, a system enables viewing and manipulating multimedia and text data. Specifically, multimedia and an associated synchronization index are communicated to a remote server. The remote server operates to re-format the synchronization index and communicate it to a mobile computing device. With the mobile computing device, its software, and the synchronization index, the user may then perform manipulations on the text and control the multimedia delivery to the mobile computing device, or to a separate receiving device. A user having performed manipulations to the synchronization index may then communicate those manipulations back to the remote server to allow subsequent users to retrieve the synchronization index for use with their own mobile computing devices, thereby realizing a collaborative working environment.

More recently, stenograph machines and computer software programs have been developed which translate the phonetic characters while the stenograph operator is typing. The output of this automated translation is a stream of ASCII characters or text data that is stored on a disk, data card (or other portable storage device), or in a personal computer attached directly to the stenograph machine by a serial communications link. These types of stenograph machines and the associated computer and software are referred to as Computer-Aided Transcription or CAT systems. The text data output of the CAT system is an ASCII text computer file of the testimony. The court reporter edits the ASCII file to create a completed version of the transcript, which can be viewed on a computer or can be printed. Typically, the court reporter then forwards the completed version of the transcript to a court reporting firm for quality review; standardization of formatting, to include page and line numbers, headers and/or footers, information to identify the court reporting agency and provide contact information, certification pages, and so on; and production and distribution to the attorneys and/or the court. The transcript is then a "final" transcript, and it may be formatted in a number of formats for litigation related software applications and printing.

Along with the development of CAT systems, video capture devices have advanced the art of making a record of testimony, most commonly employed as part of the deposition process. In major and/or complex litigation cases, testimony from depositions and/or a trial is video recorded in addition to having a transcript created. The person performing the video recording is called a videographer. The videographer uses a standard, commercially available video capture device. Video recording proceeds simultaneously with the creation of the written record of the testimony by the court reporter. After the testimony is complete, the lawyer will normally ask the court reporter for a copy of the text data or ASCII text file of the testimony and will ask the videographer for a copy of the video data of the testimony.

The video recording has historically been recorded to a tape media, which videotapes are commercially available in a number of sizes and formats. The videographer typically later encodes the content into an electronic format with commercially available playback and encoding equipment. A common encoding format for the legal industry is MPEG-1, as MPEG-1 functions with substantial stability with commercially available trial presentation software applications.

Transcript Management

A lawyer uses the ASCII file for many purposes including review and research of the deposition testimony, preparation for trial, and research prior to cross examination during trial. A variety of software tools have been developed which, among other things, allow a lawyer to electronically search testimony text for key words, to annotate, to insert page marks, to associate certain portions of testimony with issues and to create printouts of testimony for insertion in pleadings, submissions to the court, and trial presentations.

During the discovery and research phase of litigation, the attorney will search through testimony for key statements made by a witness. The attorney uses software tools for searching and annotating the ASCII testimony or text data.

A shortcoming of some transcript management utilities is that they operate on a full version of Microsoft Windows operating system, which places large demands on processor speed and RAM memory. As a result, the full Microsoft Windows operating system is unsuitable for mobile computing devices, and they cannot run transcript management utilities. The result is that there has been no transcript management utility for display of smoothly scrolling, synchronized text and multimedia for use on a mobile computing device, where the user may perform a gesture on the text to cause the multimedia to jump to a desired location and begin playback.

To understand some problems associated with transcript management, it is important to understand how a team of attorneys collaboratively works on a transcript. First, a team of attorneys reviews a transcript internally within the law firm or legal department. This internal review may be done by several attorneys, by a junior associate who has his work checked by a more senior attorney, by a paralegal, or in conjunction with the legal client or corporate representative who may have knowledge about the testimony or an interest in the litigation. The purpose of the internal review is to determine what questions and answers may be useful either in upcoming depositions, during settlement negotiations, for use in legal briefs, or at trial. Internal review is where "issue codes" are important. The term issue code refers generally to a range of words selected within a transcript and labeled to correspond to an issue within the litigation.

The circumstance may exist after a deposition where a paralegal, or other professional, may be asked to review the transcript and to annotate it for the law firm partner who is preparing to depose another witness, say, an expert witness. Accordingly, the partner would ask the paralegal to "issue code" all sections of the transcript relating to the partner's anticipated line of questioning of the new witness, for example, to explore inconsistencies from one witness to another. The paralegal does the review, and issue codes several parts of the transcript, say, in yellow. Before the deposition, the partner will come back to the transcript and read, as quickly and efficiently as possible, only those yellow sections. This process may occur for several issues, each of which may overlap and be a different color. The transcript itself can, if all issues are viewed simultaneously, become too busy to read, as overlapping colors bleed into one another, the number of colors become distracting as the numbers of issues increase, and so forth.

The goal of a legal team before trial is to piece together a coherent story using very discrete deposition designations, or video clips corresponding to deposition designations. These designations will support the credibility of legal briefs to the court, and such deponent testimony is frequently cited and footnoted accordingly.

In transitioning to trial, the "issue codes" as above become only secondarily useful. At that point, the primary purpose of the transcript management utility is to select only the best material to use in court. Assume a deponent has died and cannot, obviously, testify on the witness stand. The attorneys will be able to show his video recorded deposition in court, pursuant to the rules of evidence. The law firm will pare down the deponent's testimony to the best segments possible, for example as a highlight reel, leaving out the testimony that would tend to undermine the coherent story that they are trying to tell in court. This is typically a subset of the material already issue coded. Video run time is often a key consideration, 1) because the court can allocate a certain number of hours for one side to present its entire case, in an effort to get to the heart of the controversy and to respect the jury's time, and 2) because too much video can be boring for the jury to watch, causing them to cease paying attention or fail to appreciate the relevance of the testimony to the overall dispute.

Accordingly, the plaintiff's attorneys have a time before trial by which they need to identify to the defendants, and the court, which portions of testimony they intend to rely upon at trial. For this reason, plaintiff's attorneys will need to 1) shorten, modify, or eliminate testimony they have already issue coded, 2) "flatten" the issue codes into one common issue code, i.e. "Plaintiff's direct designations", and 3) transmit them to the defendant.

The defendant will then take "Plaintiff's direct designations" and add back all the material that would be helpful for defendant's case. Defendant's objectives are to 1) undermine the credibility of the witness, 2) lessen the impact of the testimony designated by the opposing party, 3) confuse the jury, or 4) add back so much material that it becomes difficult for a jury to understand the importance of the testimony as a whole or the reasons for which it is being proffered for the jury's consideration. These would be "issue coded" as, say, "Defendant's counter designations." This process may occur again with counter-counter designations by each party.

The trial consultant, generally an individual with information technology and trial presentation software expertise, is tasked with displaying with a computer in the courtroom only the proper video segments. Other than to provide an accurate accounting of what video run time is to be allocated against plaintiff's total allotted time and defendant's allotted time, the trial consultant is indifferent as to what clip "belongs" to whom. All of the designations, once finalized by the attorneys, should be "flattened", giving the consultant the fewest number of edit points to "fine tune." Accordingly, there is one merge of designations done after internal review when preparing for trial, and one merge done when a plaintiff and a defendant have absolutely finalized the designations and given them to the trial consultant.

Without the techniques described throughout this disclosure, transcript management and communication between parties and the court may be a process plagued with inefficiencies.

Timestamping a Transcript

In addition to having the written transcript organized and available to the attorney whilst eliciting testimony at trial, the need frequently arises to present to the court and jury a specific part of the testimony. When testimony has been video recorded, it is desirable to have the ability to use the video associated with key statements to impeach, to expose an inconsistency between a witness's in-court testimony and earlier testimony, to show a witness's demeanor, and so forth. As an examining attorney, having access to a witness's videotaped deposition, and having the witness know retrieval and display of prior testimony is a possibility, is also a strong psychological tool that can affect a witness's performance on the witness stand.

To view the video, the attorney historically had to have access to a VCR, a DVD player, a video player or DVR device and either a TV screen or monitor. With the advent of trial presentation software, along with advances in computing speed and storage capacity, attorneys and their trial consultants can link, or marry, the deposition transcript to the deposition video. This process is commonly referred to in the legal industry as "timestamping" a transcript.

The important job of synchronizing multimedia to a transcript or text data may be done by a human operator (either by a law firm or a third party vendor) using trial management software, or through a third party vendor who utilizes voice recognition software, or a combination of voice recognition software with a human quality review check. Other methods may be employed for creating closed captioned and/or subtitled outputs for use by the hearing impaired, and the multiplicity of methods to create synchronization indexes enhances the number of potential uses for the techniques described throughout this disclosure. Problems arise as the parties move through the litigation process and are tasked with synchronizing video data and text data, and they are further burdened with using disparate software applications to accomplish issue coding, annotating, editing, time stamping, video clip creation, video clip review, report creation to detail video clip duration, errata sheet tracking, and distribution of content to opposing parties, clients, and the court.

Regarding timestamping a transcript, one day of deposition testimony for one deponent is almost always comprised of more than one video segment. One video segment generally corresponds to one videotape the videographer fills during the deposition and later encodes to a single MPEG-1 file, the legal industry standard format for video encoding. Depending on videotape stock and format, one video tape will hold about an hour of content, and most often no more than two hours of content, while most depositions run longer than two hours. There is typically only one transcript for each deposition. An attorney needs to be able to associate the single transcript to the multiplicity of video files.

For example, it is common within the court reporting and legal videography industry for a 3-hour deposition of a deponent to be split between three videotapes, each an hour in duration, that would be encoded as x.mpg for time-code zero to hour 1, x1.mpg for hour 1 to hour 2, and x2.mpg for hour 2 to 3. Within some trial management utilities, x.mpg, x1.mpg, and x2.mpg are sequenced, for a 3 hour total duration, and associated with the single transcript. Using a trial management utility, the user reads the transcript while the video plays and presses a key when the last word on a line is spoken to have the software note the time at which the input was made and note it in a table adjacent to the line of testimony.

In some trial management utilities, the resultant timestamped file, or synchronization index, is a Microsoft Access formatted database file, in .mdb format, with a column of timecode run duration that runs sequentially from hour zero to hour three. Accordingly, a user of a trial management utility wishing to have the software call a line of testimony at timecode 02:30 would be pointed to 00:30 of x2.mpg. Calling testimony at time-code 01:45 would call x1.mpg at 00:45, and so on. In this fashion, the timestamped transcript, or synchronization index, allows the attorney to use the transcript as a roadmap, while the software seeks first the correct video file, then seeks to the correct location within the video file, then displays each in congruent, synchronous fashion by refreshing the display of the transcript as the timecode associated with each new transcript line is reached.

FIG. 39 illustrates an exemplary data structure for the synchronization index. As shown, the synchronization index comprises entries for each line having a predetermined number of characters, such as 256 characters, and each page may have a predetermined number of lines. For each line, the synchronization index indicates a timestamp and coordinate for each character. The synchronization index assists in synchronizing multimedia content, such as audio and/or video clips, with transcripts of text.

In some cases, it has been very difficult for users to create video clips or audio clips in software, especially with known trial presentation software, that correspond to issue codes created within transcript management software. Users have been faced with a multiplicity of software applications, the combination of which are difficult to learn and use, expensive to purchase, and impossible to jointly manage, particularly on mobile computing devices.

Trial Preparation

Trial presentation software applications have become an indispensable tool to today's litigators. These applications allow organization, quick access to and broadcast of all types of material the litigator needs at trial, including trial exhibits, demonstrative exhibits, multimedia, animations, transcripts, video testimony, timelines, images and so on. Most trial presentation utilities are characterized by running only on a computer using a full version of the Microsoft Windows operating system (which itself requires a computer comprising at least a 233 MHz processor, 64 MB of RAM, and 1.5 GB of available hard drive space), by requiring extensive training and practice to achieve an acceptable level of competence, by costing hundreds of dollars to purchase or rent, by necessity of payment of yearly maintenance fees to maintain an active license and access to technical support, and by frequently requiring a paid litigation consultant to operate it competently in a courtroom environment. Each, and the combination, is replete with a number of shortcomings effecting the efficiency of litigation practice.

Transcript Errata Sheets

To illustrate just one of the problems associated with transcript management, one may look to the errata sheet used in litigation. The Federal Rules of Evidence (Rule 30), and other local rules patterned after them, allow a period of time after a deposition for the deponent to review the written transcript for errors before it is signed and returned as an accurate transcription of the testimony. Commonly, the witness will read through the transcript, note what he believes to be errors, and note them in what is referred to in the legal industry as an "errata sheet." A copy of this errata sheet is signed by the witness, returned to the court reporter or opposing counsel, and physically affixed to the hardcopy of the official transcript as an appendix. Thus, the witness's signature is an attestation to the accuracy and completeness of the court reporter's transcription which, if all errata denoted are remedied, would comprise the final, official transcript to be submitted to the court. Accordingly, there historically has been no notation in the original transcript at the point where a correction was made that would refer the reader to the correction in the errata sheet.

Moreover, and perhaps more problematically, content on an errata sheet is never added to or affixed to the electronic copy of a transcript, which is often in a .txt format. It is this .txt formatted transcript that is loaded into commercially available trial presentation software. For example, if a .txt transcript is loaded into a trial management utility, the trial management utility creates a Microsoft Access database table (.mdb format) formatted to take one line of text and places it in one of the database cells. This database, and the content of the cells, is called upon by the trial management utility when videotaped deposition testimony is played to give the appearance of synchronized, scrolling text beneath a video image. Since the corrections of the errata sheet never make their way into the .txt transcript, they never make their way into the trial presentation software, and they are never displayed, as they should be, as part of the synchronized, scrolling text beneath the video image.

The disparity between words clearly audible from the videotape and the written transcript is often noticed, if at all, on the eve of trial, by the trial consultant. Text that does not match the video recording is problematic because, according to procedural rules, it is the written transcript that is the official record and it is that record that is passed on to appellate courts and preserved in the record. It can be problematic and confusing if a jury is shown video testimony that does not exactly match the scrolling text that may be displayed with it. It can be further problematic and confusing, particularly to an appellate court, if a jury is shown video testimony without any scrolling transcript, where the written transcript may, in fact, contradict the words spoken on the video.

Prior to the techniques described throughout this disclosure, there has been no systemic way to ensure errata sheet corrections functioned in concert with trial presentation software.

Certain Closed Captioning, Subtitling and Historic Uses of Text

Closed captioning text and karaoke-type subtitles may present a number of shortcomings emblematic of the art before the techniques described throughout this disclosure. First, closed captioned text is configured to display over a part of the video screen, thereby obscuring at least a part of the video display itself. Second, closed captioned text often appears as text with a background graphic, for example an opaque or semi-opaque box layered between the video and the individual text characters. As a consequence, more of the video display area is covered than would be the case if the individual characters were alone displayed. Third, a user in general can only select to have closed captions "on" (or displayed), or "off" (not displayed.) Fourth, a user cannot generally select text display font, color, or size. Fifth, a user cannot perform a text search. Sixth, a user cannot view text that does not correspond to the portion of video being viewed, that is, they are inextricably linked and cannot be separated apart from turning the text display "off." Seventh, the text cannot be highlighted, annotated, bookmarked, associated with a note, nor can any of the above be used to navigate within the video. Eighth, a user cannot provide a link to the text to a second user, intending for the second user to begin video playback at a time certain based on the linked text. Ninth, closed captioning is not optimized for use with mobile computing devices, or display screens of relatively small size. Tenth, closed captioning text data is difficult to alter, as it is transmitted as an integral part of a video signal. In the case of "open subtitles" the subtitles are permanently placed into the video frame itself and cannot be removed.

Eleventh, another pitfall of closed captioning occurs as a result of a limited number of text words being able to be displayed at once, whereas in certain circumstances a more complete text transcript would be more preferable. For instance, song lyrics have the characteristics of poetry, or a complete story. The context of the words within the overall composition may have meaning to the artists, or to the reader, when read as a whole, rather than one line at a time or a few words at a time. Twelfth, closed captions are most often employed by the hearing impaired or in environments where audio for video is not readably audible, for example in a restaurant or bar. Consequently, the vast majority of users who consume multimedia content do not seek to utilize closed captioned text even when it is made available, and many may not even be aware that it is available as an option.

Thirteenth, closed captioning text and subtitles are not "interactive," in that a user cannot do anything with the words other than watch them appear on screen when the video plays. The user cannot move ahead or backward in the transcription, and the user cannot read any words other than the limited number of lines than can fit on the video screen, obscuring part of the screen. Closed captioning and karaoke-type subtitles, and the information to display them in a synchronization index-type format, are characterized by passive non-interactivity, meaning there is no way for an operator to utilize the text in any way other than watching it appear and disappear, typically from the multimedia viewing area itself. The user has no opportunity to use the words in any fashion other than to read them.

By contrast, the synchronization index and software suited for use on a mobile computing device of the present disclosure is characterized by interactivity, meaning that the user is able to use the synchronous text display to accomplish another action, namely convenient navigation within the multimedia by using the text, or convenient navigation of the text by using the multimedia. Other actions may also be provided, as discussed further below, including annotation of text and provision of advertising to a mobile computing device. In the present disclosure, an enhanced overall user experience may be provided, where the text can be used as an interactive tool to facilitate navigation within corresponding media.

As is evident, transcript management for litigation is a daunting task because of continual updating, modifying, editing, issue coding, synchronization to video, video clip creation and editing, and need to communicate with the court and adversarial litigants, compounded by the multiplicity of complicated, expensive, computer-resource intensive software applications required to accomplish each task.

The techniques described throughout this disclosure may address and solve many of these shortcomings, for example by providing intuitive systems and methods to manage a synchronization index and associated multimedia with a mobile computing device.

Despite the numerous systems and methods known for manipulating transcripts, synchronizing text to video, and presenting multimedia in the courtroom, there is still a need for a system and methods to simplify the transcript management process by providing a synchronization index and associated multimedia to a mobile computing device, being in communication with a hosting server and multimedia server. In the present disclosure, a mobile computing device, with a user friendly interface, may be employed to simplify what has been a complex, problematic workflow, to synchronously display text and multimedia, to simplify navigation of multimedia, and to ease communication among disparate users.

There is also a need for systems, products, software and methods to facilitate use of mobile computing devices with synchronization indexes and corresponding multimedia for any type of multimedia that can be associated, and manipulated, by corresponding text, such as music and lyrics, video/audio books, movies and screenplays, and other multimedia recordings.

The techniques described throughout this disclosure may address one or more of these needs and may advantageously overcome one or more deficiencies of other options. Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

FIG. 1 is a representation of the viewing screen layout of a mobile computing device, partitioned into several areas. In this example, computer source code (e.g., code written in Xcode or other suitable programming language) was compiled for mobile computing devices (e.g., a tablet computer, such as the iPad, a mobile phone, such as the iPhone, etc.) running a mobile device operating system (e.g., Apple's iOS4.0/iOS4.2). Some terms used within this application may be trademarks owned by their respective owners. In the case of a tablet computer, the display screen may be divided into several main areas: the multifunction area 1, the header area 8, the media area 9, the text area 10, and the scrub-bar area 11.

The media area 9 may display output of a media file selected by a user. For example, the media area 9 may display image data in the form of a video or still image. In this example, the media area 9 may display a deposition video, a movie video, a music video, an illustration from an electronic book, or other types of media a user may desire to output. The tablet computer also may output, using a speaker, audio that corresponds to the displayed media, such as audio of a deposition video being displayed, audio of a movie being displayed, audio of a music video being displayed, audio of an electronic book for which an illustration is being displayed, etc.

The text area 10 may display a text transcript that corresponds to the media being displayed in the media area 9. For example, the text area 10 may display a text transcript of a deposition video being displayed, a text transcript of dialogue from a movie being displayed, a text transcript of lyrics of a music video being displayed, a text transcript of an electronic book for which an illustration is being displayed, etc.

The text area 10 may control display of the text transcript in a synchronized manner with the media being displayed in the media area 9. For instance, the tablet computer may identify a portion of the text transcript that corresponds to the portion of the media being displayed in the media area 9 and display the identified portion of the text transcript. The text area 10 also may include a highlight bar that serves as a position indicator, for example, by highlighting the current line of text being output as audio for the media displayed in the media area 9. In some implementations, the tablet computer controls the highlight bar to remain static and causes the text displayed in the text area 10 to scroll up as each line of audio shown in the text transcript is output. In other implementations, the tablet computer controls the highlight bar to move down a line in the text transcript as each line of audio shown in the text transcript is output and controls the highlight bar to move back to the top of the text area 10 when it reaches the bottom of the text area 10 and a new portion (e.g., page) of the text transcript is displayed in the text area 10. Other options for the highlight bar may be employed and highlighting of each word in the text transcript also may be used. The tablet computer may control display of the text transcript in a synchronized manner with the media being displayed in the media area 9 by using a synchronization index as described throughout this disclosure.

The text area 10 also may be manipulated by a user to control display of the media being displayed in the media area 9. For instance, the user may select a line in the text transcript being displayed in the text area 10 and the tablet computer may start display of the media at the point corresponding to the selected line in the text transcript. If the user selects multiple lines of the text transcript, the tablet computer may start display of the media at the first selected line in the text transcript and stop display of the media at the last selected line in the text transcript. The text transcript displayed in the text area 10 may be used to achieve other types of control of the media displayed in the media area 9, as described throughout this disclosure.

In addition, in some implementations, the tablet computer may enable a user to independently review the text transcript displayed in the text area 10. For instance, the tablet computer may enable a user to scroll through the text transcript with or without impacting the media displayed in the media area 9. Also, the tablet computer may enable a user to search the text transcript to find portions of the text transcript and corresponding media that the user would like to perceive. Further, the tablet computer may enable a user to manipulate the text transcript by, for example, adding annotations to the text transcript and designating portions of the text transcript of interest, as described throughout this disclosure. The tablet computer may send the manipulations (e.g., annotations and designations) to a remote server for remote storage and to be synchronized with other systems the user may use for annotating a text transcript and designating portions of the text transcript.

The header area 8 may display information (e.g., metadata) about the media being displayed in the media area 9 and the text being displayed in the text area 10. For instance, the header area 8 may display a title of the media, an author or director of the media, identity of actors or characters shown in the media, or any other information (e.g., metadata) that may be useful in providing additional information of the media and text being displayed.

The scrub-bar area 11 includes a scrub bar that may be used to control display of the media displayed in the media area 9 and the text displayed in the text area 10. For example, as a user moves the scrub bar control back and forth, both the media displayed in the media area 9 and the text displayed in the text area 10 may scroll in a synchronized manner.

The multifunction area 1 may include a media select icon 2, a search icon 3, a title area 4, an issue icon 5, a text font display icon 6, and an annotation icon 7. The media select icon 2 may enable a user to select media to display in the media area 9 by, for example, causing display of a directory from which the user may select a desired media file or causing display of a list of available media files for user selection. The search icon 3 may enable a user to search the text transcript displayed in the text area 10. The title area 4 may display a title of the media being output and the text font display icon 6 may enable control of font parameters of the text in the text area 10 is displayed. The issue icon 5 may enable a user to add an issue associated with any portion of the text transcript capable of being displayed in the text area 10 and the annotation icon 7 may enable a user to add an annotation to the text transcript displayed in the text area 10.

Figure 2:
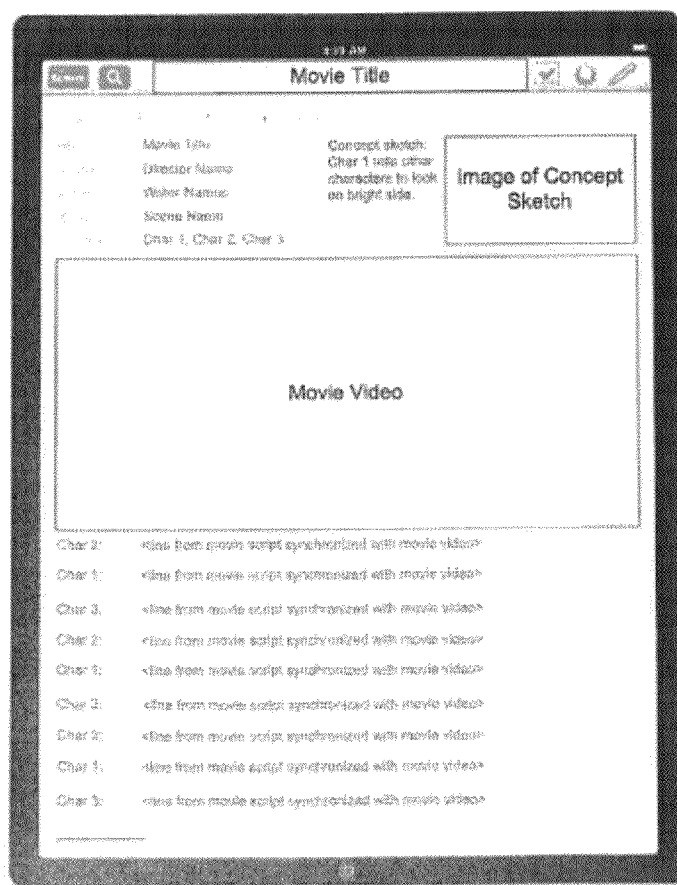
FIG. 2 illustrates an example of a movie being output using the viewing screen layout of a mobile computing device shown in FIG. 1.

FIG. 2 illustrates an example of a movie being output using the viewing screen layout of a mobile computing device shown in FIG. 1. As shown in FIG. 2, the header area 8 displays a title of the movie, the director of the movie, the writer of the movie, the scene name of the scene currently displayed, and the names of the characters (and/or actors) having speaking roles in the scene. The scene name and the names of the characters (and/or actors) may dynamically change as the movie plays. The header area 8 also includes a display of a concept for the scene currently being displayed and an image of a concept sketch of the scene currently being displayed. The concept and concept sketch may dynamically change as the movie plays. In addition, the media area 9 shows a display of the movie video and the text area 10 shows a portion of a text transcript of the dialogue of the movie video being displayed. As described throughout this disclosure, the mobile computing device may control display of the text transcript in the text area 10 in a synchronized manner with the video being displayed in the media area 9.

Figure 3:
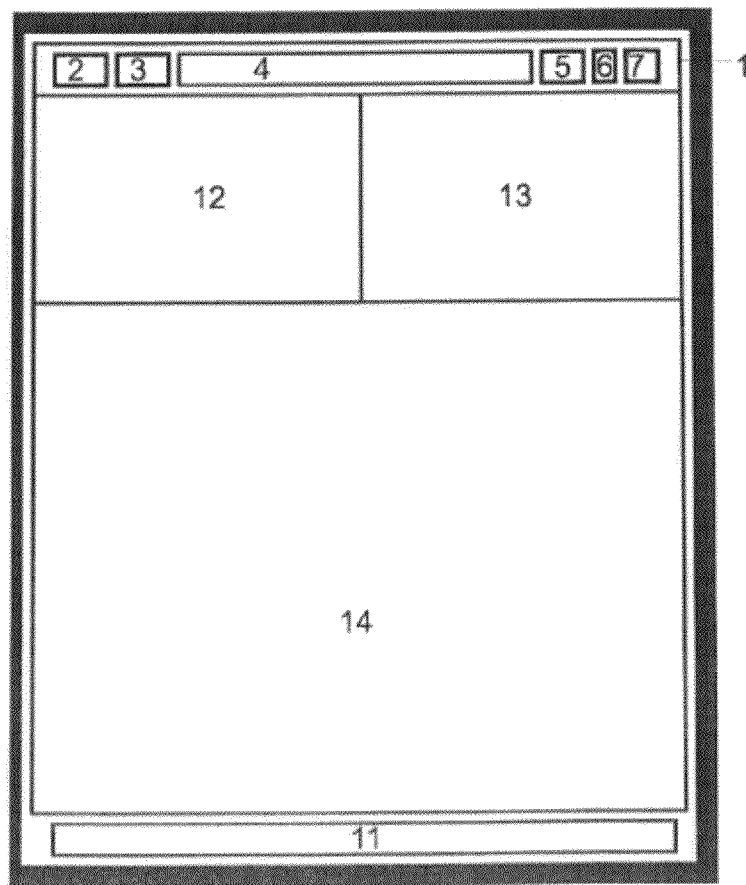
FIG. 3 illustrates another example representation of the viewing screen layout of a mobile computing device, partitioned into several areas.

FIG. 3 illustrates another example representation of the viewing screen layout of a mobile computing device, partitioned into several areas. As shown, the display screen may be divided into several main areas: the multifunction area 1, the header area 13, the media area 12, the text area 14, and the scrub-bar area 11. The multifunction area 1 and the scrub-bar area 11 may have the same characteristics described above with respect to FIG. 1. Despite different size and layout, the media area 12, the header area 13, and the text area 14 may operate similarly to the media area 9, the header area 8, and the text area 10 described above with respect to FIG. 1.

Figure 4:
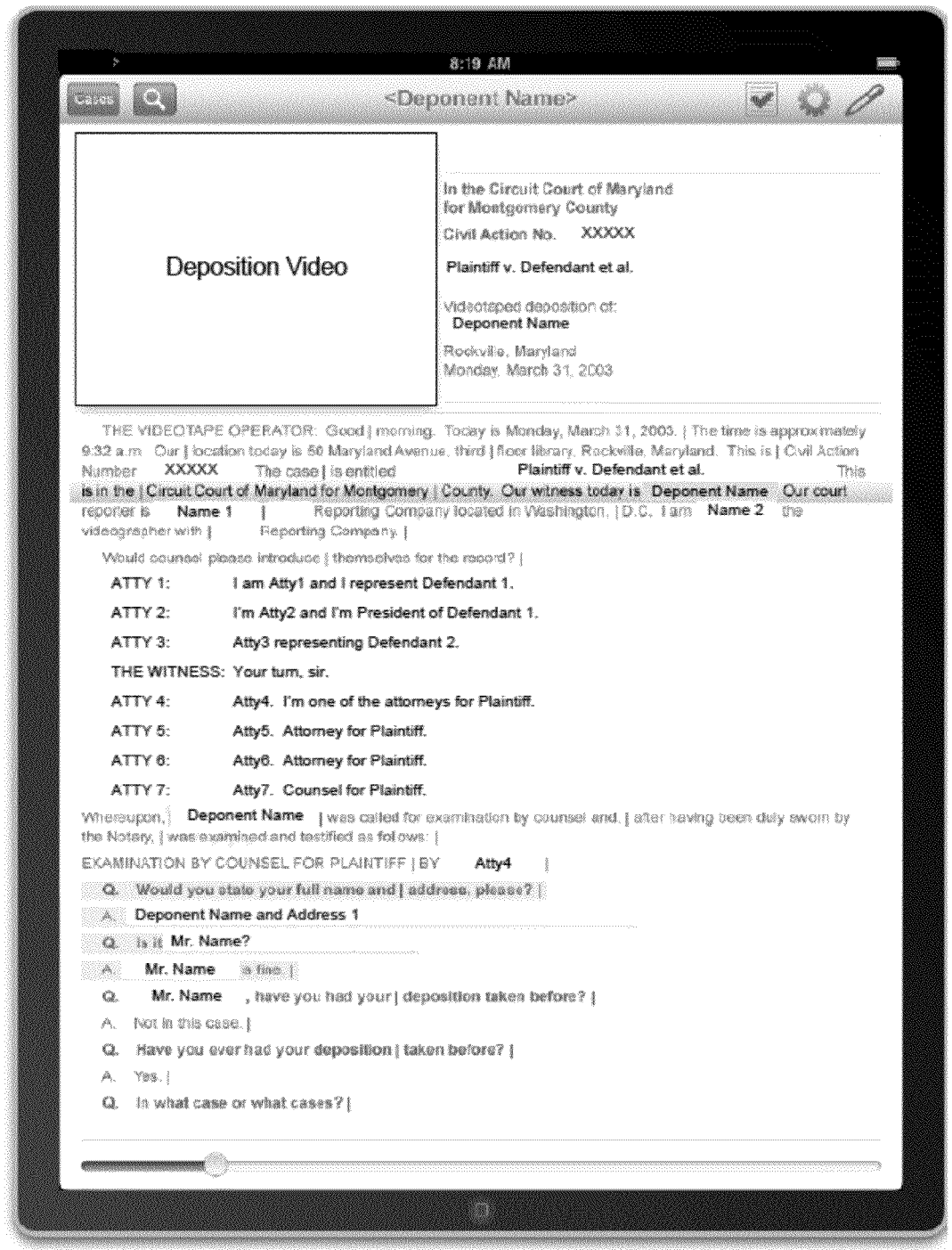
FIG. 4 illustrates an example of a deposition video and transcript being output using the viewing screen layout of a mobile computing device shown in FIG. 3.

FIG. 4 illustrates an example of a deposition video and transcript being output using the viewing screen layout of a mobile computing device shown in FIG. 3. As shown in FIG. 4, the header area 13 displays a court associated with the deposition, a civil action number associated with the deposition, a name of the deponent in the deposition, a location of the deposition, and the date/time of the deposition. In addition, the media area 12 shows a display of the video of the deposition and the text area 14 shows a portion of a text transcript of the dialogue of the deposition being displayed. As described throughout this disclosure, the mobile computing device may control display of the text transcript in the text area 14 in a synchronized manner with the video being displayed in the media area 12.

Figure 5:
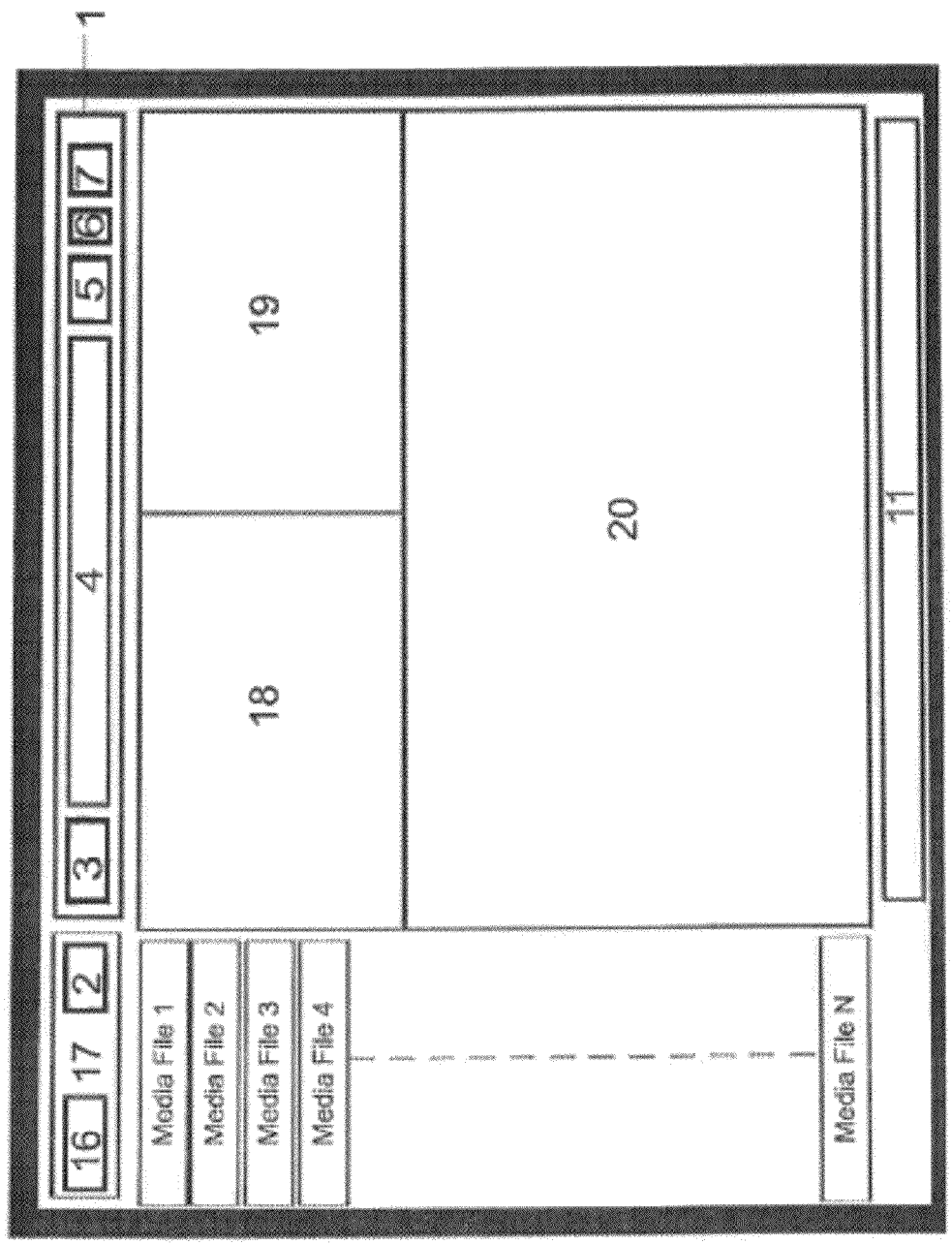
FIG. 5 illustrates an example representation of the viewing screen layout of a mobile computing device, partitioned into several areas.

FIG. 5 illustrates an example representation of the viewing screen layout of a mobile computing device, partitioned into several areas. As shown, the display screen may be used when the mobile computing device is oriented in a landscape orientation. The mobile computing device may switch between the layout shown in FIG. 5 and the layout shown in FIG. 1 or FIG. 3 depending on whether the mobile computing device detects that it is being held or viewed in a landscape or portrait orientation.

In FIG. 5, the display screen may be divided into several main areas: the multifunction area 1, a media list area 17, the header area 19, the media area 18, the text area 20, and the scrub-bar area 11. The multifunction area 1 and the scrub-bar area 11 may have the same characteristics described above with respect to FIG. 1, except that the media select icon 2 is displayed in the media list area 17. Despite different size and layout, the media area 18, the header area 19, and the text area 20 may operate similarly to the media area 9, the header area 8, and the text area 10 described above with respect to FIG. 1. The media list area 17 may display a directory or category name associated with the media files included in the media list area 17. The media list area 17 may enable a user to quickly switch between different media files by selecting a media file (e.g., Media File 1, Media File 2, Media File 3, Media File 4, or Media File N) included in the list. The media list area 17 also includes an edit control 16 that enables a user to edit which media files are displayed in the list. For instance, the edit control 16 may be used to select a different directory or category of media files to display in the list.

In one example, the display screen shown in FIG. 5 may be used to display music videos. In this example, the title area 4 may display a name of the song being output, the media area 18 may display a music video of the song being output, and the text area 20 may display lyrics of the song being output in a synchronized manner with the music video. In addition, the header area 19 may display a release date for the song, a time length of the song, a label for the song, a writer of the song, and a producer of the song. The media list area 17 may display a name of the artist singing the song being output and include a list of other songs for the artist that are available for selection.

In another example, the display screen shown in FIG. 5 may be used to display depositions. In this example, the title area 4 may display a deponent name, the media area 18 may display a video of the deposition, and the text area 20 may display a text transcript of the deposition in a synchronized manner with the deposition video. In addition, the header area 19 may display a court associated with the deposition, a civil action number associated with the deposition, a name of the deponent in the deposition, a location of the deposition, and the date/time of the deposition. The media list area 17 may display a deponents category (or a cases category) and include a list of other depositions (or other cases) available for selection.

Figure 6:
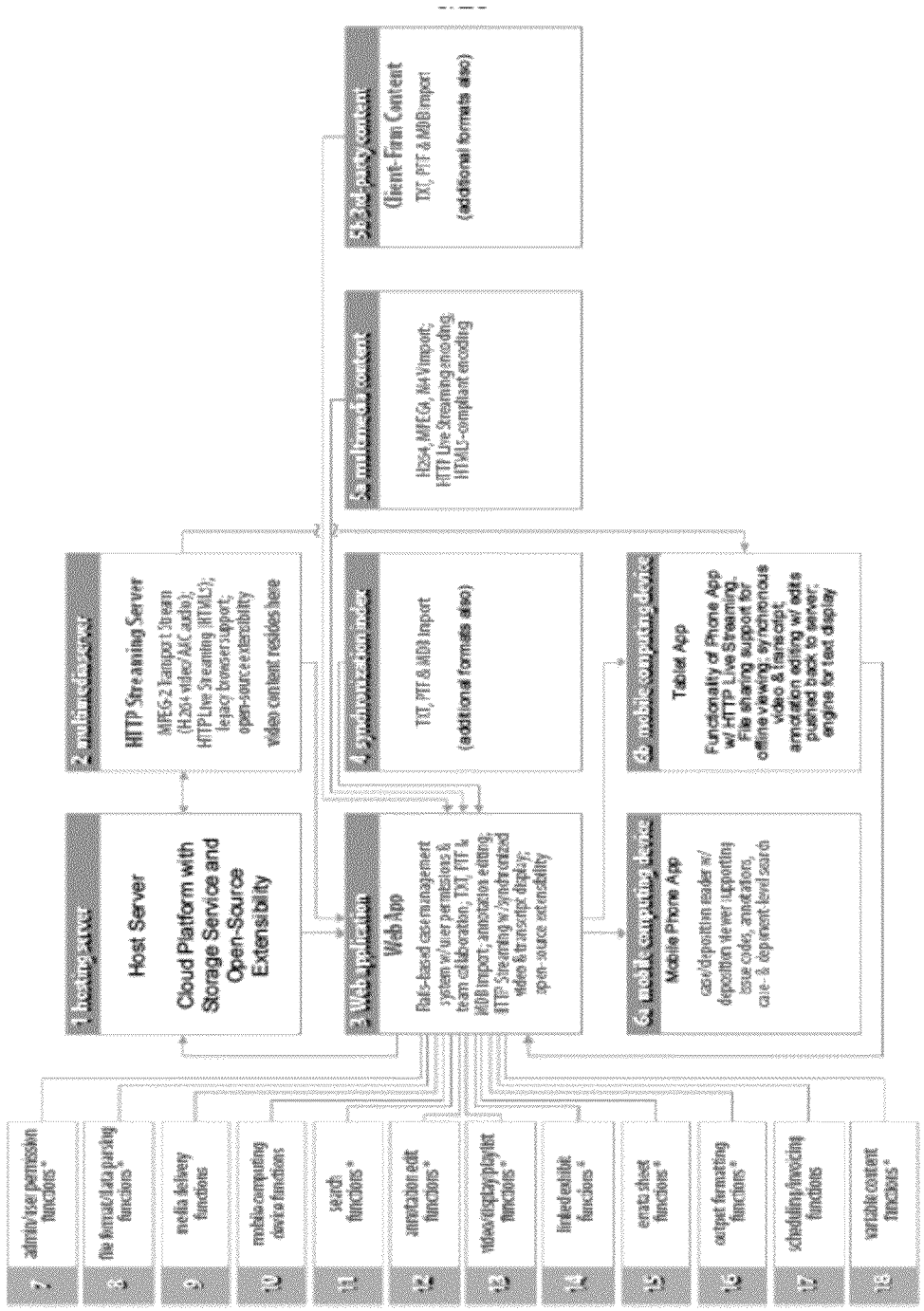
FIG. 6 is a schematic of elements of an example system.

FIG. 6 is a schematic of elements of an example system. The system comprises: a hosting server 6-1; a multimedia server 6-2; a web application 6-3; text content 6-4; multimedia content 6-5; and at least one mobile computing device 6-6. In most general terms, the web application is software (e.g., instructions executable by a processor and stored on a tangible, non-transitory computer-readable storage medium) that may comprise user permissioning logic 6-7; file format and data parsing logic 6-8; media delivery logic 6-9; mobile computing device function logic 6-10; search logic 6-11; annotation and edit logic 6-12; video, display, and playlist logic 6-13; linked exhibit logic 6-14; errata sheet logic 6-15; output formatting logic 6-16; scheduling and invoicing logic 6-17; and variable content logic 6-18. The web application, described in more detail below, may be software code intended to function as a "cloud computing" application, software running on a server remote from users who access it and its functionality by way of an internet connection, an internet or web browser, and a computer or, possibly, by a mobile computing device running software specifically for communication with the web application. The web application may be alternatively referred to as the WebApp.

The user permissioning logic 6-7 may control access to the web application and prevent users from accessing information stored by the web application that the users do not have permission to access. The user permissioning logic 6-7 may perform user tracking functions, change history tracking, and additional functions to allow users to access only the information they have permission to access.

The file format and data parsing logic 6-8 may be used to parse and interpret data (e.g., media files, transcripts, etc.) stored in various formats (e.g., TXT import, .MDB import, .PTF import, proprietary file formats, etc.). The file format and data parsing logic 6-8 may parse and interpret a synchronization index that controls text transcript display in synchronization with other media being displayed.

The media delivery logic 6-9 may perform functions related to media delivery. For instance, the media delivery logic 6-9 may provide media encoding, HTML5 browser support, HTTP Live Streaming, and media (e.g., iTunes) File Sharing.

The mobile computing device function logic 6-10 may perform functions related to using functions of the mobile computing device in conjunction with the web application. For example, the mobile computing device function logic 6-10 may allow the web application to leverage functionality of a smartphone (e.g., iPhone functionality) functionality of a tablet computer (e.g., iPad), functionality of an Internet television device (e.g., Apple TV functionality), and functionality of other operating system and mobile computing device technologies.

The search logic 6-11 may enable searching of text transcripts managed by the web application. For instance, the search logic 6-11 may enable searching of all text transcripts, searching of all text transcripts for a particular case, searching of a text transcript for a particular deposition, etc. The search logic 6-11 also may enable searching of corresponding options for alternative applications.

The annotation and edit logic 6-12 may enable adding and editing annotations of a text transcript. The annotation and edit logic 6-12 may enable a user to add notes to a text transcript, lock editing of a text transcript, link a counter designation to a direct designation, merge designations, bulk import designations, maintain confidentiality for edits to a text transcript, flatten designations, and add/edit evidentiary ruling designations.

The video, display, and playlist logic 6-13 may control synchronous text/video using a synchronization index. The video, display, and playlist logic 6-13 may perform video clip sequencing, jump to location features, runtime calculation, display of font/appearance, display and control of a scrub bar, timestamp editing, header/exhibits formatting, and variable speed playback control.

The linked exhibit logic 6-14 may enable display, linking, and control of exhibits that are linked (or are desired to be linked) to a transcript. The linked exhibit logic 6-14 may include a PDF viewer and an image viewer to enable display of linked exhibits or exhibits a user is considering linking to a transcript.

The errata sheet logic 6-15 may enable a user to display, edit, and control an electronic errata sheet for a text transcript. The errata sheet logic 6-15 may cause display of errata sheet entries with the original text in the transcript. The errata sheet logic 6-15 may have dual-view edit features and view toggle features.

The output formatting logic 6-16 may control output of media and/or text in terms of display on a display screen or in a printed format. The output formatting logic 6-16 may provide screen view control, 2-up view control, and print options (including PDF printing).

The scheduling and invoicing logic 6-17 performs scheduling and invoicing features and may leverage mobile computing device features. The scheduling and invoicing logic 6-17 may provide calendar functionality, invoicing functionality, recurring payments functionality, scheduling functionality, subscription model functionality, shipping functionality, and payment gateway functionality.

The variable content logic 6-18 may control variable content display. The variable content logic 6-18 may control display of advertisements (e.g., advertisements offered by the company hosting the web application, location-based advertisement, commercials and PSAs, etc.), new music, movie trailers, and branded applications (e.g., corporate news applications, educational applications, etc.).

Exemplary Synchronization Index

In some implementations, the function of a "synchronization index" is to link a word or range of words with certain media (e.g., multimedia). A "synchronization index" is an electronic file that may take any of several forms. For example, a synchronization index may be: 1) a spreadsheet with a time value corresponding to a word or range of words; 2) a table with a time value corresponding to a word or range of words; 3) a database, such as a Microsoft Access database, with a time value corresponding to a word or range of words; 4) an xml-type or html-type formatted listing that associates a time value corresponding to a word or range of words, for example as may be found in a Synchronized Multimedia Integration Language (SMIL) formatted file or similar; 5) any of the above, substituting the time value with a video frame count or any other marker or mechanism to mark a discrete portion of a media (e.g., multimedia) file a time $t_x$ into the media (e.g., multimedia) between t=0 to t=end; or 6) a file, such as a portable document format (i.e., "PDF").

The synchronization index itself may, then, include the transcript and the timing values, or positional values, for the associated media (e.g., multimedia). In this regard, for display of synchronous text and video, only the synchronization index and the associated media (e.g., multimedia) may be needed, along with a system (e.g., one or more hardware devices operating software with logic) configured to utilize each.

The synchronization index, optionally, may include information relating to the location and/or characteristics of the corresponding media (e.g., multimedia), so the system can retrieve the multimedia for synchronous playback. This may be a pathname/filename for retrieval of multimedia, a Uniform Resource Locator ("URL") specifying a location of the multimedia, a variant playlist, and so on.

The synchronization index also may include information relating to predetermined text display settings, for example defaults of text font, size, color formatting and so on selected to optimize an orderly display.

Mobile Computing Devices

Techniques described in the present disclosure, or a portion thereof, are intended to function on a computing device, such as a mobile computing device. In the embodiments, a mobile device may comprise a display, a battery, a user interface, such as a keyboard, touchscreen, etc., and a memory, such as a flash memory or hard drive. In addition, the mobile device may comprise a wireless networking capability, such as a wireless Wi-Fi communications device, or a wired networking connection. The mobile computing device may utilize a known mobile operating system, such as WebOS, Android, or IOS.

A mobile computing device generally comprises all or a subset of the following features: a viewing screen; a battery supply for extended periods of use or standby without needing to be plugged in to an electrical outlet; an operating system; an input mechanism, typically a keyboard rendered to a touch-sensitive viewing screen, or a keyboard/keypad that is integral to the device as opposed to a full size keyboard tethered or attached to the device by USB connection or other means; a networking mechanism that allows the device to communicate over a wireless network or telephone/data network to send and receive data (for example by Wi-Fi, 802.11a/b/g/n, Bluetooth, 3G, 4G, and so on); a quick start up time, relative to a longer start up times typically associated with booting a computer running a full version of a Microsoft Windows operating system; a utilization of solid state memory or flash memory in preference to hard-drive memory; a quiet sound when operating relative to use of noisy fans and heat sinks found in desktop computers; and a physical size, weight, or form factor that would favor portability.

Common examples of a mobile computing device include, but are not limited to, 1) a tablet computer, such as the device sold by Apple under the iPad trademark, or others including HP Slate, Dell Streak, Asus Eee Tablet, Compaq Tablet, Notion Ink Adam, MSI running Android, Quanta, ICD Vega, Google Tablet, HTC, Archos 5 Internet Tablet, Asus T91mt Eee PC, Panasonic Toughbook H1 Field, Toshiba Portege M780-S7220, Samsung Galaxy Tablet, and so on; 2) smartphones, including, but not limited to the Apple iPhone (3G, 3Gs, 4), phones running the Android operating system, phones sold by Research in Motion sold under the trademark BlackBerry, Samsung Galaxy Smartphones, Nokia N8; and other smartphones; 3) handheld devices, personal video recorders (PVRs), personal media players (PMPs), mobile gaming devices, personal digital assistants (PDAs), portable music devices (e.g., the Apple iPodTouch), and so on.

For simplicity throughout this disclosure, the term mobile computing device may be used interchangeably with the term tablet computer (e.g., iPad), but it is not intended that the term mobile computing device be limited to a tablet computer (e.g., the Apple iPad). Any examples or implementations utilizing a tablet computer (e.g., an Apple iPad) device specifically are illustrative only and are not intended to limit the scope of the disclosure. Certain illustrative examples may describe a tablet computer (e.g., the iPad) as implementing techniques described throughout the disclosure, but the disclosure is not limited to a tablet computer (e.g., the iPad). The terms "web application" and "mobile computing device software" are described in greater detail, below.

Errata Sheet Creation

In the present disclosure, a user loads an electronic transcript to a web-based software utility, referred to as the web application or the "WebApp." The WebApp is configured to accept most industry standard transcript formats. These may include: .txt, .ptx, .mdb, .html, .xml, and so on. Generally, these transcripts are numbered by page, and each page has an identical numbered series of lines that always correspond to the same text to ensure a page:line cite is always static. In a finalized transcript, the page and line numbers will always correspond to the same testimony text from one copy of a transcript to another. This ensures a page:line citation by an attorney, or the court, will always refer to the same location.

The web application re-formats the transcript into an xml-type format, generally described as associating a range of words with a specific page:line reference, as would be the case if each line of testimony was inserted into a series of database cells to comprise a column. A Graphical User Interface (GUI) allows a user to edit the text of any line of testimony. The purpose of this edit is to notate an error in transcription that would need to be included in an errata sheet. The system notes the original text of the line and compares it to the altered text. In commercial word processing software, this process is often referred to as "redlining." New or added text can, at the user's selection, be color coded to denote it as a change from the original text. Any combination of font characteristics can be selected by a user to denote that text that should be deleted, that text that should be altered, or that text that should be added. Font characteristics may include strikethrough, font color, font size, font, background highlighting, and similar characteristics.

The user can, by way of the GUI, instruct the system to run a report of the changes made and compile them in an errata sheet. The user can elect to view either the original content of the original line of text or the altered text of the revised line of text, or a markup with all changes.

A reviewer of the transcript can employ an additional step to confirm the accuracy of the court reporter's transcription. Optionally, the text of the transcript can be synchronized to the video. In concert with a synchronization index, the user can click or perform a gesture upon a line of testimony to cause the video to begin to play back at that portion of the video where those words were spoken. In this way, a deponent when reviewing the court reporter's written transcription of his testimony is not limited to his recollection of what was said, but rather has the exact video recording with which to compare the written transcription for accuracy. Moreover, attorneys can review the errata submission in conjunction with the actual video recording to ensure accuracy of the transcript. With the written transcript and the witness's recollection alone, without the video, there exists the temptation for the witness to change his testimony to what he wished he would have said at the deposition (for example, a "Yes" to a "No"), which is not the proper function of an errata submission, rather than to accurately reflect through errata that which was actually said or to correct minor spelling, punctuation or typographical errors. Accordingly, the system may facilitate more timely and trustworthy errata submissions, reduce the temptation for abuse because the video is available as a check, and ensure an accurate transcript displays electronically in the courtroom as synchronized, scrolling text with a video image, which may improve inefficiencies inherent in other systems.

Once the transcript has been reviewed by the witness in the system and changes for accuracy have been made, the user can 1) create a written hardcopy report that aggregates all changes into an errata sheet, as has historically been the practice, for signature and affixation to the official hardcopy of the original transcript, and 2) transmit to the opposing party or the court the resultant electronic file, which includes the witness's changes.

Any of the software operators, preferably including those using mobile computing devices, including opposing parties, can 1) quickly electronically jump to succeeding or preceding errata notations (or navigate via hyperlinks), 2) check the errata notations for accuracy against the video, 3) ensure the accuracy of the transcript as it will display with the trial presentation software, and 4) play video in the courtroom that contains information from the witness's errata sheet submission as though it was part of the court reporter's transcription.

Advantageously, an errata sheet prepared and communicated in this manner also may be electronically tracked, for example by affixing an unalterable, encrypted time and date stamp from a trusted, independent source, should the submitter ever need to verify that the errata corrections were completed within the time contemplated by the governing rules of procedure and communicated to opposing counsel or the court.

Figure 7:
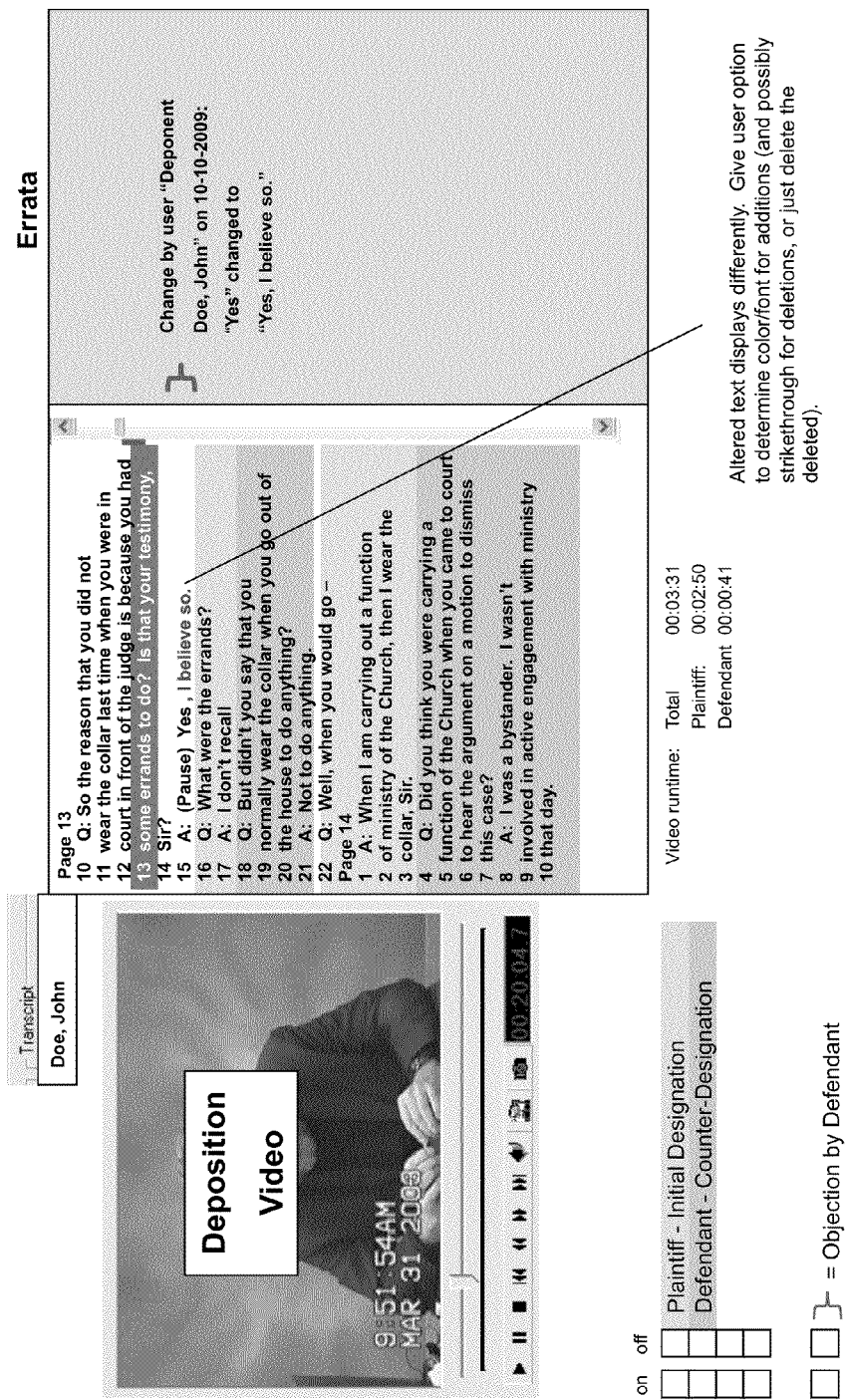
FIG. 7 illustrates an example interface that may be used in handling errata sheet operations.

FIG. 7 illustrates an example interface that may be used in handling errata sheet operations. As shown, in FIG. 7, a user may view a deposition video and a deposition transcript in a synchronized manner, and manipulate an errata display area to make a change to a deposition transcript to be added as a change in an errata sheet. In the example shown in FIG. 7, a user "Deponent" selected line 15 of the deposition transcript and changed the testimony "Yes" to "Yes, I believe so." As shown, the errata display area shows the change made, the user who made the change, and the date on which the change was made. In addition, the deposition transcript has been updated to indicate the change made to the transcript at line 15 such that the original transcript and errata changes may be displayed together in synchronization with the deposition video. In some examples, the changes entered in the errata display area may be aggregated into an electronic errata sheet associated with the deposition transcript.

Merging and Flattening of Designations

Law firms are often tasked with transcript management on behalf of their clients. They commonly utilize a computer spreadsheet application, such as Microsoft Excel, to track changes, and they use a word processor, such as Microsoft Word, to type out their designations, sometimes in tabular format or longhand. Use of spreadsheets and word processors may be cumbersome and inefficient for transcript management.

A common way a deposition is cited is in the longhand, exemplified as "Page 10, line 2 to page 10, line 7." A shorthand for such a designation understood by trial presentation software would be, for example, "StartPage.StartLine+ EndPage.EndLine." In the example, the shorthand would be 10.2+10.7.

Attorneys conduct review of transcripts in the context of internal review, and then in preparing for trial. In conducting internal review, or in transitioning from internal review to trial, it is often desirable or necessary to flatten certain designations. For example, one transcript may be reviewed by Plaintiff's counsel, and it may be issue coded to comprise a certain number of "page:line to page:line" designations that are associated to a particular issue. For example, one issue code may be titled "liability" and another "damages." Using the system described throughout this disclosure, a user may combine, or flatten, two or more issue codes into a common issue. In this example, the user may elect to flatten the "liability" coded designations with the "damages" coded designations into one common issue called, say, "Plaintiff's direct designations."

Similarly, one designation may be created and another one may be added at a later time but with a range that abuts the first designation. If these abutting designations have the same issue code, for example, they should be able to be merged into one designation. The disclosed system (e.g., the web application) comprises logic, such as executable program code, configured to automatically merge, at the user's choosing, abutting designations with the same issue code.

A list of top level, global, or roll-up issue codes may include Plaintiff's direct designations, Defendant's counter designations, Plaintiff's counter-counter designations, Defendant's direct designations, Plaintiff's counter designations, Defendant's counter-counter designations, Plaintiff's objections, and Defendant's objections, as well as Confidential, Restricted Confidential, and Attorneys' Eyes Only. As in the example above, a user may select the transcript sections issue coded "liability" and "damages" and specify that they be combined into another single issue code such as "Plaintiff's direct designations."

In reference to the desirability of flattening designations prior to display of video clips in court, it may be advantageous for an operator of trial presentation software to flatten designations before creating video clips, because this reduces the total number of video clips to create as well as the number of edit points, thereby facilitating more efficient workflow. For example, if a plaintiff designates for deponent "John Doe" testimony in the range 10.1+10.5 and 10.9+10.25, and if defendant counter-designates 10.6+10.8, the one video clip created may be for 10.1+10.25. More typically, and problematically, three designations would have likely resulted in three distinct video clips and they would be played as a multiclip, or series of individual clips:

| Page:line range | Clip title |
| --- | --- |
| 10.1 + 10.5 | JD01001 |
| 10.6 + 10.8 | JD01006-counter |
| 10.9 + 10.25 | JD01009 |

Using the system described throughout this disclosure, the logic of the software of the web application may recognize adjoining ranges of designated testimony. The logic may be employed to join, or flatten, these adjoining ranges. Further, rules may be employed to flatten only the desired issue codes, preserving the original range specification of "page:line to page:line" and issue tag should the user elect to undo a flattening operation, or should the user need to perform a calculation of video run duration, described below.

Figure 8:
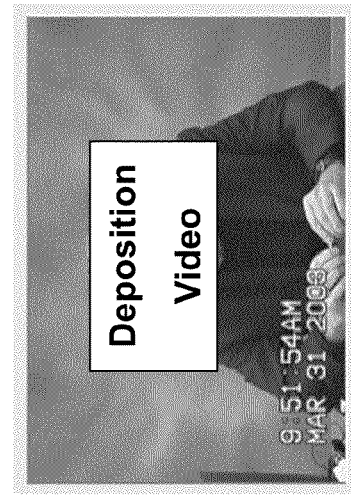
FIG. 8 illustrates an example of merging designations.

FIG. 8 illustrates an example of merging designations. As shown, a plaintiff has made initial designations to a deposition transcript and a defendant has made counter designations to the deposition transcript. In this example, the system recognizes that the plaintiff designations and the defendant designations represent adjoining ranges of designated testimony and, based on the recognition, merges the plaintiff designations and the defendant designations. The system displays a merged designations area that shows the designations that have been merged adjacent to the deposition transcript, which still shows the plaintiff designations and the defendant designations. Using the merged designations area, a user may verify whether or not the merging was proper and, if so, create a single video file that corresponds to the merged designations.

FIG. 9 illustrates example data structures that may be used in merging designations. As shown, a first user has designated page 117, line 13 to page 130, line 16 and a second user has designated page 121, line 0 to page 135, line 10. The system compares the position information (e.g., page and line numbers) of the designations made by the first user with the position information (e.g., page and line numbers) of the designations made by the second user and determines that the designations overlap based on the comparison. In response to the determination that the designations overlap, the system merges the designations into a single, merged data structure. The merged data structure includes all of the designations made by the first user and the second user, encompassing the earliest starting point for designations to the latest ending point for designations. For instance, as shown, the merged data structure has position information indicating designations from page 117, line 13 to page 135, line 10.

FIG. 10 illustrates an example interface for assigning issues to designations. As shown in FIG. 10, a user may select one or more ranges of designations and assign one or more issues to each selected range of designations. The interface enables a user to add additional issues and apply all issues to a particular designation. The interface also allows a user to select a color with which the designations tagged with a particular issue will be displayed on a deposition transcript. The issues assigned to designations may be used for flattening and merging designations, as described above.

Locking Designations

In communicating designations between parties, the system prevents one party from designating testimony that has already been designated by the other. For example, if plaintiff designates 10.1+13.22, then the defendant should be prevented from counter-designating testimony in the same range. One way of understanding this function is with reference to FIGS. 11A-C, where each party has its own work pane display of the transcript. In this manner, Plaintiff uses the left-most work pane to make annotations or to perform issue coding. The Plaintiff then communicates to Defendant that its designations are complete, and the Defendant begins to make counter-designations in the right-most work pane. Navigation of the transcript can operate on both work panes simultaneously, so it becomes easy for a Defendant to determine if counter-designations are needed in certain areas, without having to worry about overlapping annotation colors. The logic of the system prevents overlapping designations between parties. If an overlapping page:line is selected, the software snaps Defendant's selection to the available lines and/or provides an error message. As above where Plaintiff designated 10.1+13.22, if defendant inadvertently selects 13.15+14.10, the designation would automatically correct to 13.23+14.10, disregarding the overlapping section. The result may offer a clean, concise view of designations within the two work panes.

Where the parties make a simultaneous designation, for example by submitting direct designations to one another at a mutual time deadline set by a court, those page:line ranges can be merged into a distinct issue code, such as "both parties," or "agreed upon designations," and be locked to prevent objection by either party.

Linking Designations

The web application may comprise logic configured to link one designation with another designation. For example, in a deposition transcript a Plaintiff may proffer a set of direct designations for a witness. Thereafter, the Defendant may desire to add material for completeness in a Defendant's counter-designation should the Defendant believe Plaintiff's direct designations were not a complete or accurate representation of that portion of the testimony. In practice, however a Plaintiff may elect to drop its initial designation, making it a laborious process for the Defendant to eliminate corresponding Defendant counter-designations that should be removed as a result. Accordingly, the logic configured to link one designation with another designation provides functionality to automatically cause the deletion of a counter-designation if the designation to which it is linked is first deleted.

Figure 11B:
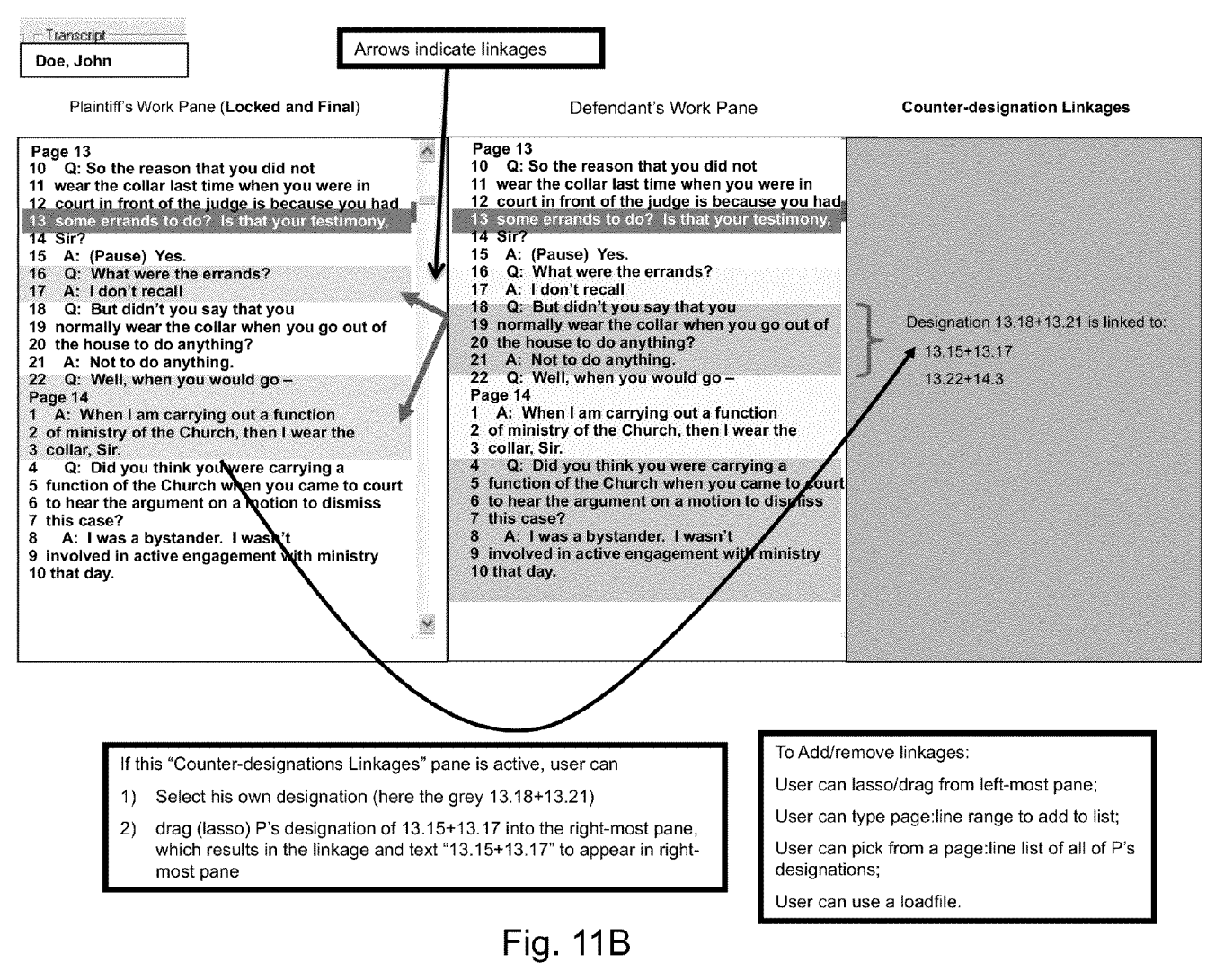
Figure 11C:
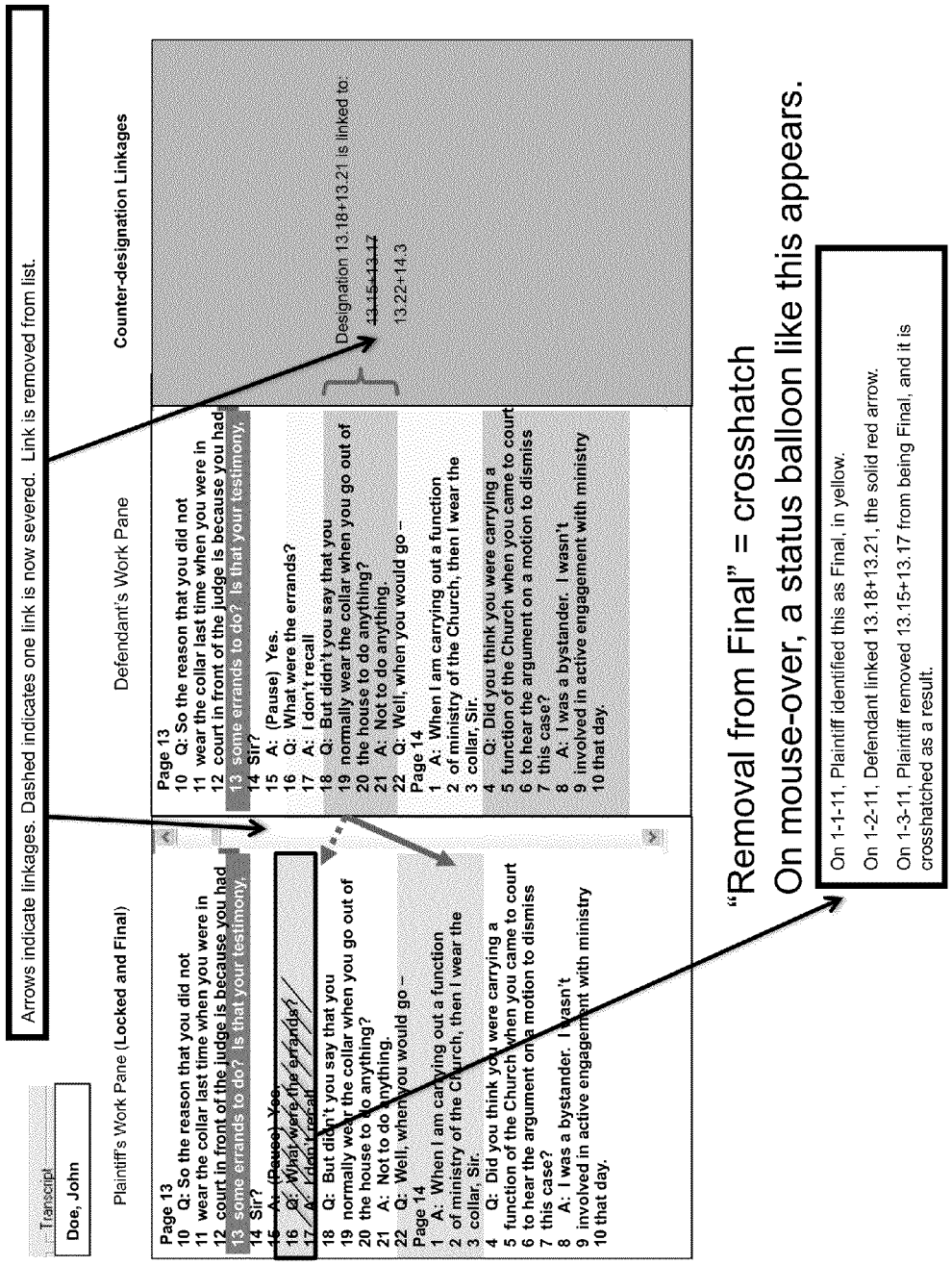

This logic may be further described with reference to FIG. 11A-C, which illustrates a Plaintiff's work pane and a Defendant's work pane. As shown, a first designation is made by Plaintiff in Plaintiff's work pane. The Defendant's counter-designation is made in the Defendant's work pane, with logic to allow, or to compel, Defendant to identify that portion in Plaintiff's work pane that would correspond to Defendant's counter-designation. Defendant's counter-designation may be linked to more than one of Plaintiff's direct designations, with the linked designations being listed in Defendant's work pane. Should each of Plaintiff's designations within that list be removed, the logic causes removal of the corresponding counter-designation.

The Defendant may link each counter-designation to at least one Plaintiff designation using a graphical element, for example by selecting a range of text in Defendant's work pane and then dragging a "lasso" into Plaintiff's work pane to identify a page:line range to indicate the Plaintiff's selected testimony to which Defendant is tying his counter-designation. Again, one Defendant counter-designation may be tied to more than one of Plaintiff's designations. If all of those ties, or linkages, are severed by Plaintiff withdrawing his designations, then the logic may be configured such that Defendant's counter-designations are removed, or are identified as counter-designations that ought to be removed.

Alternatively, if Defendant has linked a counter designation to a Plaintiff's designation, and if the Plaintiff subsequently modifies the range of that designation, the Defendant can be notified, by the logic of the system, that one designation to which a Defendant's counter-designation has been linked has been modified. The Defendant can make a determination as to whether his counter-designation should be deleted entirely, deleted in part, or left alone. With this logic to link designations, the parties are provided a new tool that may make efficient a work process that has historically been very laborious and fraught with potential for error. FIGS. 11B and 11C illustrate examples of linking designations according to one embodiment.

Batch Import of Designations

It may be advantageous to use the web application to import more than one transcript designation at a time. For example, when parties to litigation exchange their designations, each party needs to be able to import the designations of the other into his own working copy of the transcript. As another example, video clips may have been created within trial presentation software that need to be integrated into a transcript annotation utility. As part of the logic of the web application, a user may batch import more than one designation at a time. This can be accomplished by creating a loadfile with a predetermined format to communicate the batch of designations. For example, a loadfile using the StartPage.StartLine+EndPage.EndLine entries in series may be used. This format is the same as may be used to batch create video clips within trial presentation software applications. Upon ingest of the batch, the user may be presented a graphical user interface to assign an issue to each of the designations. FIG. 10 illustrates an exemplary interface that can be used to batch import more than one designation and assign an issue code to one or more designations.

Printing

Once parties to litigation have exchanged deposition designations, and objections thereto, with one another, it is often a requirement that a printed hardcopy be prepared for submission to the court. The printed hardcopy is also useful for the attorneys' own reference.

These submissions are typically color-coded copies of deposition transcripts for the convenience of the court and court staff. Historically, these color copies have been laboriously prepared by hand using a colored high-lighting marker on previously printed copies of the depositions. This method is extremely time consuming, it creates great potential for human error, and the work product is not easily revised or combined with the submission prepared by opposing legal counsel.

Moreover, during the deposition designation and counter-designation process, each party may also lodge objections to any number of designations or counter-designations for the purpose of asking the court to exclude the testimony from introduction into evidence under the rules of evidence. An objection is a written note to correspond to an annotation, that being a selected page:line range of the transcript that is commonly assigned an "issue code" meaningful to the user. The written note may comprise a reference to the evidentiary rule being relied upon by a party to warrant exclusion of the testimony by the judge as well as a short description or argument on the matter. It has been very difficult to view the objection and the testimony to which the objection was made, without using at least two separate documents or a table from a word processing application (e.g. Microsoft Word) That is time consuming to prepare and has a high probability of human error.

In the described system, the user is provided the facility to print hardcopies of the deposition transcript, including highlighting for each issue code in a different color, or a different font. For example, the user may be able to print objections on the same page as the transcript and in a location that is adjacent, or substantially adjacent, to the testimony itself. The logic in the software of the web application, preferably working in concert with software operating on a mobile computing device (including optionally utilizing the mobile computing device to communicate the print job to the printer), may be able to 1) print in a portrait orientation with two transcript pages comprising a column on the left half of the printed page, leaving the right half of the page for notes, such as an objection, to appear adjacent to the testimony to which a party has lodged an objection, and 2) print in a landscape orientation with a transcript pages comprising a column on the left half of the printed page, leaving the right half of the page for notes to appear adjacent to the testimony to which a party has lodged an objection. Printing in this manner allows one convenient document to be produced where a judge can evaluate an evidentiary objection while simultaneously accessing the testimony to which the objection applies. The reader also can examine the context of the overall transcript because the transcript contains highlighted designations as well as the non-designated portions, comprising the complete transcript.

A deposition designation has a color associated with it so the reader can immediately understand which party proffered the submission, including by reference to a color key that may be printed on the same page. Likewise, a graphic element, for example an elongated, colored bracket or a rectangle bounding the designated text, may be used to identify the party making an objection and the range of text to which the objection applies.

Printing may encompass communication with a printer to print on paper, creating a file in .pdf or .tif format, or other similar format, suitable for transmitting by email or printing at a location remote from the user, or rendering a file type for use with a mobile computing device, such as an electronic book format or similar (including .txt, .html, .ps, .pdf, .djvu, .epub, .fb2, .azw, .pdb, .lrf, .lrx, .wol, .tr2, .tr3, .aeh, .lit, .exe, and .rgo).

This printing method provides a new convenience to the reader, as at least two documents—a highlighted transcript and a table of objections and page:line cites to which objections are lodged—are consolidated into one. This printing method may solve a longstanding logistical problem for litigation professionals needing to submit deposition designations and objections to a court.

Figure 15:
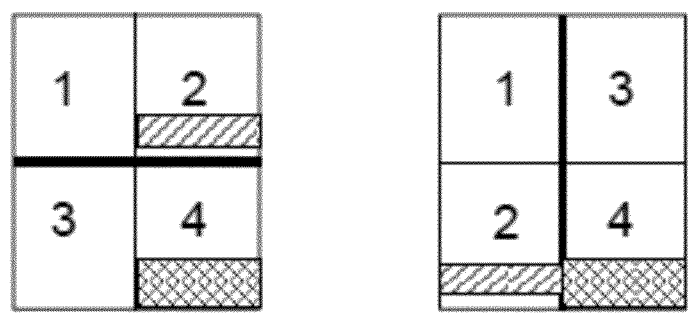
FIG. 15 illustrates an example of a manuscript printing showing highlighted designations.

FIG. 12 illustrates an example printed page output in a portrait view. FIGS. 13A-B illustrate an example printed page output showing only designated portions of a transcript. FIG. 14 illustrates an example printed page output in a landscape view. FIG. 15 illustrates an example of manuscript printing showing highlighted designations.

Electronic View of Printed Format

In addition to the printed copy, it may be advantageous to replicate on a computer screen the convenient layout of having objections adjacent to the testimony to which objections were lodged.

Additionally, the judge can be provided facility to make an evidentiary ruling within the system. With reference to FIG. 16, the court is provided the facility to make evidentiary rulings on objections, here exemplified in the right-most column by an affirmed/overruled toggle in the form of a radio button. As a result, if the court elects to make a ruling, the date and time of the ruling is stored by the software, and such a ruling can be immediately communicated to the parties. The parties can access the electronic document to learn what testimony has been excluded and what has been permitted, and a report can be generated and printed or saved for offline study and evaluation.

Transcript Formatting

An example format for the synchronization index for use with the described system is an xml-type format, an example of which is shown in FIG. 17. This xml-type format comprises tags to denote a transcript header, a transcript body, and a transcript footer. Metatags may also be present for display, including timed display, of graphics, images, advertising, secondary multimedia other than that primarily associated with the text of the synchronization index, logos and settings therefor, text, including foreign language translations, sounds, and so on.

Transcript annotations can be saved as an integral part of the xml-type formatted synchronization format. The example shown in FIG. 17 is intended to be illustrative of the xml-type format only and is not intended to represent an actual, working synchronization index with all information included in the synchronization index. Actual implementations may include more, perhaps much more, information.

Run Time Calculation

When video clips are created in trial presentation software, a report query can be executed to calculate and output the run time duration of each clip and the designated text. The report may be called a duration list, or "durlist." For the reasons mentioned above, litigants need this information, in part to determine whether they should add or remove testimony.

Historically video clips were created within the trial presentation software to generate a duration list. Because trial presentation software is often a tool not used by an attorney but rather a trial consultant with special expertise, typically employed only at a time very close to trial, it would be useful if the attorney could create a duration list apart from the trial presentation software and within an application used to annotate transcripts. In some examples, all of this can be accomplished on a mobile computing device.

As an example of cumbersome and inefficient workflow often experienced by litigators, the attorney creates designations using a highlighter on a printed transcript; support staff enters those designations into a transcript management utility, which carries the potential for error; the transcript management utility case is sent electronically to the trial consultant; the trial consultant runs a query from the transcript management utility to extract a .csv formatted file corresponding to the issues designated; the .csv is re-formatted to render a text file in StartPage.StartLine+EndPage.EndLine format to be used as a loadfile for video clip import to a trial presentation utility; the trial presentation utility is opened, and the .txt loadfile is used to import designations; the clips within the trial presentation utility are quality reviewed to ensure load errors have not occurred, for example as would exist if a designation began or ended on a line with no timestamp within the trial presentation utility .mdb; the video clips are fine-tuned at the beginning and end of each clip; the video clips are renamed to sort properly in page order within a duration list, for example by padding a "0" for pages 1-99 or by adding a prefix or suffix to identify the designator; the "durlist" command is executed, requiring the trial consultant to select the witness having video clips loaded and then manually parse out only the subset of video clips for which a duration list is sought from among the entirety of video clips present for a witness (e.g. clips within the trial presentation utility are identifiable only by clip name and do not carry any issue coded differentiation that may have been present in the transcript management utility); the duration list report is created from the clips identified by the trial consultant and printed, or saved electronically, for another quality review against the transcript management utility case; and then the duration list is forwarded back to the legal assistant or attorney.

With the described system, logic is employed in the software of the web application, and preferably within software executed on a mobile computing device, to calculate a duration list, without necessity of creating discrete video clips, by performing calculations from the synchronization index itself. For example, if a user annotates a page:line range within a transcript, the software examines the synchronization index to compute the time difference between video corresponding to EndPage.EndLine and StartPage.StartLine. In this manner, computations can be output for each annotation, for all annotations that comprise one issue, for merged issues, for more than one issue, and for the totality of all annotations.

In this manner, the attorney can very quickly determine the appropriateness of content being designated because he has immediate knowledge of the run duration of the annotations being made. The traditionally cumbersome and inefficient workflow is greatly improved. This provides the attorney a heretofore unavailable advantage, in that the strategy of determining what video to play in the courtroom has been a strategy historically left until the last moments of trial preparation, often as late as the day before video is to be played in the courtroom. This trial preparation strategy can now be deployed much earlier in the litigation process, leaving available more preparation time for the attorney in the moments immediately before trial, or in the evenings on trial days when preparation time is most scarce. Work that had consumed the attorney's time can be shifted to a trial consultant, as the actual play duration of video clips may vary slightly from the calculated duration list because the trial consultant can often fine tune the video to eliminate long pauses, false starts and stops, and correct inaccuracies or imperfections in timestamping of the synchronization index. With the described system, this fine-tuning, however, is no longer prerequisite to the attorney's evaluation of overall run durations historically generated once video clips had been created, historically a very time consuming task at trial.

FIGS. 7, 11, and 16 each show a displayed output of run time calculation. As shown, the system computes and displays a total run time for all designations, a total run time for plaintiff designations, and a total run time for defendant designations. The system may compute the totals in real-time as a user is viewing the transcript and video of the deposition, and editing designations for the transcript. The user may view the run time calculations and quickly perceive how changes being made to the designations impact run time of the corresponding video. In some implementations, the system may continuously monitor changes to the designations and, when a change is detected, the system may reference the synchronization index to extract timing data associated with the new designations and compute the run time totals for the new designations based on the extracted timing data.

Synchronized Exhibits

When an attorney reviews a videotaped deposition and its transcript after the deposition, it is often helpful to have access to deposition exhibits that may have been physically before the witness during a line of questioning. It is a feature of the present disclosure to provide within the synchronization index information that would provide for the display of a document at the correct time within the deposition. For example, when an attorney places a document before the witness, marks it as a deposition exhibit, and asks the witness to identify it, metadata within the synchronization index can be configured to display that first page of the exhibit at that point within the deposition video. That point in time also corresponds to a page:line cite within the deposition transcript. If, in the attorney's next question he draws the witness's attention to the third page of the deposition exhibit, metadata within the synchronization index can be configured to display that third page, and so on.

Accordingly the synchronization index contains information for selecting the image to display, for the time at which the image is to appear, or an "in" time marker, and for the time at which the image is to be removed, or an "out" time marker. A series of such instructions within a synchronization index is generally referred to as "synchronized exhibits." It may be advantageous to allow data for synchronized exhibits to be independent of video clips and "in" and "out" edit points for video clips. Such independence allows video clips to be edited, merged and flattened without necessity to re-link the correct exhibit that should be simultaneously viewed with each video clip. Existing transcript management and trial presentation utilities lack this facility, making their use cumbersome and inefficient.

FIG. 18 illustrates an example of a linked exhibit. As shown, the interface in FIG. 18 includes a linked exhibit area where a user can view and add/delete/edit linked exhibits to the transcript displayed. In the example shown, an exhibit has been linked to the designations made to the displayed transcript. The exhibit is displayed adjacent to the transcript testimony to which the exhibit is linked. The linked exhibit may be displayed at a time when a portion of the deposition video corresponding to the designations is displayed. Users may be able to interact with the linked exhibit area to add additional linked exhibits, edit existing linked exhibits (e.g., move the linked exhibit to a different portion of the transcript), or remove linked exhibits.

The Web-Based Software Application

In some examples, the web-based software application may be an application coded within the Ruby on Rails ("Rails" or "RoR") open source web application framework for the Ruby programming language.

The web application is used as a case management system to facilitate management of users, user permissions, team collaboration, transcript manipulation, and distribution of synchronization indexes and multimedia retrieval instructions for a mobile computing device. Referring to FIG. 6, the web application may comprise user permissioning logic 6-7; file format and data parsing logic 6-8; multimedia delivery logic 6-9; mobile computing device function logic 6-10; search logic 6-11; annotation and edit logic 6-12; video, display, and playlist logic 6-13; linked exhibit logic 6-14; errata sheet logic 6-15; output formatting logic 6-16; scheduling and invoicing logic 6-17; and variable content logic 6-18. The web application may include software code intended to function as a "cloud computing" application, software running on a server remote from users who access it and its functionality by way of an internet connection, an internet or web browser, and a computer or, possibly, by a mobile computing device. The software code may be stored in a non-transitory computer-readable storage medium and may be executed by one or more processors to perform operations described throughout this disclosure.

First, user permissioning logic 6-7 is present, generally to ensure each user has an account and that the account holder have access only to that content he has been authorized to receive. The user permissioning logic 6-7 may be understood with reference to a series of use cases. For example, consider a situation in which a plaintiff's attorney, a defendant's attorney, and a judge all are using the web application to review a deposition transcript. In this example, the plaintiff's attorney, the defendant's attorney, and the judge should be able to view some information that is public and common to all users, but should not be able to view information that is private or confidential to one of the other users. The user permissioning logic 6-7 ensures that the plaintiff's attorney, the defendant's attorney, and the judge see only the information that they are permitted to view. For instance, the user permissioning logic 6-7 controls display to the defendant's attorney and the judge, so that they can perceive designations shared by the plaintiff's attorney, but not confidential notes or annotations to the transcript made by the plaintiff's attorney. Similarly, the user permissioning logic 6-7 controls display to the plaintiff's attorney and the judge, so that they can perceive counter designations shared by the defendant's attorney, but not confidential notes or annotations to the transcript made by the defendant's attorney Second, file format and data parsing logic 6-8 is required. This logic is used to ingest transcripts from a user. Within the legal industry, for example, there are a number of various electronic formats for transcripts, including .txt; .ptf, a file format most often associated with transcripts capable of being read by, or exported by, the commercially available transcript utility called LiveNote by ThompsonReuters; .ptx (or occasionally as an .exe), most often associated with transcripts capable of being read by, or exported by, the commercially available transcript utility called "eTran" by RealLegal; .mdb, the Microsoft Access formatted transcript type from Verdict Systems and its software called Sanction II; .cms (or .mdb, Microsoft Access) formatted transcript type from in Data and its software called TrialDirector; and a number of other file formats used by common transcript management and/or trial presentation utilities.

The purpose of the file format and data parsing logic 6-8 is to ingest a transcript, to parse it according to its known formatting attributes for the purpose of extracting information including the text transcription, page and line numbers, headers and footers, multimedia associations, document exhibit listings and document exhibits, and timestamp data (or video frame data) and rendering all of said information into an intermediate, standardized format (herein referred to as the "xml-type" format) for use in the described system as a synchronization index that can be communicated to, and understood by, a mobile computing device.

Third, multimedia delivery logic 6-9 is provided. The multimedia delivery logic 3-9 functions to deliver multimedia content to a user. For instance, the media delivery logic 6-9 may provide media encoding, HTML5 browser support, HTTP Live Streaming, and media (e.g., iTunes) File Sharing.

Fourth, mobile computing device function logic 6-10 is explained. Mobile computing devices may be different from one another, so a separate mobile computing device function logic 6-10 is often needed to facilitate communication of data and multimedia to the device. Mobile computing device function logic 6-10 may include logic for the Apple iPhone (running the Apple operating system called iOS, including iOS 3.2 and iOS 4.0-4.2), the Apple iPad (running iOS, including iOS 3.2 and iOS 4.0-4.2), mobile computing devices running an Android operating system, and Research in Motion-type or Blackberry-type mobile computing devices (for example those utilizing Blackberry operating systems), and mobile computing devices utilizing the Symbian3 environment (to include devices manufactured by Nokia, such as the smartphone device sold with the tradename "N8").

By way of example, the mobile computing device function logic for the Apple iPad is written in Xcode for iOS4.2 and is compiled to communicate with the web application. A user, having the correct permissions, can access the web application for retrieval of one or more synchronization indexes and corresponding multimedia. Fifth, search logic 6-11 is present to facilitate search of a synchronization index or a collection of multiple synchronization indexes. Once a user has used a mobile computing device to select a synchronization index, that synchronization index can be communicated to the device in whole and cached there, or it can be communicated to the device in part and subsequent portions of the synchronization index can be communicated to the mobile computing device as the user requires. Since many mobile computing devices have limited memory storage capacity and RAM, relative to laptop computers, desktop computers and servers, it may be advantageous to allocate certain tasks to that device best equipped to handle the task, while factoring in speed, efficiency, system resources and connectivity. A search for text is one such task, and that is one reason for search logic.

For example, if a user elects to retrieve the synchronization index for a single deposition having, say, a 300 page length if printed, the mobile computing device may be able to download the entire synchronization index and store it in memory. A text search of that deposition may reference the locally stored copy of the synchronization index and return a search result. This may be done with speed and efficiency on the mobile computing device.

If, however, the user expands the text search to include all depositions within that legal case of, say, 50 depositions rather than just searching one 300-page deposition, the search controller provides logic to efficiently perform the search and return search results to the mobile computing device. For instance, the search may first reference the locally stored content, then the logic comprising the search controller may ask the remote server to conduct the search on the remaining transcripts to be searched. Without necessarily communicating the entirety of all fifty synchronization indexes to the mobile computing device, the server can return to the mobile computing device only the search matches. When the user selects one of those search matches, only then would the server deliver a larger portion of that specific synchronization index, or the entire synchronization index, to the mobile computing device.

The search logic also facilitates search across vast libraries of synchronization indexes. It is contemplated that searches may involve, for example, searching lyrics of thousands of songs that may be hundreds or thousands of gigabytes in size. Such a search is best conducted on a server. As another example, a user of an Apple iPod with 32 Gb of memory may have a portion of that space allocated to, say, storage of 5000 songs, 2500 of which have lyrics that have been downloaded and stored to the device. A search query would first be executed upon the lyrics resident on the device and search results returned and displayed, and, at the user's option, the query would be extended to a server-side search to encompass lyrics not resident on the mobile computing device, to return and display search results.

Next, annotation and edit logic 6-12 is provided to allow manipulation of a transcript. In general, this is the logic employed to facilitate the transcript management and manipulation functions described above, including functions relating to creating annotations, notes, issue codes, merging designations, flattening designations, locking designations, and so on. Annotation and edit logic 6-12 communicates updates made on a mobile computing device to the remote server for storage and sharing with other users.

Seventh, video, display, and playlist logic 6-13 is employed. The video, display, and playlist logic 6-13 may perform video clip sequencing, jump to location features, runtime calculation, display of font/appearance, display and control of a scrub bar, timestamp editing, header/exhibits formatting, and variable speed playback control.

Eighth, linked exhibit logic 6-14 may be used. As described above with respect to synchronized exhibits, within a deposition, documents are often placed before the witness to elicit testimony. These are called deposition exhibits. When reviewing the transcript, it is often helpful for the reader to have convenient access to deposition exhibits, particularly accessible as a document linked to the deposition text where the exhibit was utilized. Linked exhibit logic 6-14 may assist in delivery of material other than the transcript, by using the synchronization index to retrieve that material. For example, the linked exhibit logic 6-14 may comprise a hyperlink within the text displayed in the transcript that a user may select for display of a particular deposition exhibit. If, for instance, an exhibit is referred to as "Smith Exhibit 1" in the transcript, the logic of the linked exhibit controller would link that text to the document comprising Smith Exhibit 1, perhaps a pdf image or a tiff image. A user following that hyperlink would be brought to the appropriate image.

Alternatively, for use with the Apple iPad, the linked exhibit logic may comprise logic to display material without input from the user. For example, if the synchronization index is constructed properly, a document can be linked for display at a time within the multimedia without prior user input. While the user watches the multimedia, and synchronous text display, a deposition exhibit may appear on the screen at the time it is relevant and would be useful for the user. The user can elect to play/pause the multimedia, navigate to selected pages from the deposition exhibit, or remove the deposition exhibit from the display and resume playback of the multimedia and text.

Ninth, errata sheet logic 6-15 may be used. The errata sheet logic comprises logic to display only an accurate transcription of the media. A more specific description of the function of errata sheet logic 6-15 is discussed, above, as is the way the logic operates to facilitate display of an accurate transcript.

Tenth, output formatting logic 6-16 is present. This is the logic required to provide the various printed outputs, described above, for the organized printing of a transcript with annotations and notes, including notes that can be printed substantially adjacent to the text to which it is associated.

Eleventh, scheduling and invoicing logic 6-17 is provided to facilitate the ability of a user to see a calendar (e.g. for depositions) and to pay for service. The web application may function as a subscription-based case management program with a recurring payment component, and this logic operates to facilitate processing of payments from a user account based on a subscription agreement.

Twelfth, variable content logic 6-18 is provided to make the system adaptable for uses in various alternative industries. This logic generally relates to the graphical user interface and graphical elements that may be suited for a particular use or industry. This includes the delivery of targeted advertising, branding elements, graphical "skins" to achieve a desired look-and-feel for a given application, commercials, and so on.

The web-based software application employs a number of controllers for various related devices, functions, and software associations.

In general, some function controllers for the web-based software application are used for operator manipulation of data via the mobile computing devices and have logic configured to perform a plurality of actions, specifically: to upload, manage and run file/format and video/text data; search engine functionality; annotation and editing capability; calculation of video run time from designations without first creating a video clip; adding and merging or flattening of designations; cross-party communication to finalize designations; electronic errata sheet creation and updating; updating of issue coding and batch import of issue codes; a utility for printing with objections adjacent to designations; a utility for communication between parties; and a mechanism for a judge to participate by making evidentiary rulings in the transcript management utility.

As shown in FIG. 6, a hosting server is used in conjunction with a multimedia server. A dual server system is shown for the present system due to the complex interactions between the web application, the multimedia server, and the plurality of mobile computing devices, as well as the substantial volume of information being uploaded, managed and served to users.

As an example, the hosting server is a cloud based computing platform, such as the hosting service provided by Heroku. The Heroku Server is preferably a platform as service/ruby on rails type cloud platform having open-source extensibility. The hosting server may deploy Amazon Simple Storage Service (Amazon S3) and Amazon Elastic Compute Cloud (Amazon EC2). This server stores a SSL-encrypted case management web-based software application, all user information, and case data information, to optionally include synchronization indexes. The hosting server is also the preferred location for the web application to be executed. A Heroku Server or other equivalent hosting server may control the cloud computing and data storage objectives described above without departing from the scope of the present disclosure.

An appropriate multimedia server is a server, or multiplicity of servers, configured to deliver multimedia, preferably multimedia that is appropriate for the receiving device and the bandwidth available to it. Exemplary multimedia servers and related services to deliver multimedia with a number of variant playlists include a Brightcove HTTP streaming server, or an Akamai HTTP streaming server, or a Wowza media server. A preferred HTTP streaming server has open-source extensibility and is adapted for streaming many multimedia formats, including in variant playlists, including audio, H.264, MPEG4, M4V type media files; HTTP Live Streaming (HTML5); MPEG-2 transport stream (H.264 video/AAC audio); and multimedia segmented for delivery on an Apple iPhone or iPad. Preferably, all multimedia data and text data is stored on the multimedia server.

The multimedia server may be configured to deliver streaming multimedia to a mobile computing device directly. It may also deliver streaming multimedia to a computing device directly, for example to a user of the web application using a web browser. The multimedia server may also be configured to deliver multimedia to an intermediate computing device that may then transfer multimedia to a mobile computing device. For example, a user that desires access to multimedia using a mobile computing device may elect to store the multimedia on the mobile computing device itself. Apple's iTunes, for instance, may be used to communicate multimedia from a computer to an iPad or iPhone temporarily tethered to the computer.

The hosting server and the multimedia server are in electronic data communication with one another and with a plurality of mobile computing devices operated by a plurality of users or operators, typically, attorneys and paralegals or commercial multimedia consumers. There are many suitable mobile computing devices, as listed above. The iPad with iOS 3.2-iOS 4.2, and the iPhone with iOS 4.0-iOS 4.2 may be used. The iPad tablet-type mobile computing device offers functionality, including the ability to multi-task in iOS4.2.

Specifically, the iPad is adapted to have a case/deposition reader with deposition viewer and supporting issue code identification; annotation functionality; case and deponent level search-ability; HTTP Live Streaming capability; annotation and time stamp editing; CoreText-type engine for text display ability; and exhibit linking and display via MPTimedMetadata with iOS 4.2. The iPhone is suitable for a subset of the above functionality, primarily due to the fact that its screen is smaller than the iPad, and is therefore a viable choice for a mobile computing device adaptable to the present system. Specifically the iPhone is capable of case/deposition reading with deposition viewer and supporting issue code identification; annotation functionality; and case and deponent level search-ability. Any combination of the above described mobile computing devices may make case management and performing the above manipulations now a nimble, in real time, task instead of the arduous and cumbersome modes of case management as are known.

In some implementations, a video display device may be associated with one or both servers. The mobile computing devices may be in electronic data communication with both the video display device and the servers. When a user performs a manipulation on a mobile computing device, such as scrubbing to a certain point in a video, the output or display may be shown on the video display device, either alone or along with being displayed on the mobile computing device. In this regard, the mobile computing device may be used to control display on a separate video device (e.g., a video display device in a courtroom, a video display device in a conference room with several participants, a video display device in a remote location, etc.).

In some examples, the data produced by the web-based software application is viewable on a plurality of mobile computing devices. A predetermined gesture on a hyperlinked line may initiate identification of desired video, may identify the elapsed time within that video, fetch and begin streaming the video at that time back to the mobile device, and finally begin scrolling the transcript in synchronization with remainder of the video as it plays. In these examples, a plurality of mobile computing devices may be used by multiple users, and playback may be provided via an independent display device associated with the remote server where data is stored. The web-based software application may have full search functionality for data accessible to the web-based software application. The web-based software application also may allow users to log identity (e.g., name, password, firm, mobile device serial number, phone number, etc.) and keeps record of multimedia files accessed, the portion of the transcript that would correspond to those segments viewed, and the individual who made/approved the designation.

Mobile Computing Device Software

A mobile computing device runs software for transcript management. First, the mobile computing device software has logic configured to communicate with the web application running on the hosting server. This communication allows transfer of a synchronization index to the mobile computing device. As described above, the web application ingests transcripts of a number of formats, then parses the data for re-formatting into an xml-type synchronization index. This xml-type synchronization index is then communicated to the mobile computing device, and the logic of the mobile computing device software operates to display the text of the synchronization index on the viewing screen.

The mobile computing device software includes logic to present the text of the synchronization index to the user in a display of a multiplicity of text lines. When viewed in synchronicity with multimedia content, the text display is rendered in a smoothly scrolling teleprompter-type display. To denote the point within the multiplicity of text lines that corresponds to the multimedia, there is a position indicator. An appropriate placement of the position indicator is approximately five lines of text from the top of the text display. The position indicator may be a rectangular, semi-transparent graphical element of a predetermined color that is layered beneath the text. The purpose of the position indicator is to allow the reader to easily and quickly determine, when multimedia is playing, the line in the transcript that corresponds at a given point in time.

As one display option, the text scrolls, while the position indicator remains static. As the end of a line of text is reached within the multimedia, the multiplicity of text lines smoothly scrolls to re-position the next line of text into the area of the position indicator, while the position indicator remains static.

Alternatively, the display of a multiplicity of text lines may remain static while the position indicator descends through the text one line at a time. In this view, the position indicator begins at the top of the block of text lines and descends through the lines. When the position indicator reaches the bottom of the block of text lines, the block of text lines is refreshed, and the position indicator begins again at the top of the refreshed block of text lines.

With the scrolling text view, the text is synchronously displayed with the multimedia. The user may perform a gesture to scroll through the transcript. For example, on an iPad, a bottom-to-top drag (or swipe or flick) on the transcript will scroll to succeeding text lines or pages. This is similar to the way users may be accustomed to scrolling through text on a web page delivered within the Safari web browser present on iPad and iPhone mobile computing devices, either using the touch sensitive viewing screen or a multi-touch surface apparatus to accept gestures.

The user may select settings to determine the behavior of the video when bottom-to-top swipe is performed to read succeeding transcript pages. In the first setting, if multimedia is playing and a bottom-to-top swipe gesture is performed, the multimedia will pause, and the transcript's scroll to succeeding pages will be controlled by succeeding vertically oriented swipes or gestures. Because the user has now navigated away from the point at which the video was paused, the user may elect to begin playing the multimedia that corresponds to the text now residing within the position indicator, or, in the alternative, the user can elect to "re-sync" the transcript to where the multimedia was paused. This election is made in one or more graphical buttons, which may be placed on or near the rightmost portion of the position indicator. For example, when a user has navigated downward in the text, thereby pausing the video, one button may be labeled "play here" while another button may be labeled "re-sync/go back." The "play here" button causes the text to become most important, meaning that the text within the position indicator will cause the video to scrub to the correct location and begin playing. The "re-sync/go back" button will cause the video to become the navigational aid or bookmark, causing the video to resume play where it was paused, and the transcript will be refreshed to place the correct text back into the position indicator. With these two options, a user can use the text to navigate the video, or the video to navigate the text.

The user may also elect to begin multimedia playback from any line of text, even if that line is not congruous with the position indicator. To do so, a preselected gesture applied to a line of text is assigned to play multimedia. This gesture may be a swipe, a tap, a double-tap, a swipe and tap, a triple-tap, or any other gesture the user may select to associate with the playback function. This is helpful, for instance, when a user is playing multimedia and desires to view other text, but keep the multimedia playing in the meantime. The user may set a setting to, upon a gesture to view succeeding pages of text, keep the multimedia playing. While that media is playing, albeit now not in synchronous view with the transcript, a new play location can be found with the text, and the new multimedia playing location can be accessed with the selected gesture. While the video plays, the user can use the "re-sync/go back" button to instruct the text to re-coordinate with the playing position of the video.

Next, the mobile computing device software includes logic for facility to scrub through the text and multimedia via a navigational scrub bar. This navigational scrub bar is preferably visible at the bottom of the text display. It comprises a graphical representation of a time duration t=x to t=z, and a graphical element as a place marker to mark the position t=y between t=x and t=z. If the navigational scrub bar comprises the entirety of the video, x=0 and z=end. If the navigational scrub bar does not comprise the entirety of the video, but only a portion thereof as adjusted by the user to focus on less than all of the available video, t=x is earlier than t=z. The logic enables the user to scrub through the video and text by adjusting the location of the place marker. The place marker can be moved by corresponding input on a touch sensitive display screen, for example by using a finger to slide the place marker to a location on the navigational scrub bar.

Advantageously, when the place marker is moved, the logic achieves near simultaneous coordination between the multimedia being displayed and the corresponding text. To the user, the two appear to be inextricably linked, providing a seamless integration between scrubbing text and multimedia on a mobile computing device. Such near simultaneous coordination between the multimedia being displayed and the corresponding text is preferable in the circumstance where the multimedia content resides in memory on the mobile computing device, which the mobile computing device's processor can access with low latency, as opposed to the instance when multimedia is being streamed to the mobile computing device. For streamed multimedia, inferior data communication speeds may temporarily interrupt a seamless video display, in which case temporary reversion to an audio-only stream may still provide the near simultaneous coordination between media and text the user desires.

The term "near simultaneous coordination" should be understood to be as simultaneous as can be achieved given the computing constraints of a particular mobile computing device and, described above, the speed at which data can be transmitted to the mobile computing device. In some examples, the multimedia resides on the mobile computing device and the coordination between text and multimedia may be a fraction of a second, a delay length being virtually imperceptible to the user. The lower the latency able to be achieved, the better the user experience.

The function of the logic for the navigational scrub bar may provide a heretofore unavailable user convenience in simultaneously navigating synchronous text and multimedia on a mobile computing device.

Next, the mobile computing device software includes logic for facility to select a word or range of words, apply certain attributes to them, and save those attributes. For example, in a deposition transcript, as described above, the user may select a "page:line to page:line" range, assign a color to it, assign it an issue name, and attach a note to be associated with the selected text. This process is known in the legal industry as issue coding a transcript.

In some implementations, on the Apple iPad a double-tap gesture on a word will cause a pop-up with handles to refine the range of the text to be selected and with options for the user. Those options include ability to select a color, assign an issue name, create a new issue name, provide a note, copy, copy to an email, and so on. Generally, the user is provided facility, via a series of pop-ups, to perform a multiplicity of annotations or edits to the range of text selected.

These transcript manipulations can be saved to the memory of the mobile computing device, and they can also be communicated back to the web application on the hosting server. Later, succeeding users may access the revised synchronization index, thereby achieving a collaborative work environment.

Figure 19:
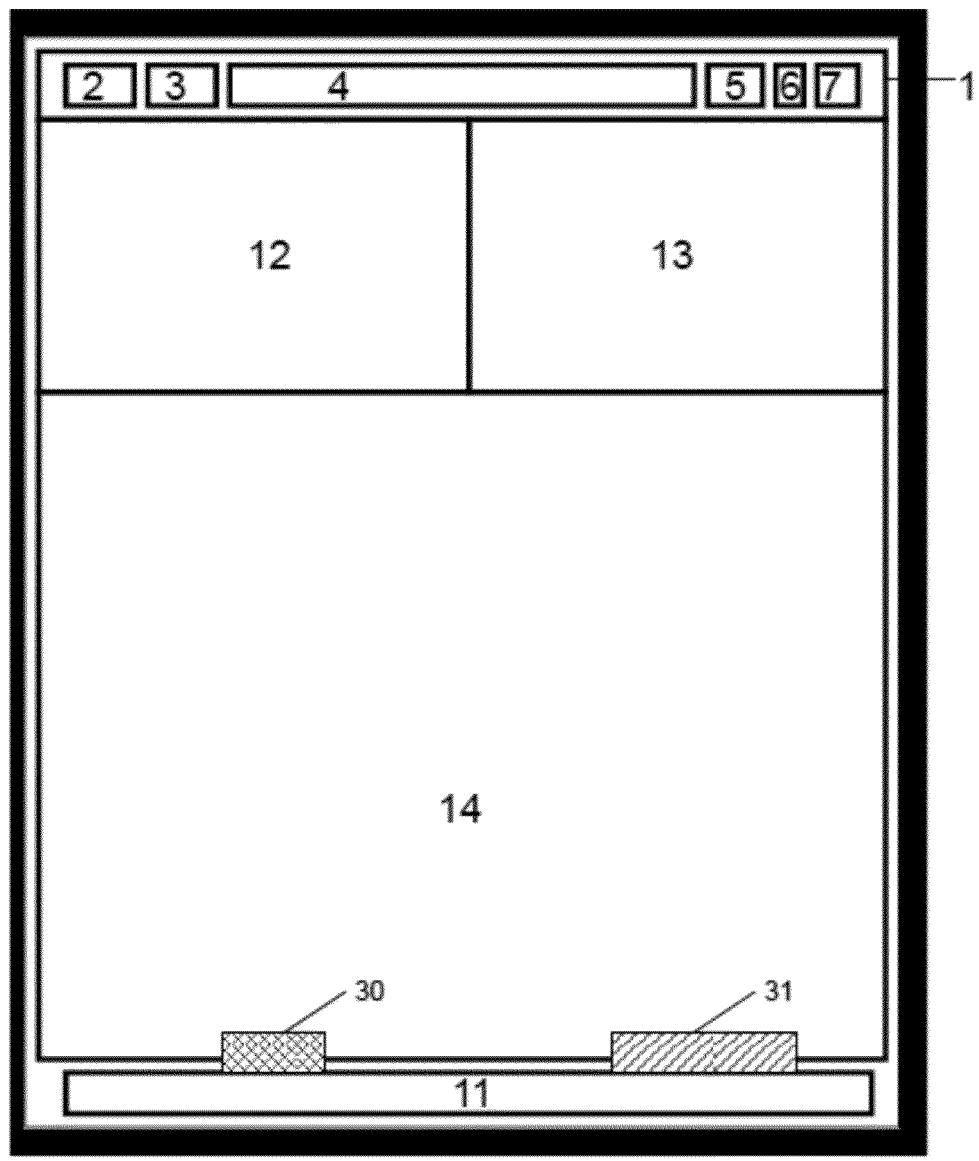
FIG. 19 illustrates exemplary graphical elements may be displayed to indicate other highlighted/designated portions of a text transcript.

Once an annotation has been made, for example a range of text being highlighted in the color yellow and assigned to the issue group "Plaintiff's direct designation," that yellow highlight will persist with that text any time the user has selected its display. In addition, since that text corresponds to a discrete portion of multimedia, the user may optionally be provided the facility to locate that yellow annotation by reference to the navigational scrub bar as well. With reference to FIG. 19, another graphical element, for example a hatched rectangle, labeled 30, may be provided either on the navigational scrub bar, or above it, or below it to indicate a corresponding annotation in the text. In this example, the user may look to the navigational scrub bar and would see a hatched rectangle that corresponds to the highlighted text. In this fashion, the user can quickly determine by looking at the navigational scrub bar to determine where highlighted portions of the text reside, without necessarily needing to view or scroll through the entirety of the text transcript. As shown in FIG. 19, other graphical elements (e.g., graphical element 31) may be displayed to indicate other highlighted/designated portions of the text transcript. The graph elements 30 and 31 may be displayed differently to indicate that the highlights/designations were made by different users, that the highlights/designations correspond to different issues, or that the highlights/designations were made at different times.

Further, the mobile computing device software includes logic for facility to sequence pre-selected "page:line to page:line" ranges of text and associated multimedia, to the exclusion of other text. For example, a user may have ten different issue codes (with each being assigned its own color), each having a multiplicity of page:line ranges associated with them. The user may elect to view only those page:line ranges that correspond to, say, issues 1, 3 and 7. In other words, any text not included within those issues would not be seen. The corresponding multimedia plays as well, skipping those portions of text not selected, and jumping as seamlessly as possible to the multimedia location corresponding to the succeeding selected text. As a consequence, all visible text would have an associated highlighting color, and the entirety of the refreshed navigational scrub bar would have at any discrete time at least one color. In this fashion, the user can very quickly determine from the navigational scrub bar the total run duration for the selected issues, the relative time duration expended by each discrete issue, concentrations of one issue relative to another along the time spectrum, and so on.

Sequencing of video clips also allows the attorney to very closely approximate the multimedia he intends to display to the judge or a jury, with the advantages being that no cumbersome trial presentation software is required, that no video editing expertise is required, that only a mobile computing device is required, that the multimedia can be shared with other users, say a legal client, because the multimedia is capable of being streamed to any validated mobile computing device by the streaming server, and so on.

In some examples, once the user has selected that sequence of video clips desired, the logic of the mobile computing device may be configured to output a load file intended to be used for creating video clips within trial presentation support software applications, such as SanctionII with a StartPage.StartLine+EndPage.EndLine format.

In some implementations, and as described above for the web application, the mobile computing device software also includes logic to calculate a duration list, without necessity of creating video clips, by performing calculations from the synchronization index itself. For example, if a user annotates a page:line range within a transcript, the software examines the synchronization index to compute the time difference between EndPage.EndLine and StartPage.StartLine. In this manner, computations can be output for each annotation, for all annotations that comprise one issue, for merged issues, for more than one issue, and for the totality of all annotations. This may be particularly useful when used in conjunction with the above described logic for facility to sequence pre-selected ranges of text and associated multimedia.

As described above for the web application, the mobile computing device software also includes logic to perform text searches. The user may elect to perform a text search on one synchronization index, on a multiplicity of synchronization indexes, or on an entire universe of synchronization indexes.

The mobile computing device software may also include logic to determine text font, size, color, and other attributes. In the context of a legal transcript, it may be particularly important that any such changes not affect the user's ability to determine the correct page:line reference should that portion of the transcript need to be cited in a legal paper or to the court. One way to ensure line breaks of the original transcript are ascertainable, even if font sizing causes a line wrap, is to insert a selected character, such as a relatively unobtrusive red-colored pipe character, at the end of each line which, when touched, reveals a page:line reference. In this manner, font size can be increased to cause line wraps but the user can still simply access a page:line reference.

Moreover, it may be advantageous to employ logic to ensure the transcript can be read in a comprehensible format. For example, in a legal transcript, hard returns between lines of text attributable to a certain speaker should be retained. A line tagged as a question by an attorney, often begun with the characters "Q:" should never be confused with the witness's answer, which lines may begin with the characters "A:" or with an indication of the witness's name. To the extent possible, the logic should parse questions from answers, and perhaps allow the user to apply certain attributes to only certain portions of the transcript. An example would be a deposition transcript, where the reader may more easily read and understand the content if all questions or attorney statements are in bold text, whereas all statements or answers by the witness remain in a non-bold type font. Other default font characteristics may be desirable and may be specified within the synchronization index, for example tagging all speech by one user as a pre-selected color.

The mobile computing device software may also include logic to receive only that content that a user is authorized to receive. A user of a mobile computing device may utilize a synchronization index to view the text of a deposition transcript. In some circumstances, attorneys may designate certain portions of the transcript as Confidential, Restricted Confidential, or Attorney's Eyes Only, categories typically defined by the court in a protective order that limits the individuals who may rightfully access certain testimony. In these instances an administrator, via the web application, manages a set of permissions unique to each user within the administrator's workgroup. In this fashion, an administrator may utilize the synchronization index to issue code those transcript sections that might be, for example, Confidential, Restricted Confidential, or Attorney's Eyes Only. A subsequent user may not be assigned full administrative privileges, but may be granted access to the transcript including sections issue coded Confidential, but excluding sections coded Restricted Confidential or Attorney's Eyes Only. For this user, the logic of the mobile computing device software masks or otherwise redacts those portions of the text that correspond to transcript sections he is not authorized to see. In coordination, the logic also prevents that user from accessing multimedia that would correspond to transcript sections he is not authorized to see.

In circumstances where the video upon playback reaches a point for which access is limited by, say a Restricted Confidential designation, the video would seamlessly play while omitting the area of limited access. In other words, video playback stops at a section for which access is limited and immediately resumes at a point after that section of limited access. Optionally, an audio indicator of limited duration, for example a short ping, can be inserted to audibly indicate the omission of certain multimedia content and corresponding text.

Relatedly, the mobile computing device software may also include logic to ensure the delivery of multimedia and synchronization indexes only to authenticated users by an authentication routine, which may include encryption. That is, the mobile computing device, before receiving a synchronization index or multimedia from either the hosting server or the multimedia server, needs to be authenticated in an authentication protocol. Thereafter, the content may optionally be encrypted and communicated to the mobile computing device. Such security may be important in certain circumstances, such as legal proceedings where the parties need to ensure access is provided only to specific individuals, and that any access can be logged and verified as having occurred. Data encryption techniques may be employed to achieve high levels of security and accountability.

Next, the mobile computing device software may also contain logic to play multimedia at a speed that is greater than normal speed. It is possible for multimedia to be consumed and understood more easily, and with a higher level of retention of the material, if a user reads text at the same time audio is available. The logic that controls playback speed allows the user, via a GUI, to select a playback speed incrementally faster, or slower, than a regular playback speed (e.g. $-2.0\times$, $-1.9\times$, $-1.8\times$, $-1.7\times$, $-1.6\times$, $-1.5\times$, $-1.4\times$, $-1.3\times$, $-1.2\times$, $-1.1\times$, $-1\times$, $1.1\times$, $1.2\times$, $1.3\times$, $1.4\times$, $1.5\times$, $1.6\times$, $1.7\times$, $1.8\times$, $1.9\times$, $2\times$, where x is the normal playback speed.) The user may also be provided the option to keep the pitch of the video equivalent to that of normal playback speed, which aids the user in comprehending human speech within a regular pitch range, but at increased speed. To accomplish faster than normal playback speeds, the multimedia may be played from memory resident on the mobile computing device, for example in flash memory or cached in RAM from multimedia that is streamed to the mobile computing device from a multimedia streaming server. With availability of sufficient data transfer speeds between a multimedia server and the mobile computing device, faster than normal playback speeds may also be accomplished.

The logic of the mobile computing device software may also be configured to negotiate among several multimedia variant playlists to select the most appropriate bitrate and/or video dimensions depending on the mobile computing device of the user, the wireless connectivity speed available, and the playback option selected. For example, if the user's mobile computing device has limited connectivity speed and the user has elected to play the multimedia at $2\times$ speed, the multimedia server may not be able to deliver the multimedia at high bitrate and large video dimension without pauses, dropouts or the like, while the multimedia caches on the mobile computing device. Accordingly, logic of the mobile computing device software may negotiate down to a low-bitrate audio only stream available within the variant playlist, which facilitates the ability of more content to be cached to the mobile computing device more quickly thereby providing the user uninterrupted playback of audio at his selected $2\times$ playback speed.

Next, the mobile computing device software may also include logic to cause the multimedia to play in full screen mode upon a gesture and, upon subsequent gesture, retreat back into a pre-configured location for use with synchronous text display. If, for example, the viewing screen is apportioned according to the layout of FIG. 3, the multimedia display area resides in a fixed location at the upper left of the viewing area. To send the video to occupy the full viewing area, a gesture, for example a pinch out (a two finger reverse pinch), will expand the video to full screen. To return the video to its original location, a pinch gesture, or similar, may be used.

The mobile computing device software may also include logic configured to receive a realtime text feed (or other temporary or draft transcript without having been proofread and corrected for errors) from a court reporter or stenographer during the taking of testimony, for example during a deposition or a court proceeding. Common computer assisted translation (CAT) systems may be configured to broadcast a realtime text feed, including via a wireless LAN, and the logic of the mobile computing device software may be configured to wirelessly receive such broadcast. The realtime feed is then displayed on the viewing screen of the mobile computing device, and the annotation functionality, as described above for issue coding, may be applied to the draft transcript. It may be advantageous to utilize this logic within an overall system for transcript management, where the temporary transcript, and any user annotations on a mobile computing device, are communicated back to a web application. Later, the temporary transcript can be replaced by the final transcript in the manner that the annotations made on the draft will match the correct location within the final transcript. Thereafter, the final transcript can be delivered back to the user for use as a synchronization index, as has been described throughout.

The logic configured to receive a realtime text feed may allow a substantially wire-free deposition workspace, it allows a court reporter to conveniently carry and distribute mobile computing devices to deposition attendees to receive a realtime text feed, it allows an ease of use and ease of configurability not presently available in the court reporting industry, for example by use of an intuitive annotation functionality user interface, it makes consumption of realtime text transcription services more simple, thereby increasing the likelihood that such services will be utilized (and thereby providing additional revenue for court reporters with the professional ability to transcribe at realtime speeds), and it meets the further long felt but unmet need of providing an overall enhanced user experience for receipt of realtime text transcription services on a mobile computing device.

Each of the aforementioned elements of logic for operation on a mobile computing device may enhance the overall user experience, with the combination of such logic providing heretofore unavailable functionality for use of text-synchronized multimedia on a mobile computing device. The user's workflow and efficiency in reviewing transcripts on a mobile computing device may be greatly improved.

While examples have been often described in the context of text synchronized multimedia delivery for legal testimony and corresponding video, the described techniques may be adapted for many other commercial uses and is not intended to be limited for use within the legal industry. By way of non-limiting examples, the following applications of the described technique are intended to be possible without departing from the spirit of the disclosure.

Other Applications of the Embodiments

Music

The sale or rental of music on mobile computing devices accounts for billions of dollars of revenue for those who have developed interfaces for distributing music and other multimedia. For example, Apple Inc.'s iTunes software has found considerable commercial success because it provides a positive user experience and provides convenient access to an extensive library of multimedia content for purchase or rental. In light of that commercial success, Apple and its competitors need features to set their multimedia distribution systems apart from others, making them more interesting or more functional for users.

For example, the overall user experience sways a consumer and his purchasing habits. It is frequently the case that a convenient system will find more users than an inconvenient one, and a system with many functional options for the user will find more users than one with limited user options. Each additional feature has an impact on overall commercial success. Apple's CoverFlow within iTunes (conceptually expanded upon within the Apple OS-X Snow Leopard operating system), for example, simply makes album art, the graphic image comprising the front of a record album or the cover of a CD's packaging, available to the consumer as a method to quickly shuffle from one album, or set of songs, to another album. This functionality is said to enhance the user's overall experience with using Apple's mobile computing devices—iPods, iPhones, iPads and the like—and thus has increased the likelihood that a consumer will purchase multimedia for use on those devices as well as the devices themselves.

Accordingly, an object of this aspect of the present disclosure is to enhance the overall user experience in using or consuming multimedia by providing a synchronization index to accompany multimedia, providing the user an ability to smoothly and substantially synchronously scrub through the multimedia using written words as a roadmap. It may be advantageous, for example, to offer a system for a mobile computing device that allows lyrics to be delivered with music in a fashion that a particular line in the lyrics can be used to advance the music to that specific point within the song. The described techniques contribute greatly to the functionality of a multimedia delivery system, such as iTunes or its competitors, and therefore has a very positive impact on the overall user experience, ultimately translating into increased commercial success by way of sales of multimedia and the mobile computing devices sold to play the multimedia.

By way of example for the music industry, an artist records a song and the song is encoded into a common electronic format, including .mp3, .wav, AAC or a number of others. A software application can be used as a synchronization index generator to synchronize the lyrics to the song and output a synchronization index. The synchronization index, or database structure, may be a formatted .mdb file, with each lyric line receiving a timestamp corresponding to the time at which a particular word is heard. Using the web application, the mdb format is parsed and reformatted into an xml-type format. The synchronization index and information about the song to which it is associated is communicated to a remote server, for example a server accessible by Apple's iTunes, or the web application of the present disclosure. A user then uses a mobile computing device to communicate with the remote server to access the synchronization index and retrieve the associated song.

Once the synchronization index has been communicated to the mobile computing device, a hierarchical seek order may be employed by the mobile computing device to retrieve multimedia. For example, when a synchronization index refers to a song, that song may reside on the mobile computing device already. The software on the mobile computing device first inspects the mobile computing device for the presence of the song. If the song is found, it is played with the synchronization index. If the song is not found resident on the mobile computing device, a subsequent step may be to seek for the song resident on a device within a network accessible by a WiFi connection (for example a local area network of computers within one's home), and if found, communicated from that device on the network to the mobile computing device for playback. Next, if the song still has not been found, the software may seek for the song in a remote location accessible by internet connection or accessible by 3G or telephone/data network, and so on until the correct song can be located and delivered for playback on the mobile computing device. A user may set preferences to choose the highest bandwidth connection for highest quality multimedia.

As the song plays on the mobile computing device, lyrics display in a synchronous, smoothly scrolling teleprompter-type fashion. Each line of lyrics is, preferably, linked to a specific time within the song. A predetermined gesture (e.g., a swipe, a double-tap, a triple-tap, or similar, or movement of the line of lyrics to a static position indicator to indicate a desired playback location) jumps the song to that time of elapsed duration.

Some implementations include a multiplicity of synchronization indexes that are aggregated for search to provide an extensive library or database of text-searchable song lyrics. One example is an album of songs and corresponding lyrics, as one may find printed upon a folded insert accompanying music distributed on a CD. Another example is a library of lyrics, comprising hundreds or thousands of songs, adapted for use and search from, say, Apple's iTunes. For example, a user may search for a particular phrase from a song. The library of lyrics would be searched for a match, and the matches, with the synchronization index or a portion thereof, would be returned to the user. Optionally, the search result may also include data such as an artist name, a song title, an album name or image, a recording date, and so on to allow the user to locate a particular song. Because a synchronization index is returned, the user may jump directly to the specific part of the song associated with the lyric in the synchronization index, and a song preview may begin to play from that point for a predetermined, short duration that is less than the duration of the entire song. Advantageously, the user may more easily determine if that is the song desired, and then complete a purchase, a download or a rental of the song. The user may also be exposed to multiple artists' renditions of the same song, allowing more song purchase options for the user.

In some examples, a search for text would access a complete text library (e.g., hosted by Apple, Google, Microsoft, Amazon, or similar distributor of large libraries of multimedia content), return the hits, determine whether the identified song resides locally on the device, and, if not, provide a short stream of the song, with a solicitation to purchase the song or album. The same functionality applies to audio/visual books and movies, among other uses, without departing from the scope of the present disclosure.

Moreover, use of the described techniques for music may overcome the pitfall of karaoke-type closed captioning that occurs as a result of a limited number of text words being able to be displayed at once, whereas in certain circumstances a more complete text transcript would be preferable. For instance, song lyrics have the characteristics of poetry, or a complete story. The context of the words within the overall composition may have meaning to the artists, or to the reader, when read as a whole, rather than one line at a time or a few words at a time.

In addition, copyright holders for music may find it advantageous to distribute music with a synchronization index as opposed to just the music alone. Users are provided enhanced functionality with the ability to interact with and comprehend lyrics. Copyright holders are presented with a new opportunity for a revenue stream, wherein delivery of a synchronization index with music may command a monetary premium over the music alone, as well as a way to discourage uses of non-authorized works or content. If a user is certain the synchronization index purchased from the copyright holder of the music is guaranteed to be accurate in textual content and in the time links utilized to achieve synchronization between text and multimedia, the user may avoid alternate works that do not have such guarantees.

The described techniques may solve the problem of conveniently locating song lyrics from a mobile computing device, and then achieving synchronous playback of a song and its lyrics on a mobile computing device.

Movies and Motion Pictures

In another implementation, the multimedia may be a film, movie, motion picture, theatrical release, musical, music video, movie preview or trailer, or other video generally consumed for entertainment or used for documentary purposes. The synchronization index in this example comprises a screenplay, which may have spoken text, song lyrics, and other non-spoken words that the author may intend to be displayed, for example a screenwriter wishing to provide the audience the experience of reading his written direction cues for display with the video for study of how such cues were theatrically executed in the film itself. Screenplay authors can provide heretofore unavailable convenience for film industry professionals as well as new audiences. Screenplay authors generally do not have a broad consumer base for their written work product outside of industry-specific professionals, and the described techniques may allow a new consumer base to appreciate those written works of authorship, all with the additional benefit of being synchronously viewed with the resultant movie and theatric execution.

Moreover, another feature is provided by the present disclosure in that DVDs, Blu-ray discs and the like have typically been navigated by chaptering information included on the recording media that can be read by playback devices. These chapters have historically been used to navigate to preselected portions within the movie, such as may correspond to an Act or a Scene. For example, a movie may have contained ten or twenty discrete chapters, but typically not many more, and certainly not an order of magnitude more, which possibility is provided here for the first time.

With streaming media becoming more prevalent, however, consumers require something other than mere chaptering information for convenient access to the multimedia. With the described techniques, the synchronization index presents opportunity to apply timestamps to every word, creating hundreds, or thousands of "micro-chapters" that the user can use for nearly immediate, non-linear access to virtually any point within a movie. Legacy chaptering information can also be retained, as the synchronization index is not limited to spoken words, giving the producer a complete palette of navigation options to provide the consumer, including a table of contents and full-text search-ability.

Another advantage of the present disclosure is that the system allows the ability to text-search entire multimedia libraries. This allows a user to quickly access and watch selected scenes, with the result being that users rely more upon a cloud computing-type content distribution model wherein the entities providing those services, often on a subscription based business model, will retain paying members and the resultant revenue stream. The system also enhances the user experience of consuming multimedia, particularly on mobile computing devices, a factor that tends to increase market share for multimedia content service providers, such as Netflix or Apple sales through iTunes.

In addition, the system allows search criteria to be applied across multiple films with content from the synchronization index having the potential to be associated with other metadata for search purposes. For example, it is contemplated that a user may perform a search based on an actor's name, or a character's name, and a line spoken within a movie, without the user having to necessarily recall or search for the name of the movie itself. A search result, with appropriate metadata and tagging applied to the synchronization index, allows a user to access the exact scene desired.

In contrast, a common model for such searches is a search performed on the YouTube.com website for hosting video. With the YouTube model, millions of video clips are hosted which have been posted by thousands and thousands of disparate users, and the searcher finds the relevant scene only if the user posting the content happened to add the correct words to the title of the clip or as keywords associated with the uploaded video. The YouTube model for finding relevant and interesting video content, particularly for commercial films, is rife with copyright infringement and the potential therefor, with content owners needing to vigilantly police a multiplicity of hosting locations containing their own material and then follow procedures with those website operators to seek removal of the material due to copyright violations. Movie studios and other copyright owners are faced with the unpleasant prospect of having the content removed, thus potentially alienating a portion of their fan base who view content within those online communities and socially interact with other users, or leaving the content available but suffering economic loss due to 1) advertising losses, in that advertisers pay hosting services like YouTube based on the traffic generated, whereas that traffic often would not exist but for multimedia content users' desire to view interesting content, such as newly released films and so on; 2) the inability to control the user's experience; 3) the inability to display advertising of the copyright owner's choosing, be it for other movies it produces or distributes, for goods, for services, or for any other type of promotional, branding or goodwill enhancement; 4) lost licensing fees; 5) social networking interactions built upon common interest in movies, music, or other multimedia; and so on.

The described techniques provide a multimedia copyright owner the facility to make an entire film available as streaming media to a mobile computing device, and searchable via the synchronization index. Once a user performs a search, the user's identity can be verified to determine if he ought to be granted full access to the multimedia, say by having a current paid subscription with the multimedia content provider. If the user has no subscription, and thus ought not be provided unlimited access to the multimedia, it may be advantageous to offer the user limited access, or preview access, to, say, a 30-240 second clip only, thereby reducing incentive for searchers to hunt "unauthorized" content on unauthorized distribution channels. The described techniques incentivize users to maintain paid subscriptions to content providers in return for convenient, searchable, "always on" full access to their content. The modern mobile computing device user desires such convenient access.

Moreover, for the system of the present disclosure it may be desirable to increase the amount of multimedia with synchronization indexes. One may leverage existing synchronization index-type information for use with the system of the present disclosure by de-multiplexing closed captioned data from multimedia, or by transcoding existing closed captioned data sets. In this fashion, the web application, by the file format and data parsing logic 6-8, may re-purpose closed captioned data formats into an xml-type synchronization index. Closed caption file types suitable for this transformation include: SAMI (Synchronized Accessible Media Interchange), SMIL—(Synchronized Multimedia Integration Language), SubViewer (*.SUB), SubRip (*.SRT), .SBV, Adobe Encore DVD (*.txt), Advanced SubStation Alpha (*.ass), AQTitle (*.aqt), Captions 32 (*.txt), Captions DAT (*.dat), Captions DAT Text (*.dat), Captions Inc. (*.txt), Cheetah (*.asc), CPC-600 (*.txt), DKS Subtitle Format (*.dks), DVD Junior (*.txt), DVD Subtitle System (*.txt), DVDSubtitle (*.sub), FAB Subtitler (*.txt), IAuthor Script (*.txt), Inscriber CG (*.txt), JACOSub 2.7+(*.jss; *.js), Karaoke Lyrics LRC (*.lrc), Karaoke Lyrics VKT (*.vkt), KoalaPlayer (*.txt) (equal to one of the variations of TMPlayer), MAC DVD Studio Pro (*.txt), MacSUB (*.scr), MicroDVD (*.sub), MPlayer (*.mpl), MPlayer2, (*.mpl), MPSub (*.sub), OVR Script (*.ovr), Panimator (*.pan), Philips SVCD Designer (*.sub), Phoenix Japanimation Society (*.pjs), Pinnacle Impression (*.txt), PowerDivX (*.psb), PowerPixel (*.txt), QuickTime Text (*.txt), RealTime (*.rt), SAMI Captioning (*.smi), Sasami Script (*.s2k), SBT (*.sbt), Sofni (*.sub), Softitler RTF (*.rtf), SonicDVD Creator (*.sub), Sonic Scenarist (*.sst), Spruce DVDMaestro (*.son), Spruce Subtitle File (*.stl), Stream SubText Player (*.sst), Stream SubText Script (*.ssts), SubCreator 1.x (*.txt), SubRip (*.srt), SubSonic (*.sub), SubStation Alpha (*.ssa), SubViewer 1.0 (*.sub), SubViewer 2.0 (*.sub), TMPlayer (*.txt) (five different variations), Turbo Titler (*.txt), Ulead DVD Workshop 2.0 (*.txt), ViPlay Subtitle File (*.vsf), ZeroG (*.zeg).

Because existing closed captioned data sets may be old or inaccurate, users may modify the transcriptions as one would in making errata corrections to a deposition transcript. It may be advantageous to employ an open, wiki-style ability for a multiplicity of users to correct transcriptions. The result is that users are drawn in ever closer to the multimedia that attracts their interest, benefiting multimedia owners and creators as well as subsequent users and consumers.

As is evident, the present described techniques may contribute to an enhanced overall user experience, and may enhance commercial success and viability with respect to multimedia sales, content delivery subscriptions, and mobile computing device sales.

Educational Content and Regulatory Compliance

Yet another use for the described techniques is use for educational multimedia content and for access to multimedia created by or distributed by government, including multimedia whose distribution must meet rules and regulations for accessibility by disabled persons. There presently exists a large body of multimedia that is configured to meet rules and regulations for accessibility by disabled persons, however extensive use of closed captioning, with its many shortcomings set out above, for such compliance does not adequately address viewership of such multimedia on mobile computing devices. Mobile computing devices often have viewing screens that may be too small to accommodate legible text superimposed over video, they are often simply not configured to receive such closed captioned text, and the video files themselves when being transcoded or re-formatted for streaming media delivery unnecessarily strip or remove closed captioned text that may have originally provided regulatory compliance.

With the described techniques, multimedia content providers can provide a heretofore unavailable convenience for disabled users of mobile computing devices in a way that meets the requirements and intent of Section 508 Amendment to the Rehabilitation Act of 1973 (29 U.S.C. §794d), and others.

Educational content distributed by schools, universities, research institutions and the like can be consumed in multiple languages, as a synchronization index may allow the user to elect one of several language settings. Additionally, comprehension of content can be vastly improved as many studies indicate comprehension levels increase when users hear and read content at the same time. Moreover, the described techniques may facilitate learning, literacy initiatives, educational instruction, and they do so in a manner that mobile computing devices, with their increasing ubiquity, can be utilized for such worthwhile societal betterment objectives.

Voice-to-Text Voicemail and Telephony Recording

In another example, the multimedia may be a voicemail and the synchronization index may contain a transcription thereof. With the increasing use of mobile telephones/smartphones and voicemail services, many users find themselves deluged with lengthy voicemail messages that they do not want to take the time to listen through. New businesses have recently attempted to help solve the problem by applying voice-to-text transcription of voicemail and then sending, for example by email, the transcription of the voicemail to enable the recipient to more quickly understand what the speaker intended to convey. This transcription is often used in conjunction with a "visual voicemail" system.

With the described techniques, users are no longer required to choose to listen to the message or to read the transcription as an either/or proposition, but rather they now have for the first time a convenient way to navigate the voicemail multimedia with a synchronization index on a mobile computing device. For example, voice-to-text transcription software may be employed to create a transcription and in so doing it may apply a timestamp for each word, and in some instances one timestamp for what the software perceives to be the beginning of a word and one timestamp for what it perceives to be the end of the word. Because voice-to-text transcription software engines do not render perfect transcriptions, for a host of reasons, it may be important for the recipient to access the voicemail, but not necessarily from the beginning or with cumbersome fast-forward and rewind transport controls, to confirm the content of the message the sender intended. This is not unlike the use of an errata sheet in the legal context, wherein a user needs to check the transcription for accuracy; a task that is much easier to accomplish with convenient, non-linear access to the underlying multimedia itself, and preferably on a mobile computing device. Use of the described techniques for the aforementioned purpose may overcome many shortcomings of existing voicemail and transcription systems and services. It is another example of an enhanced user experience and provision of a solution to a long felt but unmet need for the mobile computing device user.

Use of the Synchronization Index and a Mobile Computing Device to Control Multimedia Delivery to a Receiving Device In some implementations, the synchronization index communicated to the mobile computing device may be used to seek video from a remote server, where the remote server is then asked to begin delivering video at time t1 to a device other than the mobile computing device itself. For example, a consumer of cable or satellite television services may desire to scrub video content that he can watch on a television within his home. In this embodiment, the user views the transcript, or a synchronization index, on the mobile computing device (e.g. Apple iPad), gestures on a transcript display on the iPad intending to scrub video to a certain location, then the request is communicated to the server to instruct it to deliver video at time t1 to destination d1, for example, a selected television within the home that has multimedia content communicated to it via a set-top DVR-type device, then the multimedia is delivered and, optionally, cached in whole or in part. In this manner, the iPad with the synchronization index functions as a sophisticated type of remote control for video content, using a transcript of the media to navigate precisely to a desired viewing location.

In common digital video recorder (DVR) devices, a user can elect to record broadcast television programming to a hard drive integral to the DVR. A user may navigate to a program guide and select content to record at a future time, or the user may elect to record the content being viewed live. Users then play back the multimedia at a later time. During playback, most DVR devices facilitate the ability to fast-forward through the recorded content, for example to avoid commercials, and the ability to rewind. Both fast-forward operations and rewind operations often include variable rate fast-forward and variable rate rewind, allowing the user to fast forward at differing speeds (e.g. 2×, 3×, 4×, −2×, −3×, −4×). These variable rates are intended to allow the user to scrub the video content to access the desired portion of multimedia content. They remain cumbersome in use, however, because they do not allow pinpoint scrubbing to a specific time location, nor is bookmarking, annotation, commenting, or social networking facilitated in most DVR-type devices. In further contrast, use of a synchronization index facilitates navigation in a multiplicity of ways, including navigating to a chapter, scene, or act, navigating by text, skipping discrete time blocks (30 seconds, 1 minute, 2 minutes, 5 minutes, 10 minutes, etc.), and so on.

In some examples, the synchronization index communicated to the mobile computing device may be used 1) to control multimedia resident on the mobile computing device itself, 2) to control multimedia resident on the mobile computing device itself, but then sent for display to a receiving device, 3) to control multimedia not resident on the mobile computing device itself, but stored on a receiving device (for example, if the receiving device was a commercially available home theater DVR-type device containing memory where multimedia has already been stored), or 4) to control multimedia not resident on the mobile computing device itself, and not stored on a receiving device, but communicated to the receiving device by a serving network or multimedia server (for example, if the receiving device had a network connection but little or no resident memory, or if a DVR-type receiving device had memory but had not yet had multimedia communicated to it and stored to memory).

Figure 20:
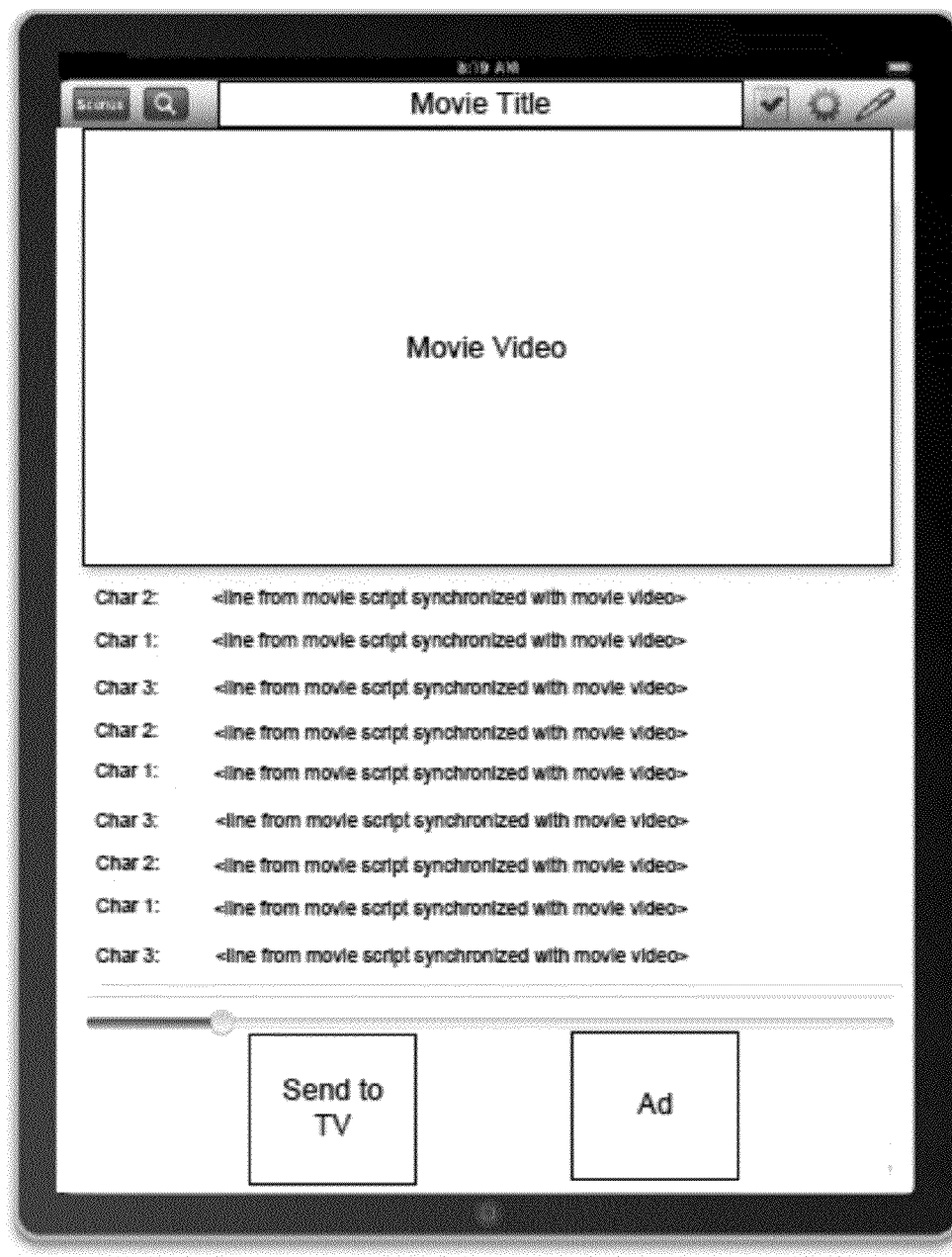
FIG. 20 illustrates a display screen of a mobile device that can be divided into multiple sections.

As shown in FIG. 20, the display screen of the mobile computing device can be partitioned to allow function buttons to be inserted at the bottom of the display. One such button may be configured to cause the mobile computing device to begin an instruction set that causes multimedia to be sent to or to be displayed upon the receiving device. In this manner, the synchronization index can be used to locate a desired viewing location, the desired viewing location can be viewed on the mobile computing device in video viewing area, and then the instruction set can be initiated to cause playback on the receiving device. One such example would be to use an Apple iPad, with a synchronization index and resident multimedia, that communicates using the Apple AirPlay protocol with an AppleTV appliance that, in turn, delivers multimedia to a home entertainment system.

Any number of hardware devices, or hardware/software combinations, may comprise the receiving device. By way of non-limiting example, a receiving device may be a digital video recorder, "DVR" (e.g., TiVo branded DVR appliance, Scientific Atlanta Explorer DVR device, Dish Network DVR, Hughes DirecTV DVR, Motorola DVR, Philips DVR, Polaroid DVR, and so on), a personal video recorder, "PVR", a hardware appliance for receiving cable television or satellite television services, a computer, a television, a smart television, an internet enabled TV (such as the Sony Internet TV), the AppleTV appliance by Apple, Inc., the GoogleTV appliance by Google, a gaming device with facility for receiving multimedia data (e.g., the Sony PlayStation3, Nintendo Wii console, Microsoft's Xbox360), streaming media players (e.g., Roku Streaming Player, Seagate FreeAgent Theater+ HD Media Player, Western Digital TV Live Plus HD Media Player), home theater appliances with facility to receive multimedia communication, and optionally to play Blu-Ray formatted media (e.g., as available from Insignia, LG, Panasonic, Philips, Pioneer, Samsung, Sony, Toshiba, Yamaha, VIZIO), a monitor, or another mobile computing device.

Multimedia may be delivered by any multimedia content distribution method, including by computer network, cable television or satellite television service, subscription multimedia delivery service (e.g., Netflix, Hulu, iTunes, Rhapsody, Spotify, MOG, Napster, Rdio, Grooveshark.com, Pandora.com, alluc.org, talk radio subscription content by radio personality, and so on), peer-to-peer network, Apple AirPlay, Universal Plug and Play ("UPnP", generally defined as a set of networking protocols for primarily residential networks without enterprise class devices that permits networked devices, such as personal computers, printers, Internet gateways, Wi-Fi access points and mobile devices to seamlessly discover each other's presence on the network and establish functional network services for data sharing, communications, and entertainment) and similar methods for delivering multimedia content.

While the term "video on demand" has historically been associated only with the user being able to select the time at which a video may have started to play, the described techniques allow a user to scrub video using a synchronization index, and vice versa, to a specific time within a multimedia file, thereby achieving a heretofore unavailable enhanced user experience.

In another implementation, one mobile computing device can be used to control multimedia delivery to a second mobile computing device. An intended example would be in-vehicle entertainment systems where one mobile computing device would be a master serving other slave mobile computing devices. In practice, a user may download multimedia to a mobile computing device, such as an Apple iPad. That first user, say a parent entering an automobile as a passenger with children who have mobile computing devices of their own, may broadcast multimedia to the other receiving devices (e.g., for this example, another iPad, the entertainment system within the vehicle, a handheld gaming device, or similar mobile computing device) via an appropriate communication protocol and use the synchronization index to facilitate navigation through the multimedia.

As another example, the system can be used for audio books transmitted to a different receiving device, such as a vehicle's stereo system, or another type of in-vehicle entertainment system with capacity to distribute sound and/or video images. A user may use a mobile computing device, such as the Apple iPad, to read a book on the mobile computing device. Because the text of that book also functions as a synchronization index to the audio book, the reader may insert a bookmark, discontinue reading, move to a different location where reading is impracticable (such as in a car), access the bookmark as part of the synchronization index, and begin the playback of the audio book at the precise location where the reader had stopped reading.

Moreover, the synchronization index comprising the text of the book can reside on the mobile computing device, while the audio portion can be streamed, or streamed and cached, to the mobile computing device, or to the receiving device. In this fashion, the iPad user may take a synchronization index into a vehicle, and direct audio content to be delivered and optionally cached directly to the in-vehicle entertainment system. For example, the in-vehicle entertainment system may be equipped with capacity to communicate wirelessly with a computer network (for example by WiFi, 3G, 4G, Bluetooth, or other wireless connection, such as OnStar). This capacity may be combined with computer memory integral to the in-vehicle entertainment system, for example by a hard drive, flash memory or similar storage. As a result, the in-vehicle entertainment system is in communication with the mobile computing device. Once a synchronization index, or a specific portion thereof, is accessed, the in-vehicle entertainment system can begin automatically downloading and caching corresponding multimedia for use in the vehicle itself. Once the user has finished listening to the audio, the receiving device can communicate back to the mobile communicating device the point at which listening ceased. A bookmark is inserted into the synchronization index at that point, and the next time the user accesses the synchronization index, he can return to the correct point within the synchronization index to either begin reading or to begin a new listening session. In practice, the user utilizes the synchronization index on the mobile computing device to establish non-linear access to corresponding multimedia content in a new, novel way.

With this and other uses, new commercial opportunities are provided for those who control distribution of text-based authored works and for multimedia owners. As an example, consumers have typically purchased either an electronic book for reading on a mobile computing device, or, in the alternative, they have purchased an audiobook. Very few, if any, users have purchased both products, particularly with the full feature set of the described system for use on a mobile computing device. With the described techniques and systems, synchronization indexes and corresponding multimedia can be offered for sale as a functional, inter-related, interactive product with annotation capacity, rather than just text alone or just multimedia alone.

Advertising

Moreover, television broadcasters dislike the functionality of the DVR that allows commercial advertisements to be skipped during time-delayed program playback.

Digital video recorders have been changing the way television programs advertise products. Watching pre-recorded programs allows users to fast-forward through commercials, and some technology allows users to remove commercials entirely. Some features of this type have been controversial, with some major television networks and movie studios claiming they violate copyright and should be banned.

The described techniques may facilitate the exposure to advertising, including from companies whose advertisements would have accompanied the initial broadcast. By using a portion of the mobile computing device's screen, targeted advertisements can be unobtrusively displayed in a way that does not obscure the viewing screen of the multimedia, and in a way that subtly and unobtrusively invites the user's interaction.

As illustrated in FIG. 20, the iPad display screen can be divided into multiple sections. For example, a section may be allocated for multimedia playback if the user desires to view content on the iPad itself, a section may be allocated for bibliographic data relating to the multimedia or programming content, a section may be allocated for transcript display and manipulation, and a section may be allocated for advertising or commercial content.

Targeted advertising may be delivered to the iPad. Criteria for targeted advertising may include: the user's profile and demographic data, geographic location, media being watched or accessed, media consumption history or previously viewed content, word search history, multimedia stored on the mobile computing device, and so on.

The portion of the iPad screen to display advertising can be periodically refreshed. Advertisements can be text, images, or multimedia. If the mobile computing device with synchronization index is being used in its capacity as a remote control for content on a receiving device, the multimedia can be received on a receiving device and played back without advertising displaying on the viewing monitor, while the advertising content remains on the mobile computing device. Additionally, advertisement on the mobile computing device concurrent with multimedia playback allows the user to interact with the advertisement, for example by clicking an ad or URL to be delivered to a website to receive more information about a company or a product.

For example, the synchronization index may be delivered as metadata to accompany the multimedia. The synchronization index may also provide instructions for the targeted, timed delivery of advertisement to the mobile computing device. These product placement-type advertisements can be very attractive to the user, yet subtle in the way they are delivered and displayed to the user. For example, a television program containing a car chase a given duration into the program may have timed metadata in the synchronization index for the delivery of an advertisement pertaining to the make and model of the car being used in the program. Product placement within multimedia can now be accompanied with a corresponding overt advertisement. With such an ad displaying unobtrusively on the mobile computing device, it increases the likelihood that the user will click through the advertisement to be brought to the website of the advertiser. In this way, the described techniques may make it easier for consumers to access information relevant to their interests or the multimedia content they access.

Another type of advertisement, used often for advertising TV shows on the same channel, places an ad overlay on the bottom of the TV screen, blocking out some of the picture, as was identified, above, as a shortcoming of closed captioning. Media companies refer to these "Banners," or "Logo Bugs," as Secondary Events (2E). Similar to the method by which severe weather warnings have historically been delivered, sometimes these secondary events take up only 5-10% of the screen, but in the extreme, can take up as much as 25% of the viewing area. Some secondary events comprise sound or movement of a graphic across the viewing area, which may be undesirable for the user. Despite the increasing usage of Secondary Events, advertisers are seeking new methods, like advertising as described herein, to market their products in concert with television broadcasts and similar programming without substantially interfering with the users' viewing experience. Advertisers are losing the ability to invade the home, and consumer's minds, and are consequently increasingly forced to wait for an invitation from the consumer. Advertisers and content providers are learning that advertising content customers will be willing to seek out and receive is more likely to impact purchasing decisions. It is that type of advertising facilitated by the described techniques.

Social Networking

As yet another potential advantage, the described techniques may facilitate social networking around multimedia, and present new ways for mobile computing device users to share and recommend multimedia to their network of friends or colleagues.

One way users are provided the facility to interact is in the way that annotations can be created to a synchronization index and shared with others. For example, a user may find the chorus of a particular song to be emotionally moving, and he may wish to share not just that song, but that particular part within the song, with his social network. By creating an annotation to the synchronization index, and then by sharing that annotation, a subsequent user may obtain access to the first user's annotated synchronization index for immediate, non-linear access to the specific part of the song the first user desired to spotlight for discussion.

In practice, a user utilizes the synchronization index on a mobile computing device. An annotation is made, and information concerning the page:line range, issue code, color, attached note, and so on may be stored local to the mobile computing device. This information may also be transmitted back to the web application on the hosting server, along with identifying information about the user, such as the mobile computing device identification number (for example, if an Apple device then the identification can be found in a unique "UDID"), time, user location, and so on. A subsequent user may access the web application on the hosting server, examine annotations to which he has been allowed access, and elect to download those annotations to his own synchronization index. As described above, the user may merge or flatten these annotations with his own, or he may keep a subset and discard a subset, or a combination thereof.

In this manner, a user can select a group of users whose comments, notes and annotations he wishes to receive, to establish a social network. For instance, this functionality may be used by a movie's director, producer, its actors or others to provide notes and commentary, on an ongoing basis, to enhance one's interaction relating to the film. Whereas Blu-ray discs became an attractive media for content delivery due in part to the disc's ability to physically store more data pertaining to the film by way of director's commentaries and so forth, the new feature set described throughout this disclosure may make interaction with one's audience an organic, ongoing process. Movie fans can interact with one another, and filmmakers can interact with consumers.

Similarly, a user may bookmark a part of a synchronization index, and transmit that bookmark as a URL-type deep link to a specific time within multimedia to a subsequent user. Accessing the deep link delivers a subsequent user not only to the correct multimedia but also to the correct location within the multimedia. This is particularly useful in a cloud computing environment, where users are increasingly not interested in managing their own multimedia assets on devices they own so long as they can access the content in another convenient way, for example by streamed media over the internet or wireless connection. These streaming media services, such as Netflix, provide access to vast libraries of content at an affordable price, and, with the described system, become an even more attractive way for users to consume multimedia content and share it, and portions within it, with friends and colleagues.

It is easy to appreciate the multitude of interactions possible between users who enjoy discussing music, movies, television shows, lectures, politics, and all manner of content, and how, with benefit of a mobile computing device and synchronization index, those social interactions can be enhanced.

There has been limited capacity to allow a user of a mobile computing device access to multimedia at a precise location within the multimedia for the purpose of engaging in social networking. The described techniques may address and overcome many of those limitations.

Other uses for a synchronization index and associated multimedia operating on a mobile computing device are legion, and may include movies, music, music videos, news, news archives, audio books, television shows, documentaries, radio re-broadcasts and archives, podcasts, business and corporate events, product launches, corporate leadership speeches, CEO messaging, public disclosures, shareholder meetings, academic uses, educational uses, travelogues, politics and government, court proceedings, legislative sessions, executive speeches, political campaigns, local governments, school boards, regulatory compliance, uses for those with disabilities and compliance with the Section 508 Amendment to the Rehabilitation Act of 1973, medical records transcription, call centers, training, custom applications, foreign language education and learning, motivational speaking, religious instruction, sermons, worship, voice-to-text transcription, voicemail, historical preservation, sports broadcasts, infomercials, commercial advertising, material of children's interest, and many others.

For example, with commenting features of the present disclosure, crowd-sourced multimedia indexing may be achieved. Large groups of users may voluntarily contribute to create a knowledge base for use by others. This same "crowd-sourcing" can be applied to indexing multimedia. One use of crowd-sourcing has been described above in relation to users that text transcribe multimedia, modify the text of a transcription or to adjust timestamps used to synchronize text to multimedia within a synchronization index.

Another use of multimedia indexing is in advertising, where a product's producer seeks to enhance brand awareness. With crowd sourced tagging of multimedia, particularly with a synchronized transcript and commenting functionality, certain brands may be "tagged" by users.

Product placement in the multimedia content may be supported in the embodiments. A corporation may desire to have its goods used, or even highlighted, within a major motion picture and be noticed by the viewer. For example, a producer of goods or services may run an advertising promotion in association with a multimedia or movie producer, whereby the brand owner provides incentives for the consumer to 1) view the multimedia, including for the purpose of finding its products used within the multimedia, 2) "tag" those occurrences of product placement, for example by creating a text comment or other marker (or "tag", "hit", "vote", "find", "like", "digg", "brand-emoticon", or similar) at the point in the multimedia when the product is used or shown, 3) share those "tags" or comments with one's social networking contacts, and 4) receive from the brand owner an incentive for having tagged its products.

Contests or promotions may be held for the users who tag and share a certain number of times, or who tag and share a certain number of films. It may be that a product is shown multiple times in a film, and if a user is able to tag a threshold number of them (within a pre-defined time range of the product being visible on screen), he may be eligible for sweepstakes contests, drawings or rewards, such as a coupon for free or discounted product, or loyalty points to be spent at a certain store for a certain product. More expensive items may also be used to entice users to tag films for product usage. For example, a car manufacturer may offer a promotion whereby a user who tags a certain number of films becomes eligible for a drawing to win a new vehicle.

This method of advertising in the embodiments has several benefits, including 1) it entices users to watch certain films, or to watch the film more than once, 2) it causes the user to "interact" with the film, and to pay attention to different aspects of it, including commercial aspects, more than would a passive observer viewing for entertainment only, 3) it spreads "tags" among social networks, 4) it encourages users to participate in an advertising methodology by offering rewards, 5) it can be low expense for the advertiser compared to more traditional advertising channels like print, television, or radio, 6) it allows co-branding, 7) it is fun for the user, 8) it is an opt-in, voluntary interaction in which the individual elects to participate (eliminating forced commercial advertising, for example as a bumper multimedia displayed before the multimedia a user desires to view, which is difficult or impossible to opt out of), 9) it leverages the efforts of a multiplicity of users to spread brand presence, and 10) it has the potential to drive consumer behavior by utilizing the psychological phenomenon of social proof.

Films and television programs are replete with product placement, and the disclosure of the present invention provides a convenient, fun way for consumers to "interact" with the multimedia by brand-tagging by using mobile computing devices. Brand-tagging also alleviates challenges to standard advertising, as more DVR users consciously skip overt advertisements forcibly inserted into a broadcast. With streaming media, users dislike a bumper ad being forced upon them before being able to view the content they elected to view, as might be found with increasing frequency in Youtube, Hulu, Justin.tv streams and many others.

By way of example, the following are ripe for brand tagging within multimedia: automobiles, consumer electronics and computers, beverages (colas/carbonated beverages, energy drinks, adult alcoholic beverages (beer, wine, liquor)), clothing and accessories/fashion, airlines, travel destinations, tobacco, restaurants and eateries, foods and snacks, hotels, firearms, radio/television/film/magazines, oil/energy, healthcare/drugs/hygiene, household items/soaps/detergents, and so on.

In practice, one way of implementing such a system includes: issuing a unique identifier, such as "BrandTagID," to the owner of a brand (for example, a randomized string of alphanumeric characters of predetermined length, akin to an encryption key used in the field of encryption); issuing a brand tag graphic or symbol or "BrandGraphic" (which itself may be a graphic, containing a hyperlink); having a user register to obtain a TaggingID (to allow secure registry of the identity of a unique user, for example by a randomized string of characters of predetermined length, akin to an encryption key used in the field of encryption); combining the BrandTagID with the TaggingID, to allow a user a UniqueID that links a specific user to a specific brand; providing facility for a user to leave or deposit a UniqueID at a time $t_x$, that being a discrete time within a multimedia file having a run duration of $t_0$ to $t_{end}$; providing facility for a computer system to receive a UniqueID from a user; and providing facility for a computer system to credit a discrete TaggingID (i.e. associated with a discrete human user) for having placed a UniqueID at a time $t_x$ within a specified multimedia file or associated synchronization index, for example to earn entry into contests or eligibility for prizes or giveaways. The system may also include ability to share a UniqueID with the social networking contacts of the individual associated with the corresponding TaggingID.

For example, User-1 may have a social network of 100 friends or contacts. User-1 applies for a TaggingID, and receives TaggingID=User-1-abcd1234. The "Brand, Inc." sporting goods company applies for a BrandTagID, and receives BrandTagID="Brand, Inc.-xyz789, BrandGraphic=www.brandwebsite.com/graphic.gif, VariableHyperlink=www.brandwebsite.com".

User-1 desires to brand tag for Brand, Inc., so he applies for and receives a UniqueID, which is a mathematical function performed utilizing the TaggingID and the BrandTagID, returning a UniqueID of, say, (encrypted, signed function of) UniqueID="abcd1234*xyz789".

User-1 watches a motion picture and places his UniqueID at a time that is 00:02:31.2 into the movie, when one of the main characters is seen wearing a pair of branded athletic shoes. The computer system places the BrandGraphic at that time within the synchronization index. Users in the social network of User-1 may elect to also view the same motion picture, opting to view the tags and comments left by User-1.

Once User-1 places a UniqueID, a report may be sent to the owner of the BrandTagID, letting the owner know the multimedia in which a tag was placed; the identity of the individual placing the tag, by the TaggingID; and the time/date when the tag was placed.

As a result, the owner of the BrandTagID has the ability to aggregate data about vast numbers of instances of brand occurrence across vast numbers of multimedia files, and it accomplishes this by leveraging the power great numbers of desegregate users, using mobile devices, who volunteer their time to do it. As additional benefit, those tags are shared within the social networks of the large numbers of users.

In one embodiment, the user may use a mobile computing device to tag multimedia that is played in a location other than on the mobile computing device. For example, a user watches a movie at home that is streamed and received by an appliance, which then communicates the audio and video signals to a home theater and its components, such as an LCD television and speakers. Within this movie, suppose there are twelve companies that have products appearing in the film and that desire users to tag the times at which they appear. Assume each company has a BrandTagID and an associated brand graphic The user may watch the film via his home theater system and tag brands using his mobile device, such as an iPad. For this example, the mobile device display may be partitioned into sections, wherein one brand graphic appears in one section. The user has a touch-sensitive palette of brands to apply to the multimedia. When that brand (or product, place, person, etc.) appears in the multimedia, performing a gesture on that section, for example tapping the graphic, tags that brand at that time within the multimedia. The user may have the functionality to adjust the properties of the tag, such as the TimeIn and TimeOut to provide a duration D for the tag. The user may select a predetermined duration to set a tag, for example by associating the creation of a tag with a 0.5 second duration, or the duration of the tag may be set by how long the user performs the gesture. If the product appears on screen for 10 seconds, the user may press and hold the graphic for 10 seconds, and the software will record that action.

Figure 38:
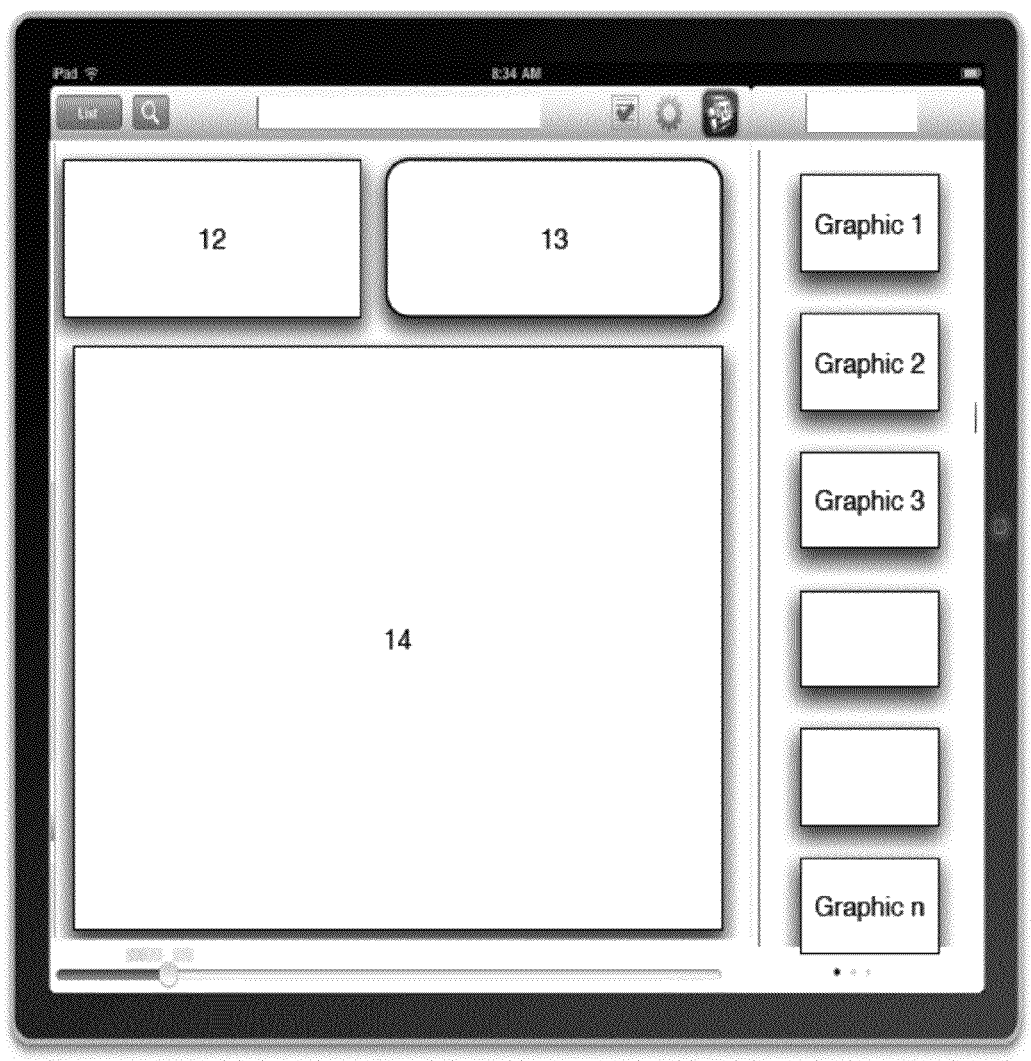
FIG. 38 illustrates an exemplary layout of a display of a mobile device for brand tagging in multimedia content.

The user may be provided facility to tag more than one brand at once. For example, assume a film character uses an Apple iPhone for a phone call for 10 seconds, then walks to a Ford Mustang to continue the conversation for another 20 seconds. The user may press and hold the Apple brand graphic for 10 seconds and then simultaneously tap the Ford brand graphic (inserting the default tag with a duration of 0.5 seconds) and then release the Apple brand graphic after another 20 seconds, resulting in a tag for the Apple iPhone for a duration of 30 seconds. In another embodiment, the mobile computing device may be used to display the multimedia and to perform brand tagging. For example, FIG. 38 illustrates an exemplary layout of a display of a mobile device for brand tagging in multimedia content. The header area 13 displays information about the multimedia in which brand tagging is performed. In addition, the media area 12 shows a display of the video of the multimedia and the text area 14 shows a highlighted portion of a text currently being displayed. In addition, the display may include a section comprising various graphics of selected brands that the user may tag in the multimedia content. For example, when the user recognizes a particular brand on a product, the user may simply click or select the appropriate graphic in this section. In the spirit of this disclosure, this brand tagging functionality may be used alone, or it may be used with other functionality disclosed.

User viewing statistics may also be implemented in the embodiments. For example, the user may see graphing of a number of users viewing a scene for a given duration, offered to select from "most viewed"/"favorite" scenes, view scene recommendation or movie recommendation, for example, in the form of "viewers of this scene have also liked . . . "

Exemplary Screen Shots of Embodiments

For purposes of illustration, FIGS. 21-37 are provided to show exemplary screen shots of potential multimedia content that may be provided by the embodiments. Of note, those skilled in the art will recognize that the embodiments allow for variance of the display sections and/or may allow the user to resize various sections as desired.

The screen shots may contain copyrighted material therein to teach and illustrate how multimedia content may be rendered or displayed on a mobile computing device. All rights in any such copyrighted material, however, remain reserved by the owner of the copyrighted work.

Figure 21:
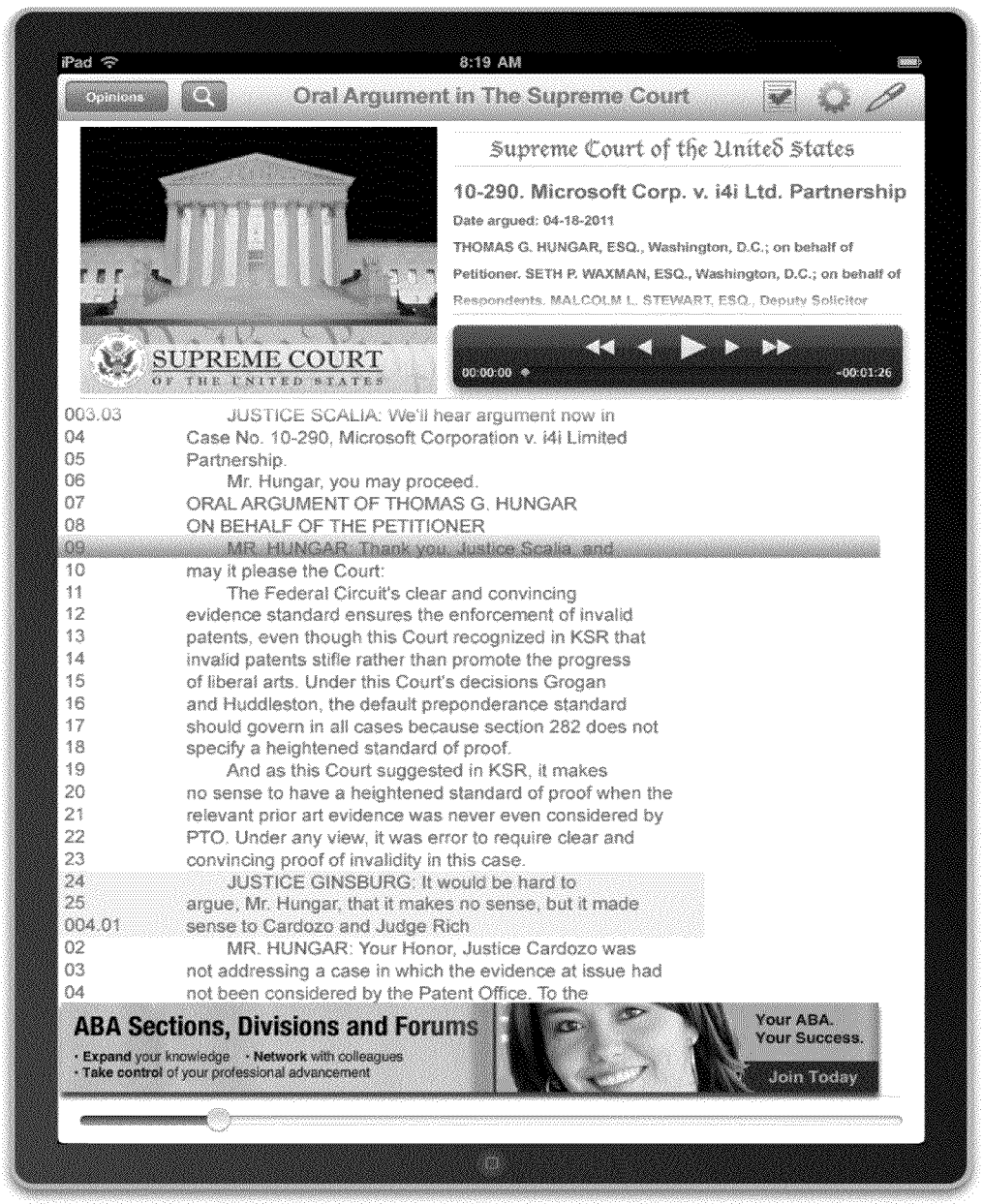
FIG. 21 illustrates an exemplary screen shot of a mobile device for a transcript synchronized to a multimedia audio file.

FIG. 21 illustrates an exemplary screen shot of a mobile device for a transcript synchronized to a multimedia audio file. For example, as shown, an audio file of an oral argument and transcript for a U.S. Supreme Court case related to Microsoft versus i4i Ltd. Partnership. In the screen shot, an image illustrating that the content is related to the U.S. Supreme Court is shown in the media area 12. The header area 13 displays relevant identification of the case, e.g., Microsoft versus i4i Ltd. Partnership. In the example shown, a control bar providing control buttons and progress of the multimedia content may also be provided in the header area 13. The text area 14 shows a portion of a text transcript of the dialogue of the deposition being displayed.

As described throughout this disclosure, the mobile computing device may control display of the text transcript in the text area 14 in a synchronized manner with the video being displayed in the media area 12. For example, as shown, the text at line 09 is highlighted to indicate the current location in the transcript relative to playback of the audio file.

In addition, as shown, an advertisement may be provided at the bottom of the text area 14. The advertisement may appear in the form of one or more banner advertisements. In addition, the advertisement may change based on time, the content of the transcript being shown, etc. Furthermore, a scrub-bar may also be provided at the bottom of the display on the mobile computing device.

Figure 22:
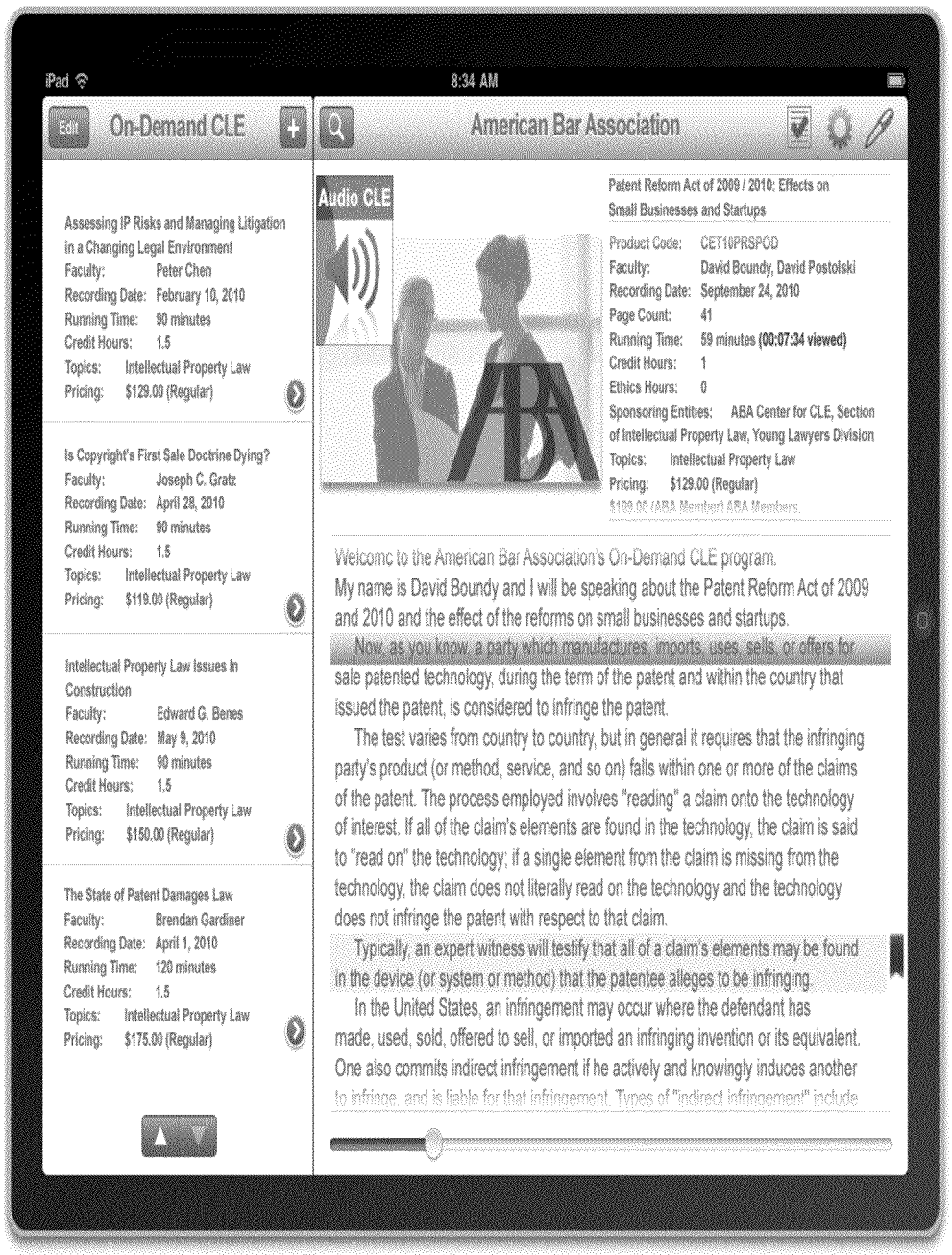
FIG. 22 illustrates an exemplary screen shot of a mobile device playing multimedia content and a transcript for education material from an organization and a listing of other courses with multimedia content.

FIG. 22 illustrates an exemplary screen shot of a mobile device playing multimedia content and a transcript for education material from an organization and a listing of other courses with multimedia content. For example, as shown, multimedia content for classes or lectures by the ABA may be offered to the user.

In the screen shot, an image indicating the "Patent Reform Act of 2009/2010: Effects on Small Businesses and Startups" from the ABA is shown in the media area 12. The header area 13 displays relevant identification of the lecture, such as the product code, faculty, date, page count, running time, credit hours, ethics hours, sponsors, topic, and pricing. The text area 14 shows a portion of a text transcript of the dialogue currently being played. Finally, a scrub bar may be provided at the bottom of the display to indicate the progress of the playback and highlighting of text. Moreover, the screen shot may also offer links to other multimedia content files for other courses offered by the institution.

Figure 23:
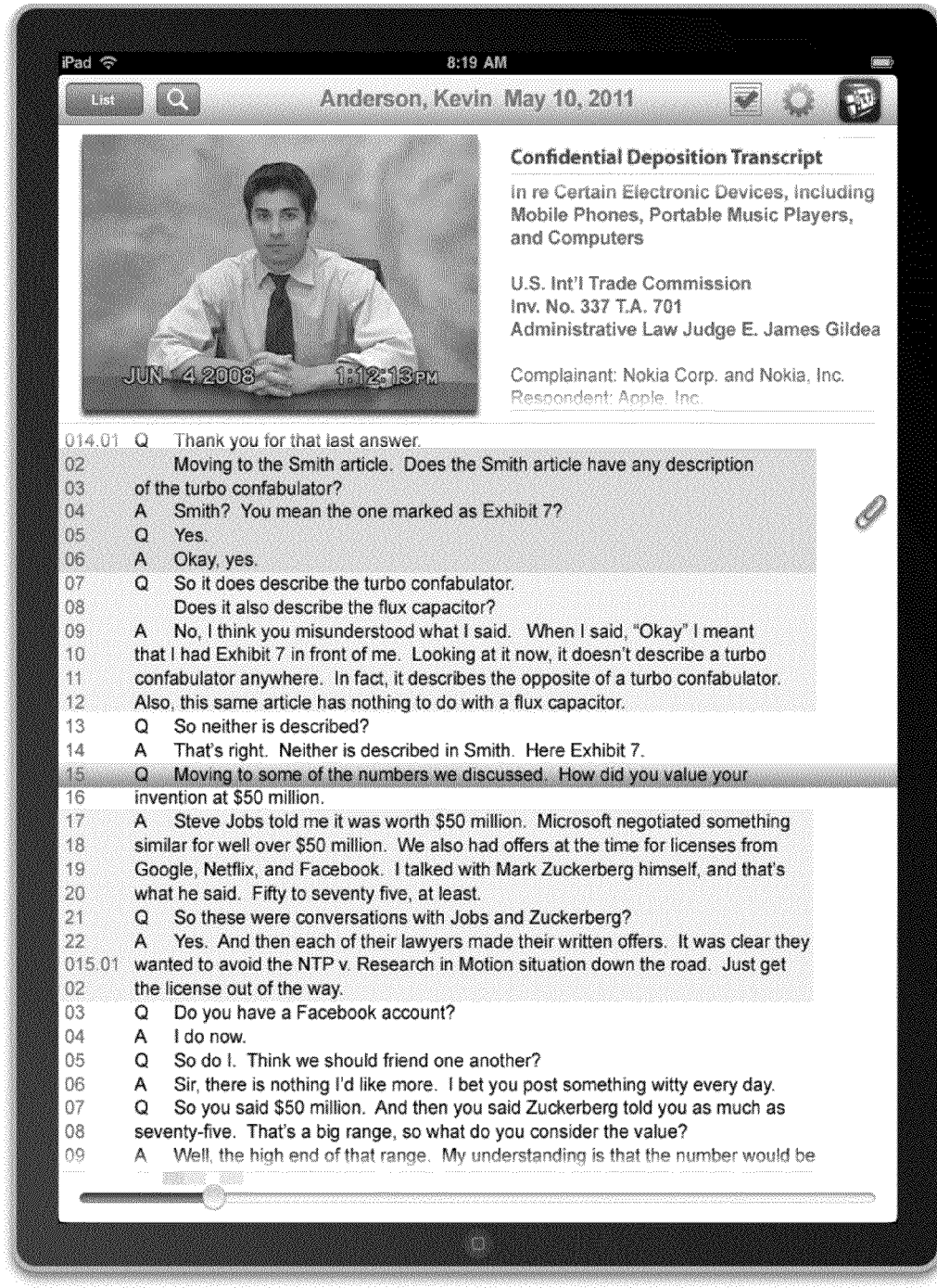
FIG. 23 illustrates an exemplary screen shot of a mobile device for a deposition video and transcript.

FIG. 23 illustrates an exemplary screen shot of a mobile device for a deposition video and transcript. In particular, the mobile device is showing a deposition video and transcript of a deposition of Kevin Anderson on May 10, 2011. The header area 13 displays a court associated with the deposition, a civil action number associated with the deposition, a name of the deponent in the deposition, a location of the deposition, and the date/time of the deposition. In addition, the media area 12 shows a display of the video of the deposition and the text area 14 shows a highlighted portion of a text transcript of the dialogue of the deposition being displayed. As also shown, the transcript may have an exhibit linked to one or more lines of text, as indicated by an icon, such as the paper clip icon adjacent to lines 02-06 shown in FIG. 23.

Figure 24:
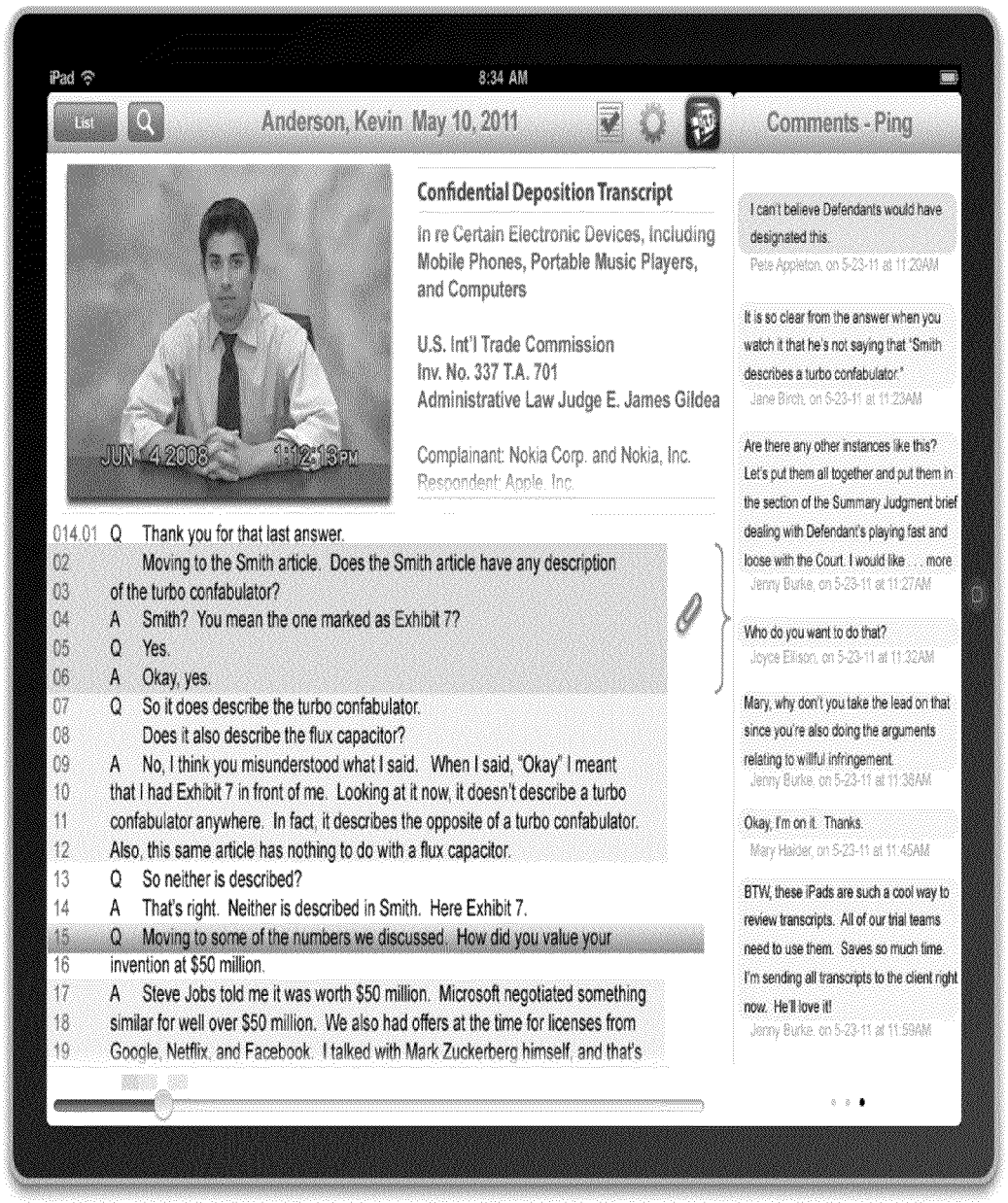
FIG. 24 illustrates an exemplary screen shot of a mobile device for a deposition video and transcript accompanied with a comments section on the display.

As also shown, the transcript may have an exhibit linked to one or more lines of text, as indicated by an icon, such as the paper clip icon adjacent to lines 02-06 shown in FIG. 24. Furthermore, a comments section may also be provided in a section of the display on the mobile computing device. The comments section, for example, allows a user or a group of users to record comments about the testimony.

Figure 25:
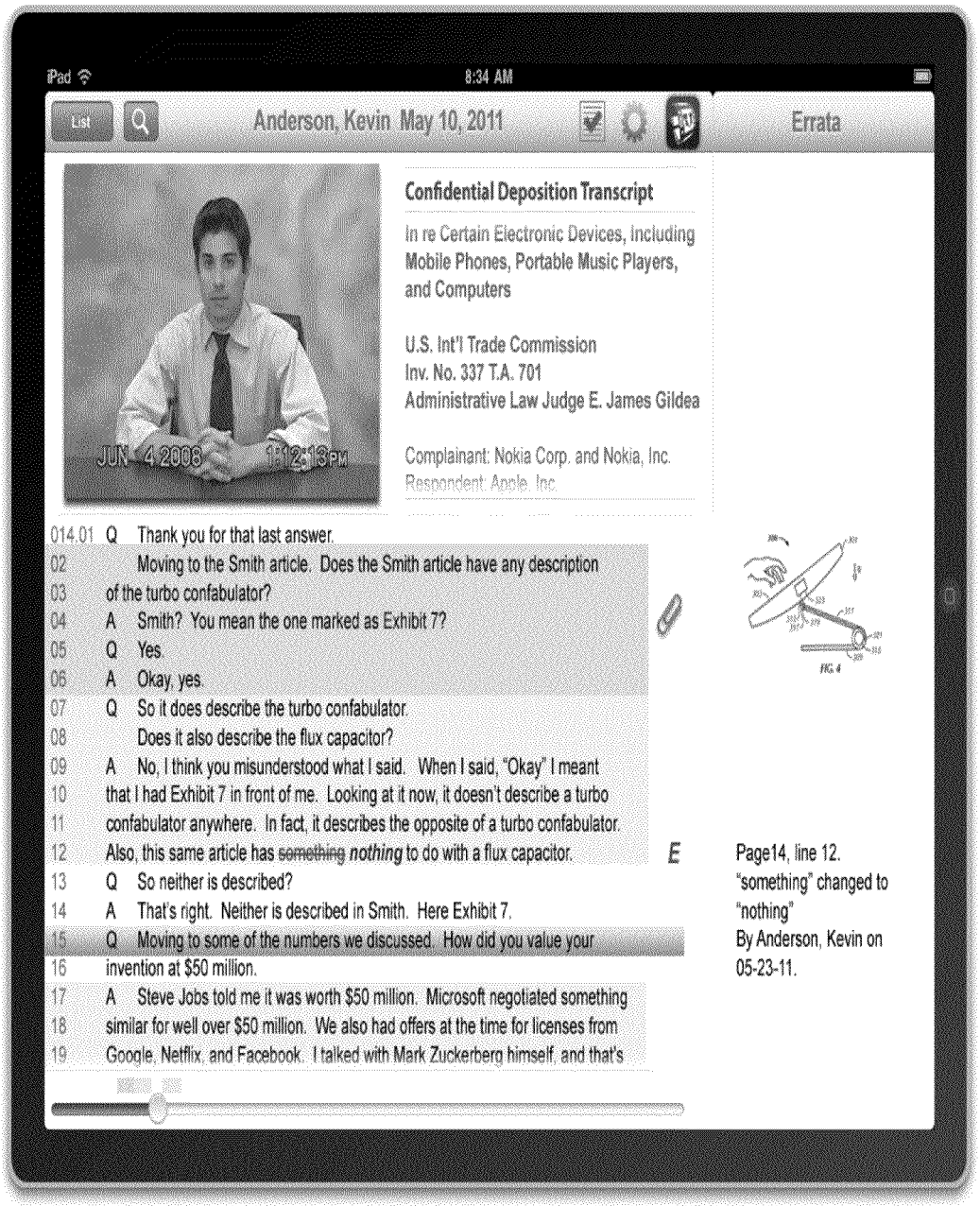
FIG. 25 illustrates an exemplary screen shot of a mobile device for a deposition video and transcript accompanied with a section of the display for showing errata and a thumbnail of an attachment to the transcript.

FIG. 25 illustrates an exemplary screen shot of a mobile device for a deposition video and transcript accompanied with a section of the display for showing errata and a thumbnail of an attachment to the transcript. In particular, the mobile device is showing a deposition video and transcript of a deposition of Kevin Anderson on May 10, 2011.

As also shown, the transcript may have an exhibit linked to one or more lines of text, as indicated by an icon, such as the paper clip icon adjacent to lines 02-06 shown in FIG. 25. Furthermore, an errata section may also be provided in a section of the display on the mobile computing device. The errata section, for example, allows a user or a group of users to record various errata of the transcript. In the example shown in FIG. 25, Kevin Anderson on May 23, 2011 changed the word "something" to read—nothing—on line 12. Of note, the word "something" has been changed to be shown as strikethrough text and the word—nothing—has been inserted in a distinctive manner. For example, as shown, the word—nothing—may be italicized, underlined, or may be displayed with a different font, color, or size.

Figure 26:
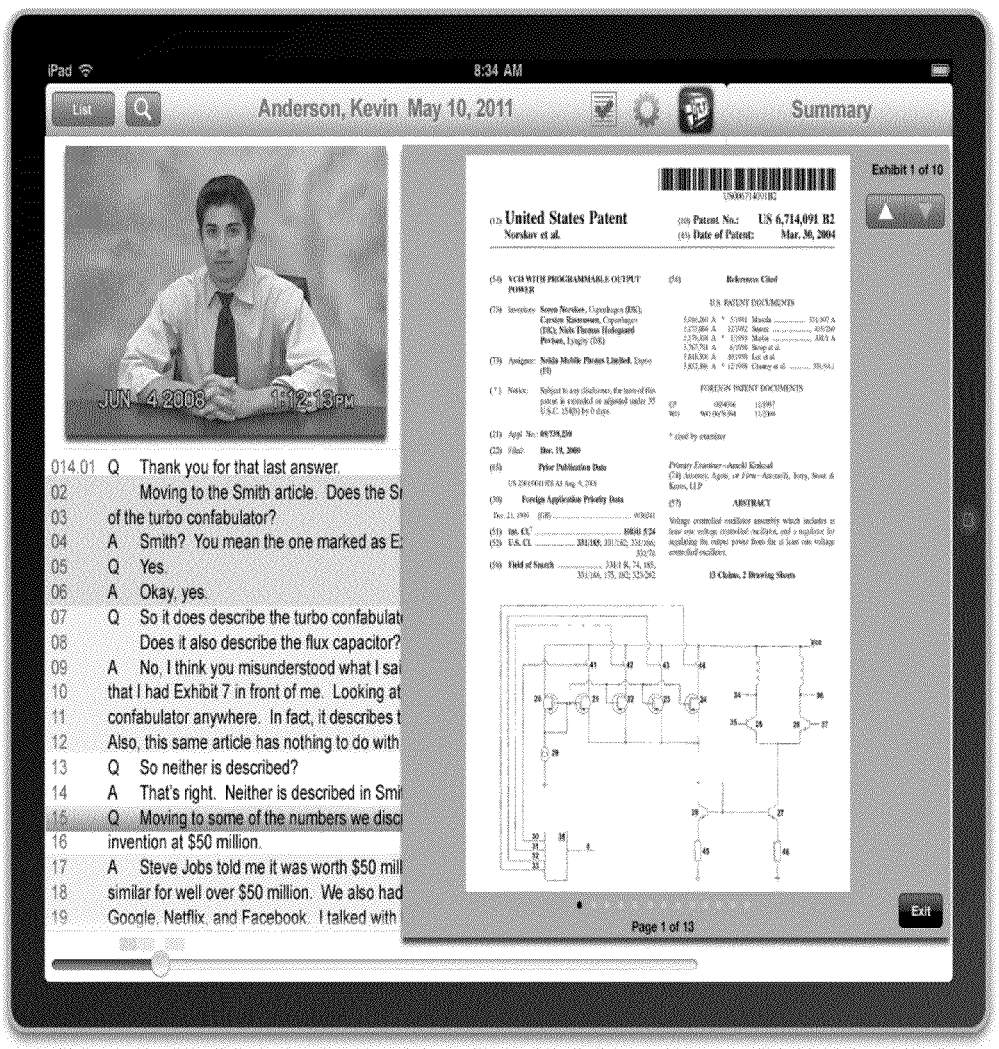
FIG. 26 illustrates an exemplary screen shot of a mobile device for a deposition video and transcript with a pop-up window showing a linked exhibit.

FIG. 26 illustrates an exemplary screen shot of a mobile device for a deposition video and transcript with a pop-up window showing a linked exhibit. In particular, the mobile device is showing a deposition video and transcript of a deposition of Kevin Anderson on May 10, 2011. As also shown, the transcript may have an exhibit linked to one or more lines of text, such as an issued U.S. patent. In the example shown, the user has selected or click on the linked exhibit's thumbnail, which has resulted in a pop-up window to display the linked exhibit, i.e., U.S. Pat. No. 6,714,091.

Figure 27:
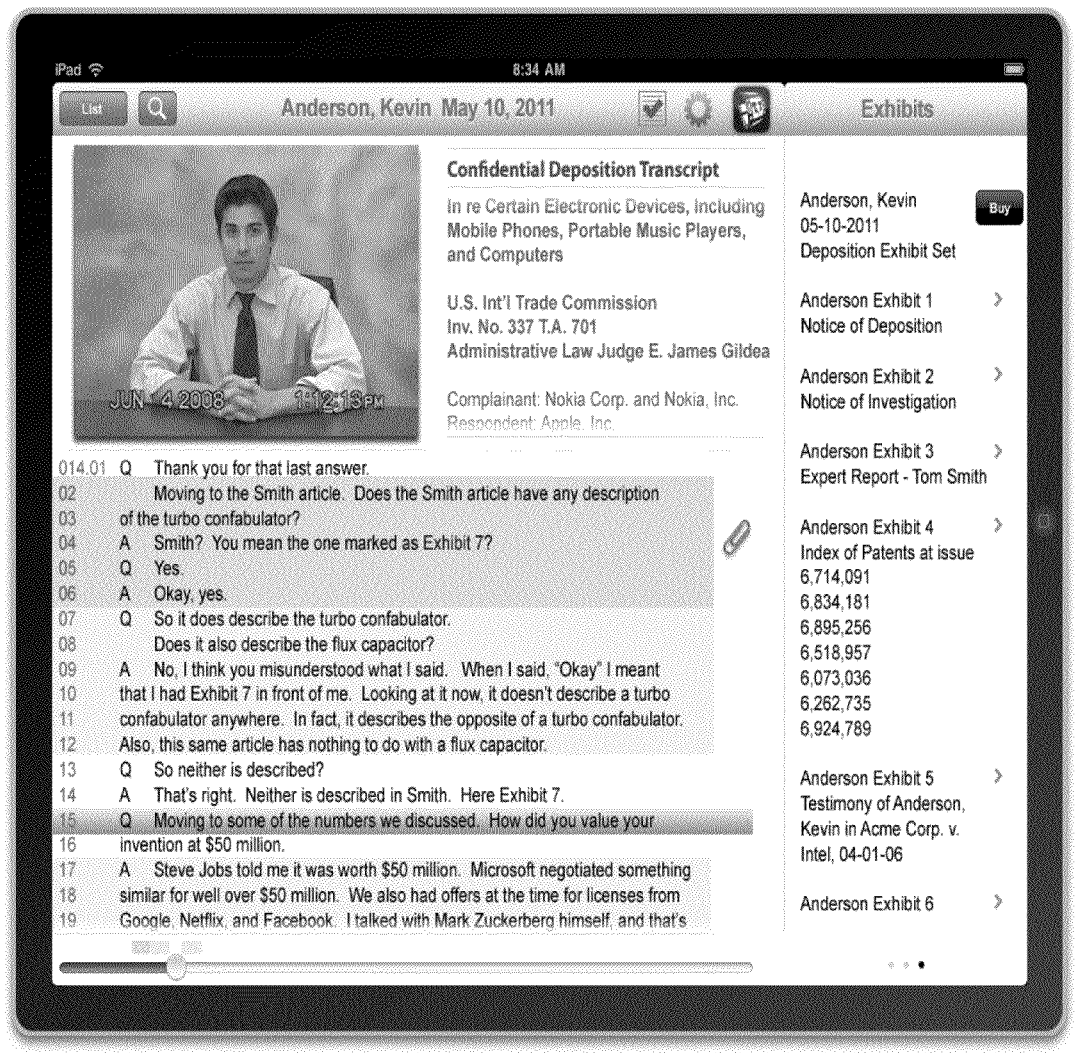
FIG. 27 illustrates an exemplary screen shot of a mobile device for a deposition video and transcript with a section for exhibits linked to the deposition.

FIG. 27 illustrates an exemplary screen shot of a mobile device for a deposition video and transcript with a section for exhibits linked to the deposition. In particular, the mobile device is showing a deposition video and transcript of a deposition of Kevin Anderson on May 10, 2011. As also shown, the mobile device may provide a listing of available exhibits associated with the case or the deposition. Furthermore, in some embodiments, a cost may be associated with one or more the exhibits. For example, as shown in FIG. 26, a user may buy or purchase the set of exhibits by selecting or clicking on the "Buy" control button displayed on the mobile device.

Figure 28:
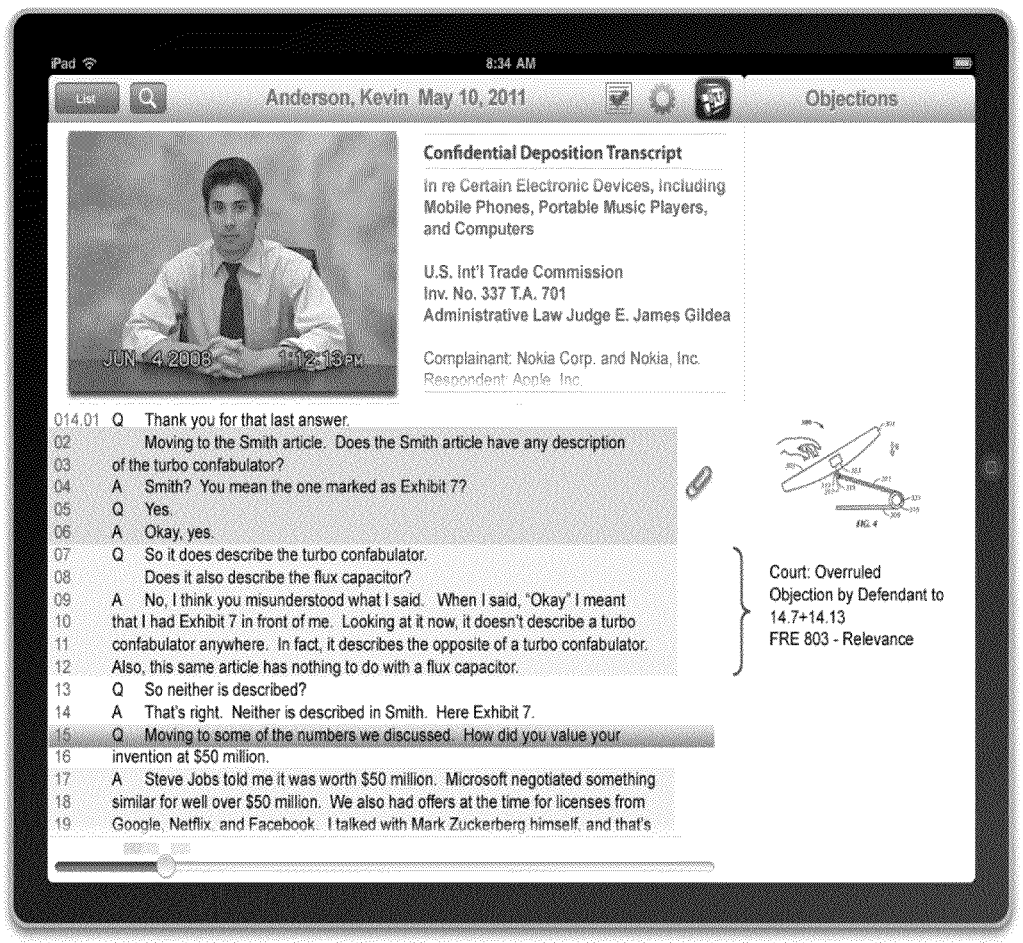
FIG. 28 illustrates an exemplary screen shot of a mobile device for a deposition video and transcript with a section showing objections to portions of the testimony by the deponent.

FIG. 28 illustrates an exemplary screen shot of a mobile device for a deposition video and transcript with a section showing objections to portions of the testimony by the deponent. In particular, the mobile device is showing a deposition video and transcript of a deposition of Kevin Anderson on May 10, 2011. As also shown, the transcript may have an exhibit linked to one or more lines of text, such as drawing from a U.S. patent. In addition, the mobile computing device may provide a section of the display for objections. For example, as shown, in FIG. 27, the court overruled an objection by the defendant related to lines 7-13.

Figure 29:
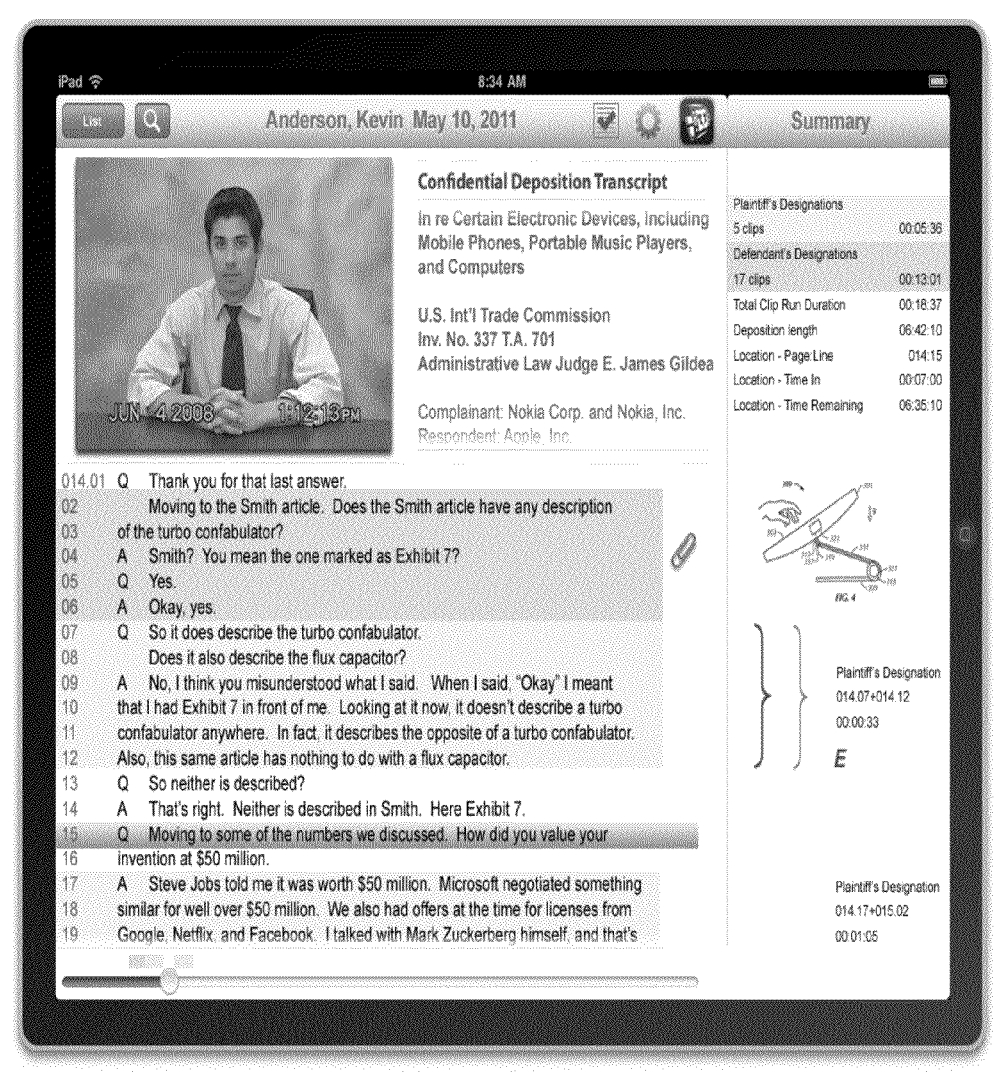

FIG. 29 illustrates an exemplary screen shot of a mobile device for a deposition video and transcript with a summary section on the display. In particular, the mobile device is showing a deposition video and transcript of a deposition of Kevin Anderson on May 10, 2011. As also shown, the display may comprise a summary section. The summary section may indicate various items, such as the Plaintiff's designations, the Defendant's designations, runtime, locations, and locations of errata in the transcript.

Figure 30:
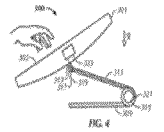
FIG. 30 illustrates an exemplary screen shot of a mobile device for a filtered deposition video and transcript with a summary section on the display.

FIG. 30 illustrates an exemplary screen shot of a mobile device for a filtered deposition video and transcript with a summary section on the display. In particular, the mobile device is showing a deposition video and transcript of a deposition of Kevin Anderson on May 10, 2011. As also shown, the transcript may be filtered to show only requested portions. In the example shown in FIG. 29, a thick black line at line 12 indicates that text between lines 13-16 has been filtered from the display. As also shown, a video sequencing bar with a location indicator may be provided above the scrub bar to show relative locations of the requested portions of the deposition.

Figure 31:
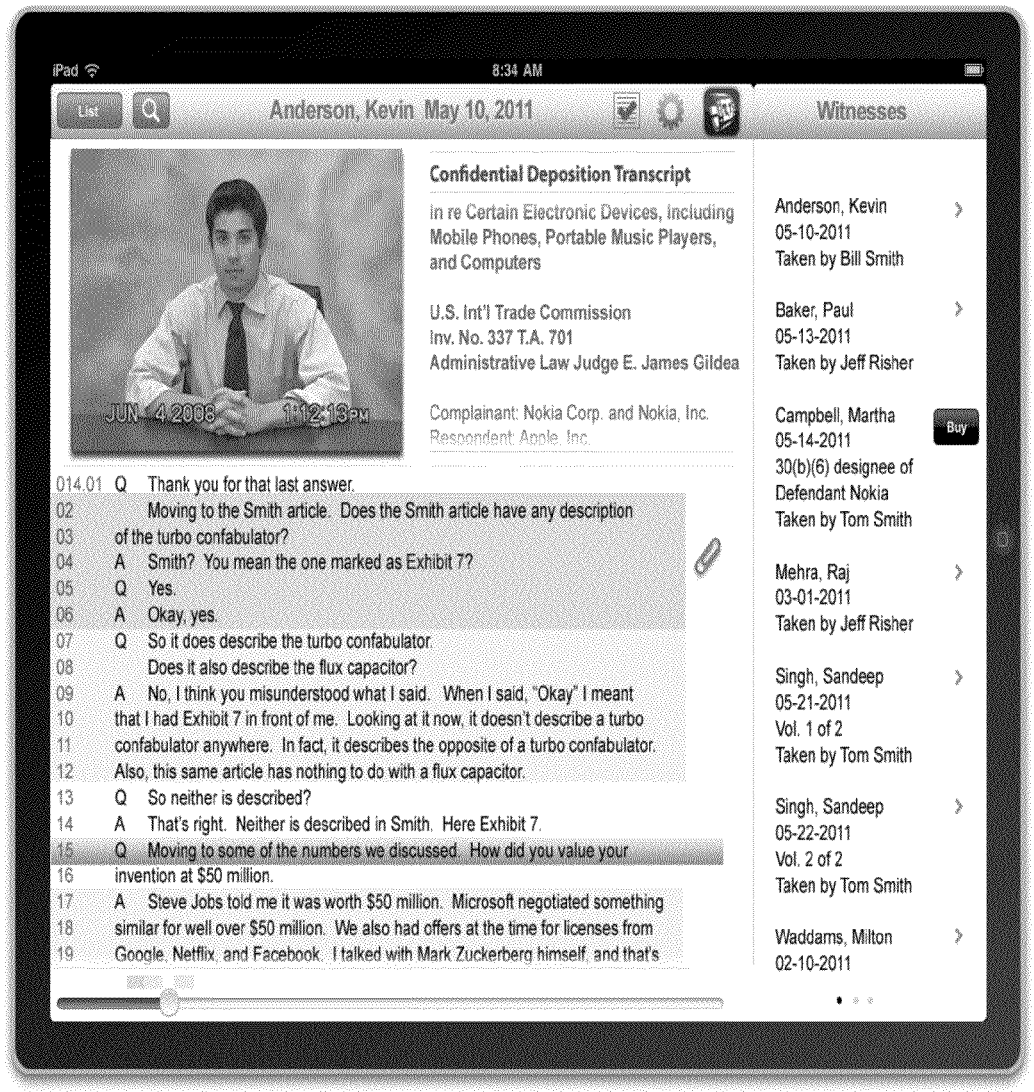
FIG. 31 illustrates an exemplary screen shot of a mobile device for a deposition video and transcript with a section listing witnesses.

FIG. 31 illustrates an exemplary screen shot of a mobile device for a deposition video and transcript with a section listing witnesses. In particular, the mobile device is showing a deposition video and transcript of a deposition of Kevin Anderson on May 10, 2011. As also shown, the display may provide links to other witnesses of the case. In some instances, a cost may be associated with retrieving a witness testimony. For example, as shown in FIG. 30, the testimony for Martha Campbell requires a purchase.

Figure 32:
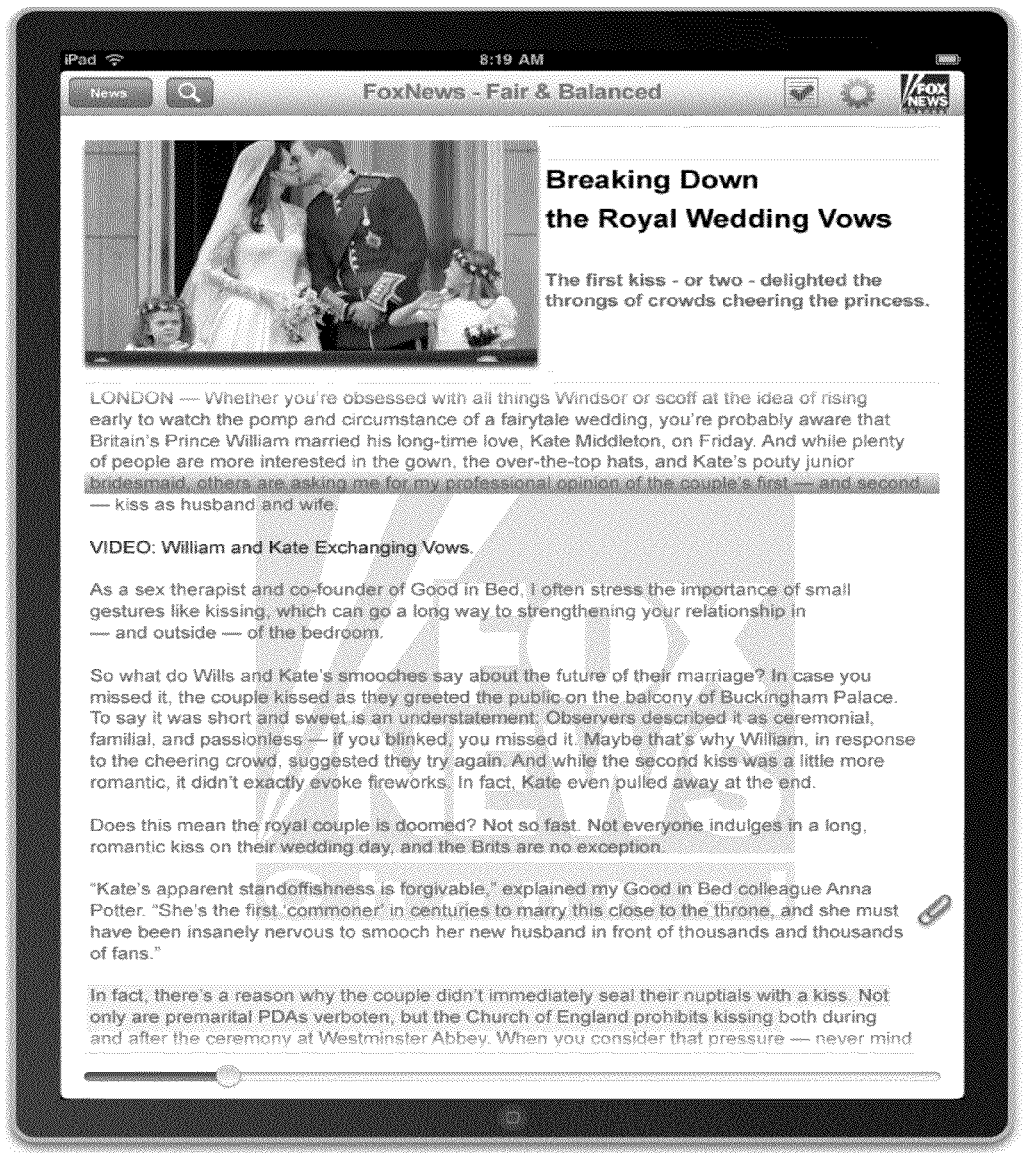
FIG. 32 illustrates an exemplary screen shot of a mobile device playing a news story having a video clip and corresponding text.

FIG. 32 illustrates an exemplary screen shot of a mobile device playing a news story having a video clip and corresponding text. For example, as shown, a news story from FoxNews regarding the royal wedding is shown.

In the screen shot, an image from the royal wedding is shown in the media area 12. The header area 13 displays relevant identification of the story, such as the headline and tagline. The text area 14 shows a portion of a text transcript of the dialogue currently being played. In addition, the text area 14 may comprise a link to other content, such as a video of "William and Kate Exchanging Vows." Furthermore, certain portions of text may have a linked exhibit or attachment, as indicated by a paper clip icon shown adjacent to the relevant portion of the text. Finally, a scrub bar may be provided at the bottom of the display to indicate the progress of the playback and highlighting of text.

Figure 33:
FIG. 33 illustrates an exemplary screen shot of a mobile device playing multimedia content with a transcript and a section listing other files available to the user.

FIG. 33 illustrates an exemplary screen shot of a mobile device playing multimedia content with a transcript and a section listing other files available to the user. For example, as shown, multimedia content for "The Glenn Beck Program" may be offered to the user.

In the screen shot, an image indicating the Glenn Beck Program is shown in the media area 12. The header area 13 displays relevant identification of the story, such as the program's topic, date, and description. The text area 14 shows a portion of a text transcript of the dialogue currently being played. Finally, a scrub bar may be provided at the bottom of the display to indicate the progress of the playback and highlighting of text. Moreover, the screen shot may also offer links to other multimedia content files for the program, such as programs from different months.

Figure 34:
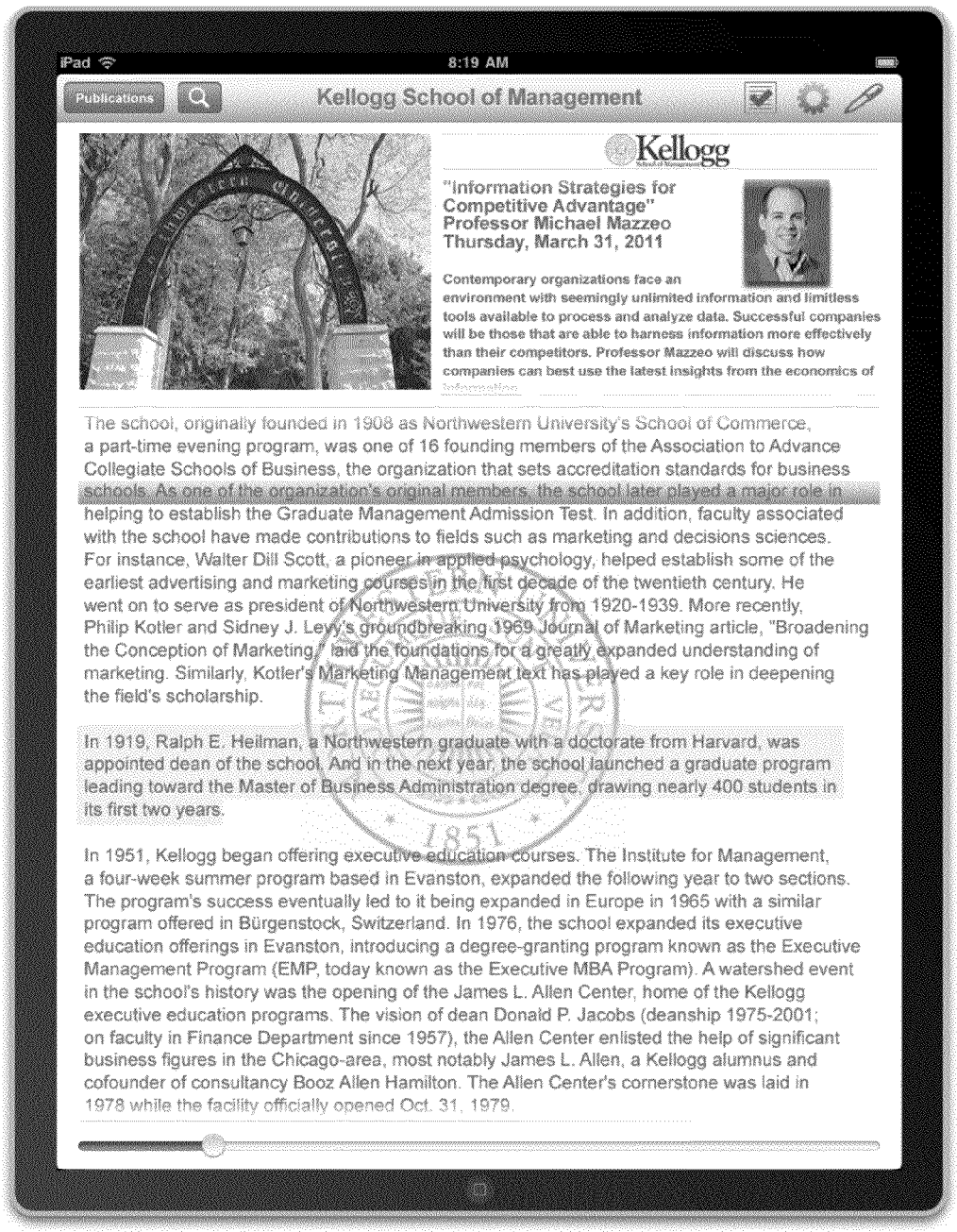
FIG. 34 illustrates an exemplary screen shot of a mobile device playing multimedia content with a transcript from an educational institution.

FIG. 34 illustrates an exemplary screen shot of a mobile device playing multimedia content with a transcript from an educational institution. For example, as shown, multimedia content from the Kellogg School Management may be provided to the user.

In the screen shot, an image indicating the speaker as Professor Michael Mazzeo is shown in the media area 12. The header area 13 displays relevant identification of the speech or lecture, such as the title, speaker, and date. The text area 14 shows a portion of a text transcript of the dialogue currently being played. Finally, a scrub bar may be provided at the bottom of the display to indicate the progress of the playback and highlighting of text.

Figure 35:
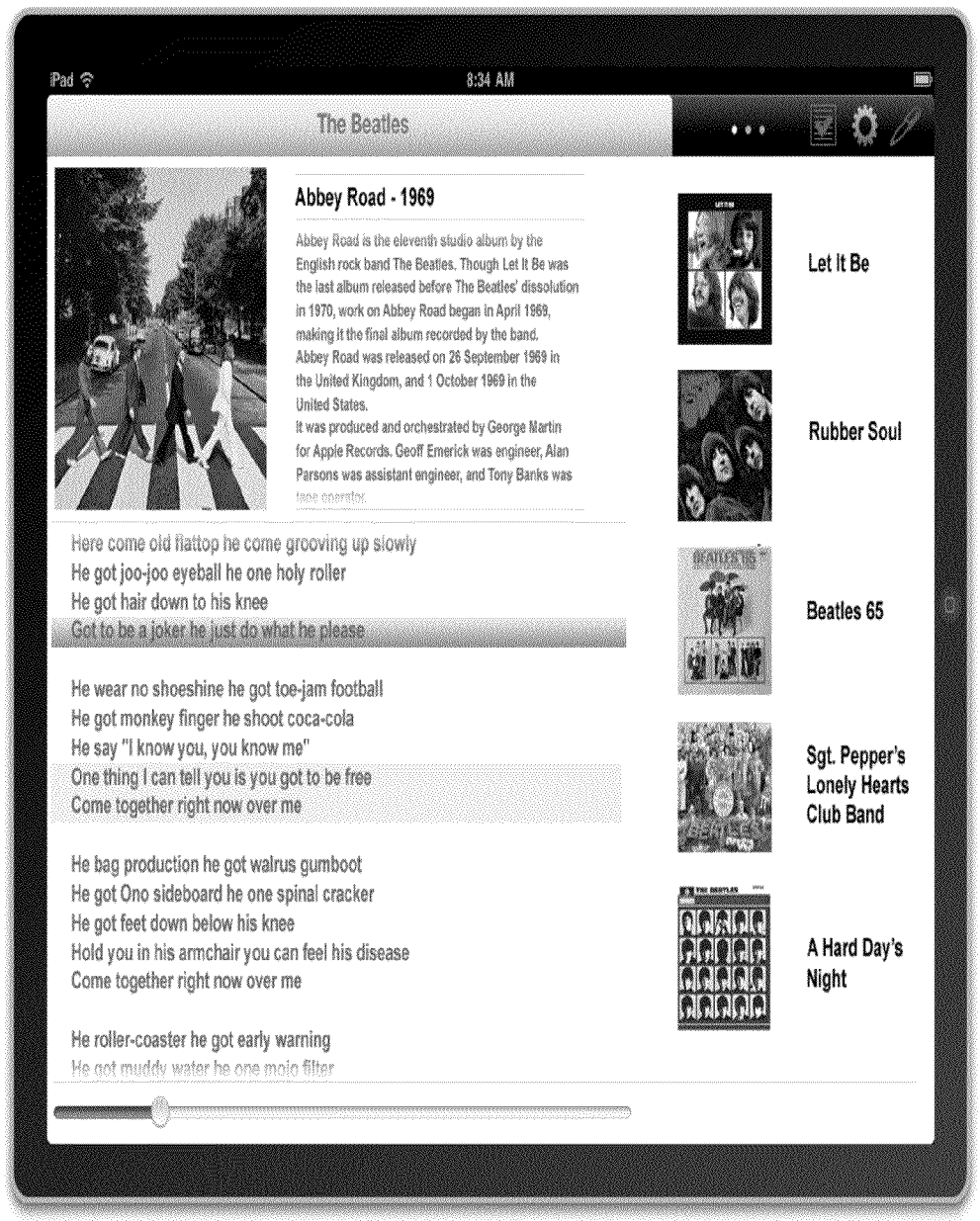
FIG. 35 illustrates an exemplary screen shot of a mobile device playing multimedia content with a transcript from a musical group and section listing other available content from the musical group.

FIG. 35 illustrates an exemplary screen shot of a mobile device playing multimedia content with a transcript from a musical group and section listing other available content from the musical group. For example, as shown, multimedia content, such as the song "Abbey Road" by the Beatles may be offered to the user.

In the screen shot, an image indicating the song is shown in the media area 12. The header area 13 displays relevant identification of the song, such as the title, year, and background. The text area 14 shows a portion of a text transcript of the dialogue currently being played. Finally, a scrub bar may be provided at the bottom of the display to indicate the progress of the playback and highlighting of text. Moreover, the screen shot may also offer links to other multimedia content files for the program, such as different songs or albums also by the Beatles or other artists.

Figure 36:
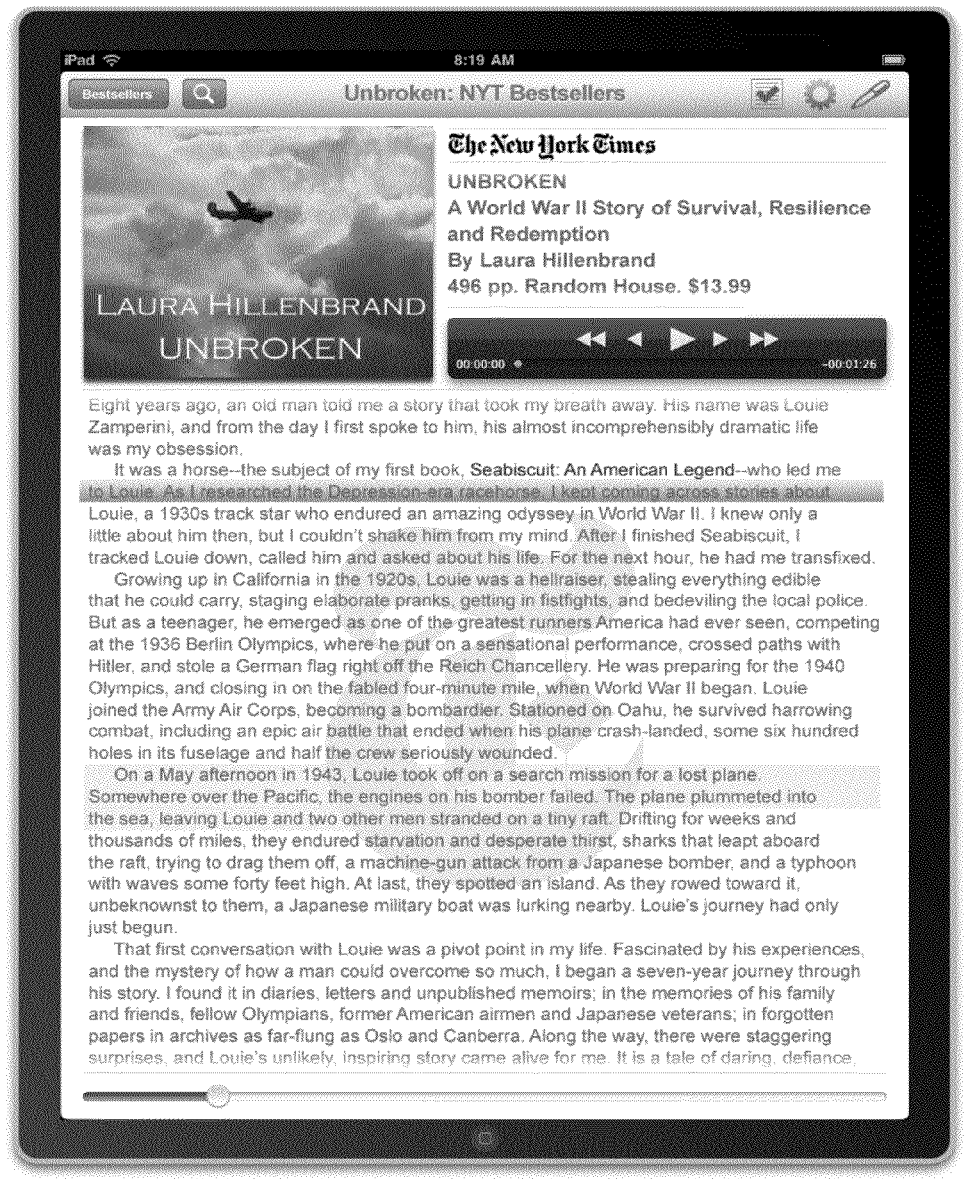
FIG. 36 illustrates an exemplary screen shot of a mobile device playing multimedia content and a transcript for an audio book.

FIG. 36 illustrates an exemplary screen shot of a mobile device playing multimedia content and a transcript for an audio book. For example, as shown, an audio file for the book "Unbroken" by Laura Hillenbrand is shown. In the screen shot, an image illustrating that the content is related to the book is shown in the media area 12. The header area 13 displays relevant identification of book, such as the title, author, pages, publisher, and price. In the example shown, a control bar providing control buttons and progress of the multimedia content may also be provided in the header area 13. The text area 14 shows a portion of a text transcript of the dialogue of the audio currently being played.

As described throughout this disclosure, the mobile computing device may control display of the text transcript in the text area 14 in a synchronized manner with the audio playback. Furthermore, a scrub-bar may also be provided at the bottom of the display on the mobile computing device.

Figure 37:
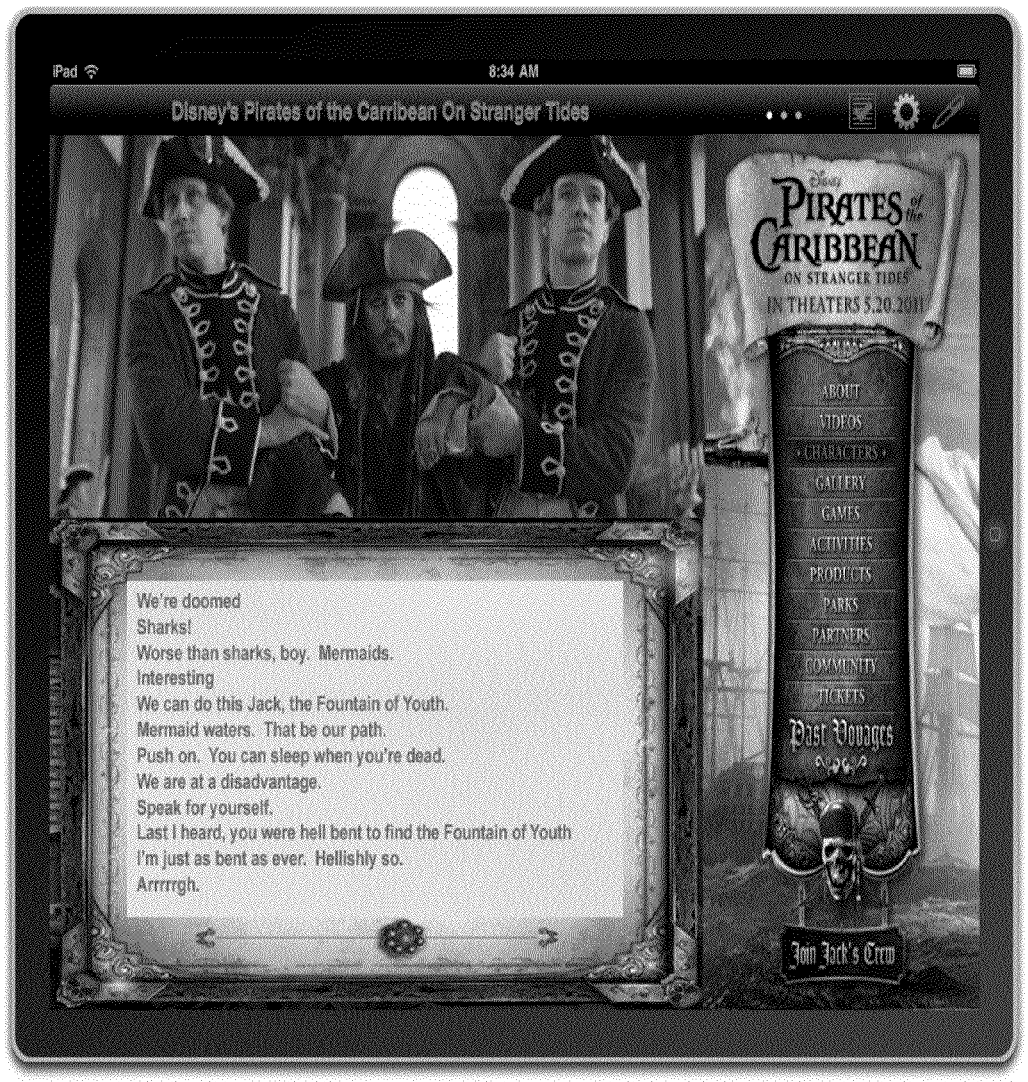
FIG. 37 illustrates an exemplary screen shot of a mobile device playing a movie and a transcript with a section for navigating through the movie's content.

FIG. 37 illustrates an exemplary screen shot of a mobile device playing a movie and a transcript with a section for navigating through the movie's content.

Titles, headers and section divisions within this disclosure are meant as navigational aids and are not meant to limit the scope of the disclosure. While multiple implementations have been illustrated and described in detail, it should be understood that various modifications in system and method design and details of construction are possible without departing from the spirit and scope of the disclosure.

Use of Barcode and a Mobile Computing Device to Retrieve Text Synchronized Multimedia In yet another example of a printed transcript, a bar code, a 2D bar code or a Quick Response Code (or "OR Code") may be placed at the top of a page, in any margin on the page, or adjacent to a line or range of lines of a transcription of multimedia. A barcode may refer to any form of bar codes, QR codes, lines, dots, dashes, hieroglyphs, patterns, picture identifiers, color permutations, magnetic particle deposition, special character or numeric font usage, logos, faces, or combinations thereof, or any other similar reference that may be scanned or photographed for machine or electronic recognition. In one example shown, a QR Code may be scanned by a mobile computing device (or photographed with a camera integral to the mobile computing device and then deciphered by software on the mobile computing device, as is understood in the art). The software for scanning on the mobile device recognizes the QR Code as a URL-type link. The URL-type link causes software on the mobile computing device to retrieve an electronic copy of the transcript, including with synchronized multimedia. The link may be a deep link to the multimedia, directing the user to a point in the multimedia other than the beginning of the multimedia.

The QR code may comprise a series of alphanumeric characters, sometimes an encrypted or randomized string of alphanumeric characters. In one embodiment, the QR code may reference a client control number. The client control number can be associated with the purchaser of the transcript or other authorized recipient.

In the context of a deposition transcript, the client control number can be associated with at least one attorney, at least one law firm, or at least one litigant, or a preselected group of users. In this fashion, a hardcopy of the transcript can be utilized by an attorney or law firm as has been traditionally done, i.e. by making duplicate hardcopies for use and distribution, but providing the novel and added benefit that each recipient of the hardcopy can conveniently access the electronic transcript and associated multimedia by scanning the QR Code with a mobile computing device. In general, the client control number may function to help identify the users who may be authenticated, and to whom data may properly be delivered.

The QR code may also comprise reference to the synchronization index, or a portion thereof, and the corresponding multimedia, or portion thereof. In this fashion, a user may be directed directly to the desired portion of both the transcript and the associated multimedia.

The user with the hardcopy and mobile computing device may scan the bar code, and the application may communicate with a database to determine whether he is listed among the group of authorized users. If the user is not authenticated, electronic access to the transcript and multimedia can be denied.

User logs may be kept to determine the identity of users of the electronic assets, and usage and access can be monitored and conveniently reported.

As an additional benefit, it is not uncommon in the legal industry for parties to distribute hardcopies of a transcript without properly paying the court reporting firm for the correct number of copies. For example, in multi-party or class action litigation, a group of litigants may attempt to purchase one transcript copy from the court reporting firm, or a limited number of copies, but then share unauthorized photocopies for which the court reporting firm is not compensated.

In this instance, if the user scans the QR Code on the hardcopy of the transcript, and if the user is not already a member of a group that has paid for and can rightfully access the electronic transcript, then the software or software agreement may compel the user to pay for a copy of the transcript. Invoicing and payment can be achieved immediately and electronically. This is an efficient method to electronically distribute transcript copies and to provide electronic access on a mobile computing device to the transcription and associated multimedia.

The client control number may differ for each copy of a transcript sold. That is, each hardcopy of a transcript that is produced, for example by a court reporting firm, may be provided a unique code with a unique client control number. For example, "Code 1" may identify a purchase of a transcript copy by attorney John Doe, at Law Firm X, representing Company A. John Doe may, for instance, seek to utilize his mobile computing device to see deposition testimony beginning on Page 10, Line 1. With the application running on his iPad, he can scan, or photograph, the QR code adjacent that line on that page. When he does so, the application communicates the client control number embedded in the QR code. This communication is done by computer network, which computer network also comprises a computer that references a user database. The database is used to authenticate that the iPad belongs to John Doe. Once authenticated, John Doe is served data, i.e. the transcript and associated multimedia. If the user fails the authentication step, data delivery may be denied. In some circumstances, the authentication step may authenticate all data requesters.

John Doe may also set permissions allowing access to that transcript to other users in a group, for example other attorneys within his law firm, or certain designated individuals associated with his law firm's client, Company A. Permissions may also be limited by an administrator, for example the court-reporting firm responsible for distributing transcripts and allowed a reasonable fee therefor by the governing rules of procedure. In such a circumstance, the administrator may control or make alterations to the database that is used by the computer system in performing the authentication.

As an example, assume that John Doe provides the hardcopy of a deposition transcript to a co-litigant at Company B. Assume that Company B has not purchased a copy of the transcript from the court-reporting firm and that John Doe cannot set permissions to allow Company B access to the transcript electronically. If a user at Company B scans the QR code on the transcript to obtain electronic access to the transcript and associated multimedia on his own iPad, access may be granted, in this example, if and only if the administrator has allowed it, i.e. the court reporting firm is legally able to furnish a copy, and if terms for the purchase and sale of the access have been agreed upon. The system administrator, or a court reporting firm utilizing the system, can include as part of the terms of use for the mobile device software an agreement that any asset delivery is subject to specified terms and fees, which may include a charge of a reasonable fee upon accessing a transcript or multimedia from having scanned a QR code on a hardcopy of a transcript. Such transaction can occur as an "in app purchase", or a purchase as is made from within the application. As one example, the Apple company supports "in app purchases", as opposed to delivering content through another mechanism, such as transfer of a pdf, book, text, music, or movies via iTunes.

In this example, the user at Company B scans with his iPad the QR code on John Doe's hardcopy transcript, Company B is immediately charged for a purchase, and access to the transcript and associated multimedia is furnished immediately electronically. From the electronic transcript, the software enables the user to print a hardcopy of the transcript from the mobile computing device, or it can be formatted as a pdf, or other suitable format, for printing or emailing. This hardcopy of Company B will be marked with a bar code comprising a client control number for Company B.

In this example, although John Doe provided a hardcopy of the transcript to a co-litigant improperly by not properly compensating the court reporting firm, the computer server and serving software may operate to ensure he doesn't inadvertently provide electronic access to what may be work product he has associated with his group's copy of the electronic assets. For example, John Doe and his law firm may have created issue codes and made comments upon the transcript, which they did not intend to share with Company B. Because Company B is not within the set of authorized users in John Doe's group, any work product of John Doe's group is not made available to Company B by virtue of the Company B user having scanned John Doe's QR code. That is, when Company B receives electronic access for the first time, a new, fresh user group is created, and the new user from Company B must indicate who is authorized to collaborate within his own group, subject to review by a system administrator.

Figure 40:
FIG. 40 illustrates an issue-coded transcript comprising barcode placed in the margin.

In yet another example of the printed transcript, FIG. 40 illustrates how an issue coded transcript may be provided to a court. QR codes are placed in the margins to allow a user of a mobile computing device to scan the code to access an electronic copy of the transcript and multimedia at that exact position. Thus, paper filings can be made to a court, allowing simple access to the corresponding electronic assets (transcript and multimedia) on a separate mobile computing device.

In this manner, a judge, clerk, or courthouse staff can conveniently use a mobile computing device to retrieve multimedia assets, without having to take delivery of CDs, DVDs, or other storage media a litigant may intend to deliver to the court. Further, an overall computer system may be provided and managed, to ensure multimedia submitted to the court is available, convenient to access, able to be archived, and capable of having usage tracked, for example to ensure access is provided only to authorized users and to date the time of filing, as part of an electronic records filing and management system.

Such use of QR codes and mobile computing devices to allow simple and easy retrieval of specific portions of multimedia and corresponding transcription allows novel use of mobile computing devices. Such uses may be particularly useful in scholarly writing, news and news distribution, legal writing, magazines/periodicals, books, political discourse, and elsewhere.

While the examples above are presented in the context of a legal proceeding, i.e. a deposition transcript and associated multimedia, the examples are not intended to limit the scope of the invention. As discussed above, there exist many types and kinds of uses for a synchronization index with associated multimedia, being used on a mobile computing device.

Sharing a Transcript by Barcode

As another example, a court reporter at the conclusion of a deposition may distribute copies of the transcript by requiring that an attorney present at the deposition utilize a mobile computing device to scan a barcode to retrieve the transcript. As part of the court reporting software, for example, the court reporter may utilize a mobile computing device, such as an Apple iPad, to display a barcode to be scanned by an attorney who desires to purchase a copy of the transcript. The scan of the barcode evidences an offer and acceptance, forming a binding contract between the attorney and the court reporter to furnish a copy of a transcript. Prior to the invention, often times there existed disputes about whether an attorney agreed to pay for a copy of the transcript, as such orders were taken orally at the conclusion of a deposition.

After scanning the barcode, the URL-type link is opened on the attorney's mobile computing device, the transaction data is fed to a computer system for authentication, and the transaction is recorded as having been made. Certain of the information from the attorney's mobile computing device may be communicated to the computer system, for example identifying information from the mobile computing device itself, such as a UDID from an Apple iPhone or iPad and any user or owner information that may be retrieved. Also, the barcode may comprise information identifying the court reporter, for example the name of the court reporter, the date, the deponent, the caption of the case, and so on. The court reporter may refresh the barcode on his or her mobile computing device for each successive attorney wanting to make a purchase at the time of the deposition.

Sharing a Transcript by Close Proximity Communication Between Mobile Computing Devices In yet another embodiment of sharing an electronic transcript utilizing a mobile computing device, once a user has properly accessed an electronic copy of a transcript, and associated multimedia, for example by having used his mobile computing device to scan a QR code printed on a photocopy of the transcript, discussed above, the authenticated user may transmit the identity of the electronic asset, or a specific location within the electronic asset, to another mobile computing device user by close or near-field proximity communication with another mobile computing device. In one example of close proximity communication, User1 may "bump" his mobile computing device with another mobile computing device, causing communication of a client identification number and/or a synchronization index reference. User2, with his mobile computing device, receives the communication of the client identification number and/or a synchronization index reference, and User2 then proceeds as though he has scanned User1's QR code, discussed above. One example of close proximity communication between mobile computing devices is utilizing Near Field Communication (NFC) technology. One mobile computing device utilizing NFC technology is the "Samsung Galaxy S III", which uses software referred to as "S Beam", to allow two devices to have their backs gently bumped together to initiate transfer of data.

Sharing a Deep Link by QR Code

In yet another embodiment, a user of a mobile computing device may highlight or otherwise select a range of text from a synchronization index, and then select an option to instruct the software to generate a QR code with information sufficient to allow a subsequent user to scan the QR code in order to be delivered directly to that portion within the multimedia.

Figure 41:
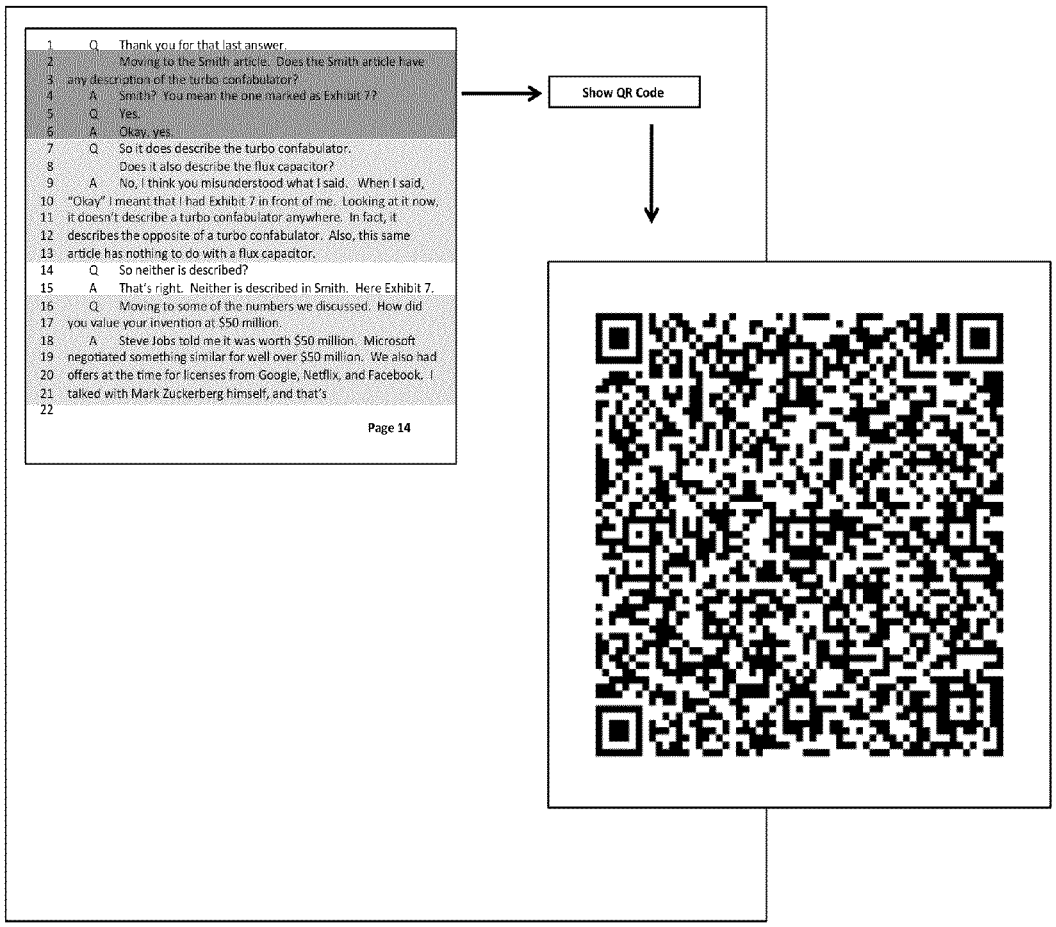
FIG. 41 illustrates a process flow chart for creating a barcode associated with a portion of a transcript and multimedia.

In FIG. 41, for example, QR Code was created, here by accessing the URL http://createqrcode.appspot.com/ for the sample string of text: www.sampleURL.com/ ClientControl=AttorneySmith9876. Transcript=ABC123-Anderson; StartPage=14; StartLine=2; EndPage=14; EndLine=6. This string of text contains a hosting URL, here www.sampleURL.com; a client control number, here "ClientControl=AttorneySmith9876"; a transcript reference, here "Transcript=ABC123"; and a page and line range for the designated text (and corresponding video) at page 14, lines 2-6, here shown as "StartPage=14; StartLine=2; EndPage=14; EndLine=6".

Once that QR code is generated, it can be immediately scanned from the display screen by a second mobile computing device, posted online, for example, on one's social networking timeline as one may do using the Facebook website, emailed, printed, embedded in another document, or saved for later use.

FIG. 41 depicts an action sequence, beginning with an issue coded deposition transcript, for example as may be displayed on a mobile computing device. Here, the user intends to generate a QR code for the designation at page 14, lines 2-6 of the transcript. The user selects the function "Show QR code", and the corresponding QR code is displayed.

Figure 42:
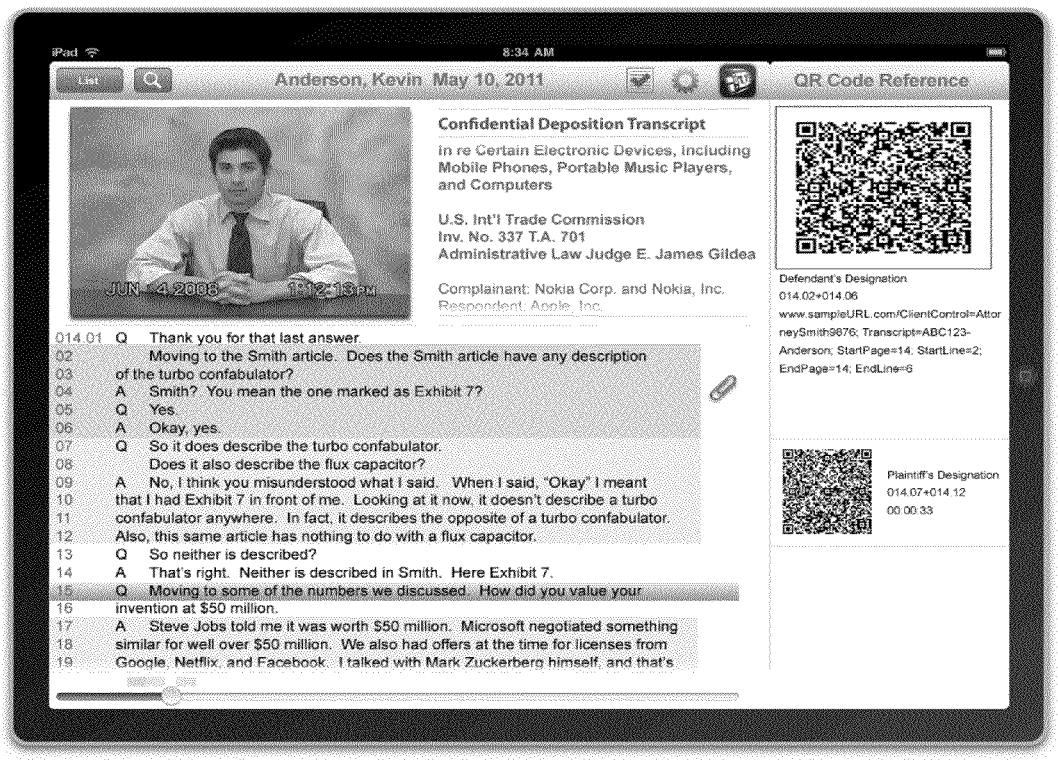
FIG. 42 illustrates a software user interface for displaying barcode associated with a portion of a transcript and multimedia.

FIG. 42 depicts a software user interface for displaying QR codes. Here, the rightmost quarter of the display screen has been partitioned for display of QR codes. The tab "OR Code Reference" has been selected, and the mobile computing device software automatically generates a QR code for each designated portion of testimony. Here, a Defendant's designation page 14, lines 2-6 of the transcript is shown in the cross-hatched area 42-1 covering text at page 14, lines 2-6, and corresponding QR code is shown enlarged in the upper right corner of the display screen. As discussed above, another user of a mobile computing device may scan that QR code to access that transcript and corresponding multimedia at exactly that location.

Also shown in the rightmost margin is a thumbnail QR Code for the Plaintiff's designation of page 14, lines 7-12. Plaintiff's designation of page 14, lines 7-12 is depicted with a large-cross-hatched area 41-2. As the multimedia plays and the transcript scrolls, so too may the corresponding information in the rightmost pane. The QR code may be enlarged by a gesture on the viewing screen, such as a two finger reverse pinch, and once enlarged may be shrunken by another gesture on the viewing screen, such as a two finger pinch.

In this example, the use of the QR code facilitates the quick and easy sharing of a precise point within multimedia between one mobile computing device user and another. Moreover, a discrete "clip", or passage, or scene, or chapter, may be quickly and easily shared between users, here depicted as a deposition designation.

In yet another embodiment, an aggregation of various multimedia clips can be forwarded to a second user by use of a barcode. Suppose, for example, a first user has issue coded a deposition transcript with four issues, two of which are "Plaintiff's direct designations" and "Defendant's direct designations." Suppose, further, that the first user wants to direct a second user, e.g. the court, to view on a mobile computing device only those sections of the multimedia that correspond to those two issue codes, to the exclusion of the other portions of the deposition testimony. The first user creates the designations, then selects from a GUI the command to create a barcode for the set of designations. The first user's computer causes an edit decision list-type of file to be sent by computer network, to a server (or the edit decision list can be created by the server). This edit decision list, for example, may comprise a list of StartPage.StartLine+EndPage.EndLine entries, which correspond to multimedia times as may be found in a synchronization index. The barcode is then generated, with characters to direct the second user to the edit decision list generated by the first user. With a mobile computing device, the second user is then able to scan the barcode (i.e. if printed and placed within a legal brief filed with the court) and to retrieve the multimedia and associated synchronization index. In this manner, a first user can compile a set of discrete video segments that can be subsequently retrieved by a second user by using a barcode and a mobile computing device.

Use of Barcode and a Mobile Computing Device to Pick Up Location Data from Video Played on a Device Other than the Mobile Computing Device.

In yet another embodiment, a user of a DVR or set top appliance, such as an AppleTV by Apple, Inc., may pause playback of pre-recorded or streaming programming, and thereafter retrieve that exact location within the multimedia using a mobile computing device. As an example, suppose a DVR receives via cable television service certain broadcasting signals, which are recorded to a DVR, specifically the hard drive memory resident on the DVR. On pausing, the software on the DVR may function to display a barcode on the viewing screen, for example a flat screen monitor connected to the DVR by HDMI connection, whereupon a mobile computing device user, say using an Apple iPad, may scan the barcode, and then be delivered right to that place within the multimedia where the video was paused. The multimedia content, however, may be delivered to the iPad via Wifi or wireless data connection, and the user would be able to watch the content on his mobile device. Optimally, the user experience is a quick and seamless appearance of transference of multimedia. The mobile computing device acquires the barcode, having embedded therein a client control number, and other information, to allow the multimedia delivery system to perform an authentication step to determine whether the user or mobile computing device possesses necessary permissions to "share" the multimedia asset.

In this example, suppose the user, a subscriber to cable television services by Cox Communications in Northern Virginia, scheduled a recording of Program X on his DVR. The DVR records the program at the scheduled time. Assume the user then watches Program X, a one-hour long program, which was recorded on his home DVR. He stops at 37:00 into the program, and wishes to have his children watch the remainder of the program on an iPad while travelling in the car. On pausing, the user may elect a display of a barcode. The iPad user scans the barcode. The iPad then communicates, via data network, either wireless, 3G, 4G, LTE or similar, transmitting the content of the barcode to a multimedia delivery service. The multimedia delivery service then determines whether the user is allowed access to the multimedia, then commences delivery of the multimedia to the mobile computing device, either by streaming (via data network, either wireless, 3G, 4G, LTE or similar), or by streaming and caching for later playback on the mobile computing device.

In this example, the authentication step verifies that the mobile computing device user or the mobile computing device is eligible to receive multimedia content. This authentication does not necessarily require that the mobile computing device be registered to the same cable television service account, for example, which is supplying multimedia to the DVR.

Further, this placement of barcode for use with a mobile computing device may also be utilized when the multimedia is first delivered by other means as well, for example if the multimedia content resides on a Blu-ray disc and is first played therefrom. In that instance, a pause of multimedia played from the disc may still result in a display of a barcode, for retrieval of multimedia by a mobile computing device. The scan of the barcode may cause, on a computer network, the seek for the identical content for delivery at the time desired, through a delivery mechanism where the mobile computing device, or the user, is an authorized user. For example, a Blu-ray disc, when content is paused and a barcode is subsequently displayed, may contain as a client control number an indicator for the multimedia to be requested from a hierarchical list of delivery sources. For example, the system, using the client control number in the barcode displayed from the Blu-ray disc, may first seek to deliver the multimedia content from a multimedia delivery system controlled by the movie's production company (e.g. Disney/Pixar), then from a hierarchical number of others where the user would have authentication to receive the identical multimedia content, like Apple, Netflix, Amazon, Hulu, Google, Facebook, or any others.

While a Blu-ray-type media player is discussed above, the multimedia playback system is meant to include, but not to be limited to, any appliance for reading data from a disc using an optical reader, for example as used in reading content from CD, DVD, or Blu-ray formatted media; reading data from flash memory, no matter the physical form factor, including USB thumb drives, SD memory cards, compact flash, memory sticks, video game cartridges, and the like, and; streaming media appliances that receive, typically wirelessly or through wired data network, data transmissions from the internet.

Further, a video game console (for example as may be connected to a viewing monitor) may operate similarly, allowing a user to pause the game, whereupon a barcode is displayed allowing the user to utilize a mobile computing device to scan the barcode and be delivered to the same or similar game on a mobile computing device. In this instance, the information conveyed in the barcode may prompt a gaming software download onto the mobile computing device. The barcode may also contain information to replicate the position of the player who paused the game on the game console. For example, the mobile computing device user may inherit the status of the state of the gameplay, i.e. points, score, levels completed, character attributes, powers, weapons availability, lives remaining, etc. Exemplary video game consoles include Sony PS3, Nintendo Wii, desktop and laptop computers, Apple iPhone, Apple iPad, and so on.

Figure 43:
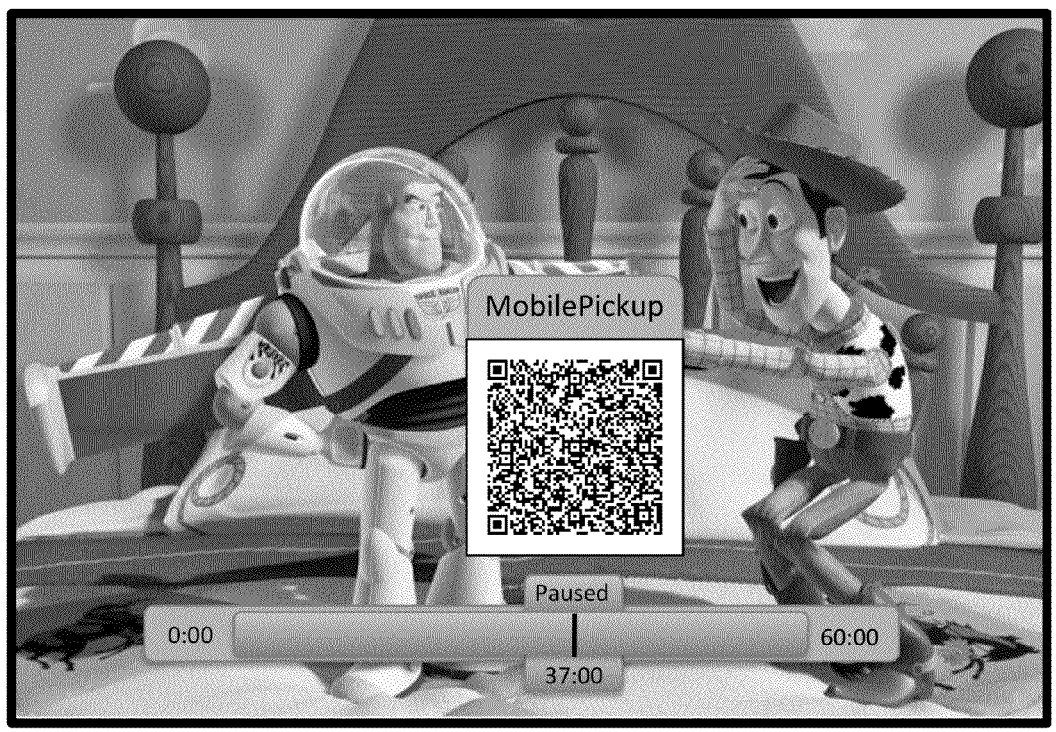
FIG. 43 illustrates a multimedia display with barcode for retrieval of multimedia with a mobile computing device.

FIG. 43 illustrates a children's movie being displayed on a television screen, a scrub bar element indicating a program duration of 60:00 minutes, with the program being paused at 37:00 minutes into the program, and a bar code (above which is shown a trademarking element, here captioned with the trademark "MobilePickup") which functions to be scanned by a mobile computing device.

Figure 44:
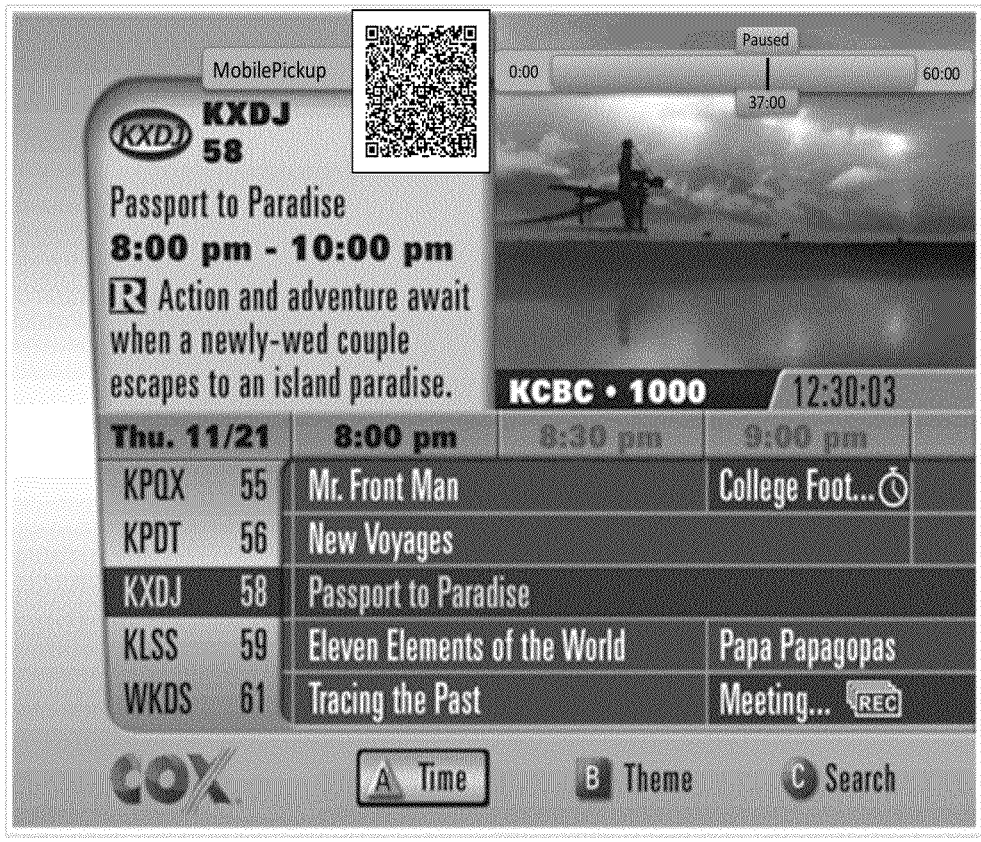
FIG. 44 illustrates a program guide with barcode for retrieval of multimedia with a mobile computing device.

FIG. 44 illustrates incorporation into a program guide screen a scrub bar element (here indicating a program duration of 60:00 minutes, with the program being paused at 37:00 minutes into the program), and a bar code. The program guide screen contains other elements of a summary program guide screen. Using the program guide screen, and the bar code, a user may retrieve multimedia content using a mobile computing device, which authentication step determines whether the multimedia may be broadcast to the mobile computing device as an "on-demand" multimedia delivery service. Authentication may be denied, or a barcode may not be displayed, for example, if an event listed in the program guide will be a live broadcast which has not been recorded or has not yet occurred, or if the event listed has been embargoed until a first broadcast date, for example as would be the case with a weekly scheduled drama or situation comedy.

The content programming guide can be used to retrieve a program from the guide. Retrieving a program using the barcode and the content programming guide may deliver the user to the beginning of the program. In a different embodiment, the barcode may deliver the mobile computing device to a point in the program other than to its beginning, as is shown in FIG. 44 where a scan of the barcode is intended to allow the user to "pick up" the multimedia at a point 37:00 into the program.

Once again, while some of the examples above are presented in the context of a legal proceeding, i.e. a deposition transcript and associated multimedia, the examples are not intended to limit the scope of the invention. As discussed above, there exist many types and kinds of uses for a synchronization index with associated multimedia, being used on a mobile computing device.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method for social networking with a mobile computing device comprising:
   providing for use on a mobile computing device a synchronization index, wherein said synchronization index is associated to multimedia, wherein the synchronization index comprises an electronic transcript that indicates text corresponding to audio from the multimedia, and wherein the synchronization index indicates respective times within the multimedia corresponding to when a word or range of words is audible in the multimedia;
   providing mobile computing device software, wherein said mobile computing device software comprises executable program code configured to receive the synchronization index, and wherein said text is able to be displayed other than as a web page,
   wherein said mobile computing device comprises a viewing screen and a touch-sensitive input interface,
   wherein said viewing screen is able to display multimedia and text from said synchronization index,
   wherein performing a user's selected gesture on a portion of said viewing screen corresponding to a portion of said text is recognized by said touch-sensitive input interface to facilitate annotation of a portion of said synchronization index, and
   wherein said mobile computing device software comprises executable program code configured to facilitate annotation of a portion of said synchronization index responsive to user input received by the mobile computing device; and
   communicating said annotation for subsequent retrieval on a second computing device via a network.

2. The method of claim 1, wherein said mobile computing device software comprises executable program code configured to synchronously play said associated multimedia with said synchronization index other than as part of a web page.

3. The method of claim 1, wherein said annotation is a link to a portion of said multimedia.

4. The method of claim 1, wherein said annotation is text, said text being associated to a portion of said multimedia.

5. The method of claim 1, wherein said annotation is text, said text being associated to a portion of said multimedia, and wherein said text is able to be displayed when playback of said portion of said multimedia occurs.

6. The method of claim 1, wherein said annotation is associated to a portion of said multimedia, and wherein said annotation is selected from the group comprising a threaded text discussion, a selected range of text from said synchronization index to which a highlighting color or font characteristic is applied, an audio file, a multimedia file, a picture, a photograph, a graphic, a drawn annotation, a brand element, an alteration to the text of said synchronization index, a hyperlink, and a hyperlink to predetermined portion of multimedia.

7. The method of claim 1, wherein said annotation is associated to a portion of said multimedia;
wherein said annotation is selected from the group comprising a threaded text discussion, a selected range of text from said synchronization index to which a highlighting color or font characteristic is applied, an audio file, a multimedia file, a picture, a photograph, a graphic, a drawn annotation, a brand element, an alteration to the text of said synchronization index, a hyperlink, and a hyperlink to predetermined portion of multimedia; and
wherein said second computing device selectively receives annotations as part of a social network.

8. The method of claim 1, wherein said second computing device comprises computer hardware and software to operate a social networking service, wherein a user of said service is provided facility to share annotations.

9. The method of claim 1, wherein said second computing device comprises a second mobile computing device.

10. The method of claim 1, wherein said mobile computing device runs an operating system selected from the group comprising iOS, Android, Windows Phone, BlackBerry OS, and Linux.

11. A method for social networking relating to multimedia comprising:
providing multimedia;
providing a synchronization index that comprises an electronic transcript of text corresponding to at least a portion of audio from said multimedia and indicates respective times within the multimedia corresponding to a word or range of words, wherein said synchronization index provides association between at least one portion of said electronic transcript and at least one portion of said multimedia, and wherein said synchronization index is provided to a first user and at least one additional user via a network;
providing executable program code to deep link to a predetermined point within said multimedia by using said synchronization index; and
providing executable program code to share one or more said deep links, wherein said sharing of deep links facilitates interaction between the first user and at least one additional user via a network,
wherein mobile computing device software comprises executable program code to view said multimedia and said synchronization index other than as a web page,
wherein mobile computing device software comprises said executable program code to deep link, and
wherein mobile computing device software comprises executable program code to communicate deep links to a second computing device,
wherein said mobile computing device software operates on a mobile computing device comprising a viewing screen and a touch-sensitive input interface,
wherein said viewing screen is able to display multimedia and text from said synchronization index,
wherein performing a user's selected gesture on a portion of said viewing screen corresponding to a portion of said text is recognized by said touch-sensitive input interface to facilitate said deep linking.

12. The method of claim 11, wherein said deep link is a hyperlink to a predetermined portion of multimedia,
wherein said hyperlink is associated to an element selected from the group comprising text, a note, a selected range of text from said synchronization index to which a highlighting color or font characteristic is applied, a picture, a photograph, a graphic, a drawn annotation, and a brand element, and
wherein said element is able to be viewed on a mobile computing device.

13. The method of claim 11, wherein said mobile computing device software functions on a mobile computing device that runs an operating system selected from the group comprising iOS, Android, Windows Phone, BlackBerry OS, and Linux.

14. A computer system for social networking relating to multimedia comprising:
one or more processors for executing executable program code;
executable program code configured to provide multimedia;
executable program code configured to provide a synchronization index, wherein said synchronization index is associated to said multimedia, wherein the synchronization index comprises an electronic transcript that indicates text corresponding to audio from the multimedia, and wherein the synchronization index indicates respective times within the multimedia corresponding to a word or range of words, wherein said synchronization index is shared with a plurality of users, and wherein said text is able to be displayed other than as a web page;
executable program code configured to provide facility for a user to deep link to a predetermined point within said multimedia by using said synchronization index; and
executable program code configured to provide facility for a plurality of users to share said deep links, wherein said sharing of deep links facilitates interaction between a first user and at least one additional user via a network,
wherein said computing system comprises a hosting server and one or more mobile computing devices,
wherein at least one mobile computing device comprises a viewing screen and a touch-sensitive input interface,
wherein said viewing screen is able to display multimedia and text from said synchronization index, and
wherein performing a user's selected gesture on a portion of said viewing screen corresponding to a portion of said text is recognized by said touch-sensitive input interface to deep link to a predetermined point within said multimedia.

15. The system of claim 14,
wherein at least one mobile computing device executes said executable program code configured to provide facility for a user to deep link to a predetermined point within said multimedia by using said synchronization index.

16. The system of claim 14,
wherein at least one mobile computing device executes said executable program code configured to provide facility for a user to deep link to a predetermined point within said multimedia by using said synchronization index, and
wherein at least one mobile computing device plays multimedia synchronously with text from a synchronization index other than as a web page.

17. The system of claim 14,
wherein at least one of said one or more mobile computing devices runs an operating system selected from the group comprising iOS, Android, Windows Phone, BlackBerry OS, and Linux.

* * * * *